US008317594B2

(12) United States Patent
Yoshizawa

(10) Patent No.: US 8,317,594 B2
(45) Date of Patent: Nov. 27, 2012

(54) GAMING MACHINE WHICH IS LIKELY TO INCREASE PLAYER'S EXPECTATION FOR BONUS GAME AND PLAYING METHOD THEREOF

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 759 days.

(21) Appl. No.: 12/406,621

(22) Filed: Mar. 18, 2009

(65) Prior Publication Data

US 2009/0239649 A1 Sep. 24, 2009

Related U.S. Application Data

(60) Provisional application No. 61/037,496, filed on Mar. 18, 2008, provisional application No. 61/037,737, filed on Mar. 19, 2008, provisional application No. 61/037,745, filed on Mar. 19, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ........................................... 463/20; 463/27

(58) Field of Classification Search .................... 463/16, 463/18, 20, 21, 24, 25, 43, 17, 19, 26, 27
See application file for complete search history.

(56) References Cited

U.S. PATENT DOCUMENTS

| | | | | |
|---|---|---|---|---|
| 6,604,999 | B2 | 8/2003 | Ainsworth | |
| 7,976,373 | B2 * | 7/2011 | Kroeckel et al. | 463/16 |
| 2002/0065124 | A1 | 5/2002 | Ainsworth | |
| 2003/0036430 | A1 * | 2/2003 | Cannon | 463/42 |
| 2004/0209662 | A1 * | 10/2004 | Wadleigh | 463/16 |
| 2006/0003892 | A1 * | 1/2006 | Ikemizu et al. | 503/227 |
| 2007/0077990 | A1 * | 4/2007 | Cuddy et al. | 463/25 |

* cited by examiner

*Primary Examiner* — Olik Chaudhuri
*Assistant Examiner* — Quovaunda V Jefferson
(74) *Attorney, Agent, or Firm* — Lexyoume IP Meister, PLLC.

(57) ABSTRACT

When a game-number addition symbol is rearranged in arrangement areas, a value determined based on the number of game-number addition symbols rearranged is added to a bonus game-number. When a predetermined condition is satisfied, executed is a bonus game of which scale depends on the bonus game-number.

13 Claims, 41 Drawing Sheets

FIG. 6

| | REEL151 | REEL152 | REEL153 | REEL154 | REEL155 |
|---|---|---|---|---|---|
| CODE No. | SYMBOL | SYMBOL | SYMBOL | SYMBOL | SYMBOL |
| 00 | HERO | HERO | CAR | HERO | VILLA |
| 01 | JET | STOCK CERTIFICATE | DIAMOND | STOCK CERTIFICATE | RIVAL |
| 02 | VILLA | GOLD BAR | GOLD BAR | DIAMOND | CAR |
| 03 | GOLD BAR | DIAMOND | HERO | HERO | JET |
| 04 | HERO | RIVAL | RIVAL | RIVAL | HERO |
| 05 | CAR | GOLD BAR | JET | CAR | DIAMOND |
| 06 | STOCK CERTIFICATE | RIVAL | VILLA | HERO | RIVAL |
| 07 | RIVAL | VILLA | STOCK CERTIFICATE | VILLA | HERO |
| 08 | GOLD BAR | CAR | HERO | GOLD BAR | STOCK CERTIFICATE |
| 09 | DIAMOND | JET | DIAMOND | JET | DIAMOND |
| 10 | JET | CAR | GOLD BAR | CAR | JET |
| 11 | STOCK CERTIFICATE | HERO | STOCK CERTIFICATE | VILLA | STOCK CERTIFICATE |
| 12 | RIVAL | RIVAL | GOLD BAR | JET | GOLD BAR |
| 13 | CAR | GOLD BAR | JET | RIVAL | HERO |
| 14 | GOLD BAR | DIAMOND | VILLA | GOLD BAR | VILLA |
| 15 | HERO | HERO | HERO | STOCK CERTIFICATE | RIVAL |
| 16 | JET | STOCK CERTIFICATE | CAR | DIAMOND | CAR |
| 17 | RIVAL | JET | RIVAL | JET | GOLD BAR |
| 18 | UP | UP | UP | UP | UP |
| 19 | CAR | VILLA | HERO | CAR | JET |
| 20 | HERO | HERO | RIVAL | RIVAL | HERO |
| 21 | DIAMOND | JET | CAR | GOLD BAR | CAR |

FIG. 9

ADDITION GAME-NUMBER DETERMINATION TABLE

| BET FORM | PATTERN-NUMBER | ADDITION GAME-NUMBERS PER SYMBOL |
|---|---|---|
| MAXIMUM-BET | 1 | 1 |
| | 2 | 2 |
| | 3 | 3 |
| | 4 | 4 |
| | 5 | 5 |
| ONE-BET | 6 | 1 |

FIG. 19

| | REEL151 | REEL152 | REEL153 | REEL154 | REEL155 |
|---|---|---|---|---|---|
| CODE No. | SYMBOL | SYMBOL | SYMBOL | SYMBOL | SYMBOL |
| 00 | HERO | HERO | CAR | HERO | VILLA |
| 01 | JET | STOCK CERTIFICATE | DIAMOND | STOCK CERTIFICATE | RIVAL |
| 02 | VILLA | GOLD BAR | GOLD BAR | DIAMOND | CAR |
| 03 | GOLD BAR | DIAMOND | HERO | HERO | JET |
| 04 | HERO | RIVAL | DOWN | DOWN | HERO |
| 05 | CAR | GOLD BAR | JET | CAR | DIAMOND |
| 06 | STOCK CERTIFICATE | RIVAL | VILLA | HERO | DOWN |
| 07 | RIVAL | VILLA | STOCK CERTIFICATE | VILLA | HERO |
| 08 | GOLD BAR | CAR | HERO | GOLD BAR | STOCK CERTIFICATE |
| 09 | DIAMOND | JET | DIAMOND | JET | DIAMOND |
| 10 | JET | CAR | GOLD BAR | CAR | JET |
| 11 | STOCK CERTIFICATE | HERO | STOCK CERTIFICATE | VILLA | STOCK CERTIFICATE |
| 12 | DOWN | DOWN | GOLD BAR | JET | GOLD BAR |
| 13 | CAR | GOLD BAR | JET | RIVAL | HERO |
| 14 | GOLD BAR | DIAMOND | VILLA | GOLD BAR | VILLA |
| 15 | HERO | HERO | HERO | STOCK CERTIFICATE | RIVAL |
| 16 | JET | STOCK CERTIFICATE | CAR | DIAMOND | CAR |
| 17 | RIVAL | JET | RIVAL | JET | GOLD BAR |
| 18 | UP | UP | UP | UP | UP |
| 19 | CAR | VILLA | HERO | CAR | JET |
| 20 | HERO | HERO | RIVAL | RIVAL | HERO |
| 21 | DIAMOND | JET | CAR | GOLD BAR | CAR |

FIG. 22A

ADDITION GAME-NUMBER DETERMINATION TABLE

| BET FORM | PATTERN-NUMBER | ADDITION GAME-NUMBERS PER SYMBOL |
|---|---|---|
| MAXIMUM-BET | 1 | 1 |
| | 2 | 2 |
| | 3 | 3 |
| | 4 | 4 |
| | 5 | 5 |
| ONE-BET | 6 | 1 |

FIG. 22B

SUBTRACTION GAME-NUMBER DETERMINATION TABLE

| BET FORM | PATTERN-NUMBER | SUBTRACTION GAME-NUMBERS PER SYMBOL |
|---|---|---|
| MAXIMUM-BET | 1 | 1 |
| | 2 | 2 |
| | 3 | 3 |
| | 4 | 4 |
| | 5 | 5 |
| ONE-BET | 6 | 1 |

FIG.30
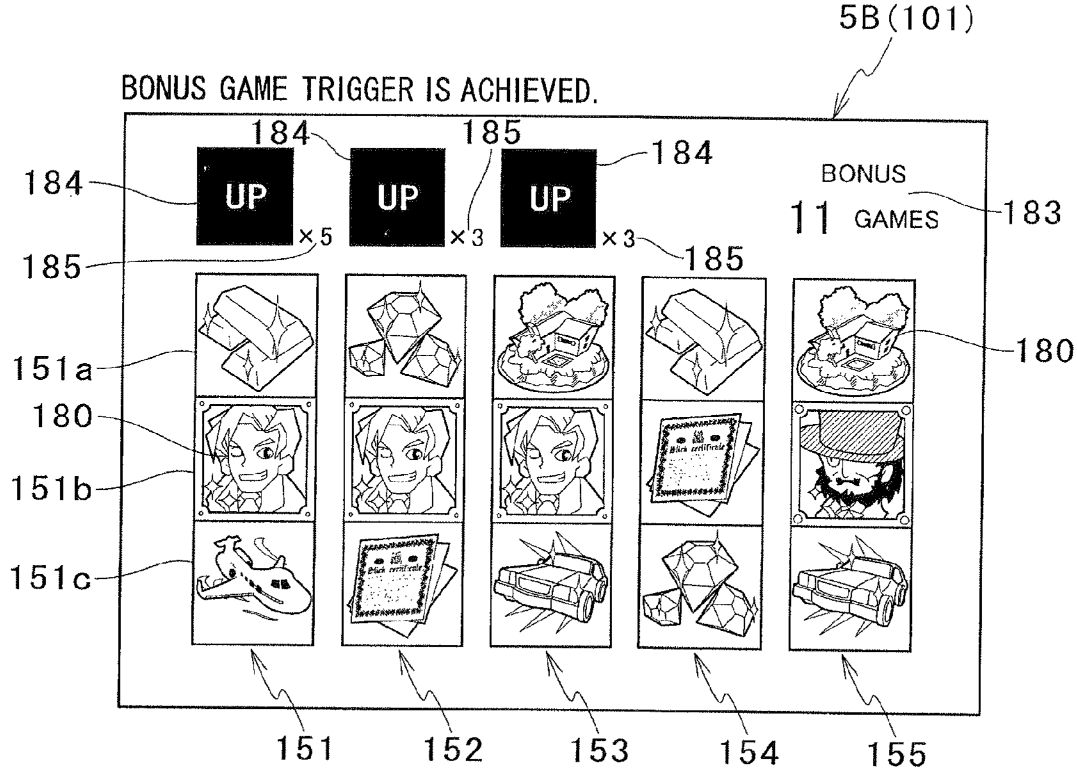
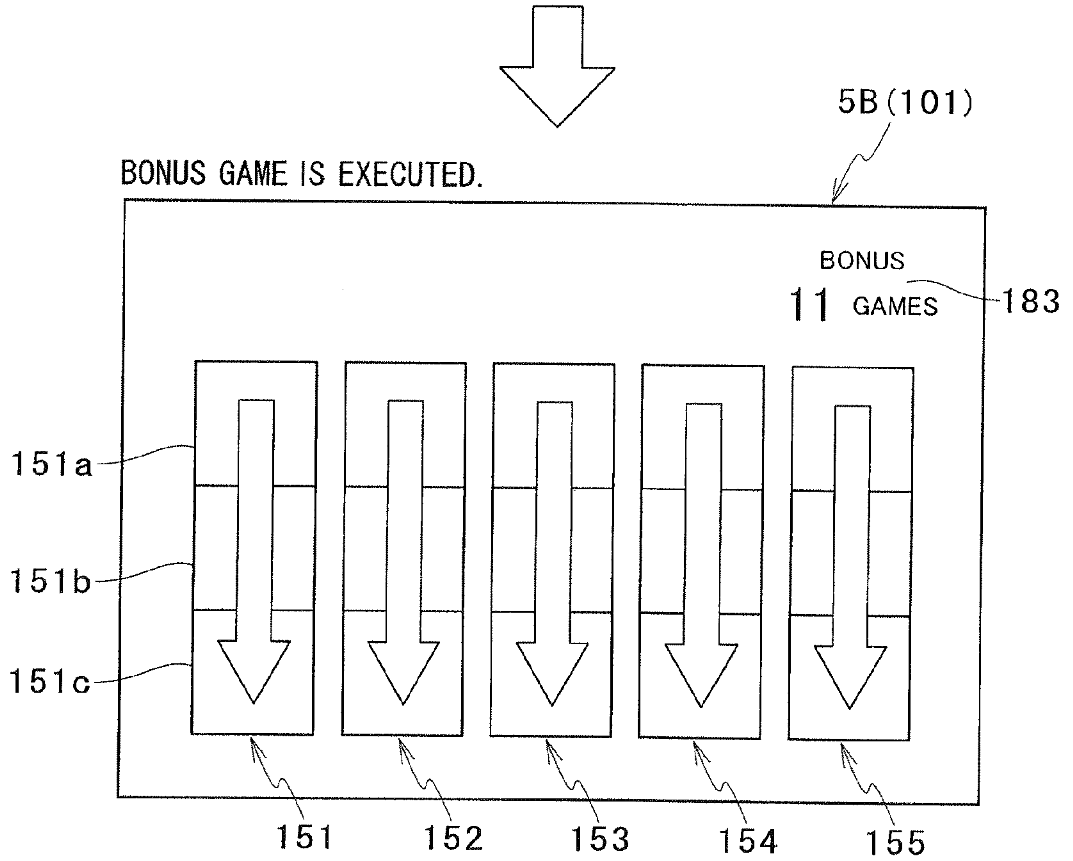

FIG. 33

| | REEL151 | REEL152 | REEL153 | REEL154 | REEL155 |
|---|---|---|---|---|---|
| CODE No. | SYMBOL | SYMBOL | SYMBOL | SYMBOL | SYMBOL |
| 00 | HERO | HERO | CAR | HERO | VILLA |
| 01 | JET | STOCK CERTIFICATE | DIAMOND | STOCK CERTIFICATE | RIVAL |
| 02 | VILLA | GOLD BAR | GOLD BAR | DIAMOND | CAR |
| 03 | GOLD BAR | DIAMOND | HERO | HERO | JET |
| 04 | HERO | RIVAL | RIVAL | RIVAL | HERO |
| 05 | CAR | GOLD BAR | JET | CAR | DIAMOND |
| 06 | STOCK CERTIFICATE | RIVAL | VILLA | HERO | RIVAL |
| 07 | RIVAL | VILLA | STOCK CERTIFICATE | VILLA | HERO |
| 08 | GOLD BAR | CAR | HERO | GOLD BAR | STOCK CERTIFICATE |
| 09 | DIAMOND | JET | DIAMOND | JET | DIAMOND |
| 10 | JET | CAR | GOLD BAR | CAR | JET |
| 11 | STOCK CERTIFICATE | HERO | STOCK CERTIFICATE | VILLA | STOCK CERTIFICATE |
| 12 | RIVAL | RIVAL | GOLD BAR | JET | GOLD BAR |
| 13 | CAR | GOLD BAR | JET | RIVAL | HERO |
| 14 | GOLD BAR | DIAMOND | VILLA | GOLD BAR | VILLA |
| 15 | HERO | HERO | HERO | STOCK CERTIFICATE | RIVAL |
| 16 | JET | STOCK CERTIFICATE | CAR | DIAMOND | CAR |
| 17 | RIVAL | JET | RIVAL | JET | GOLD BAR |
| 18 | UP | UP | UP | UP | UP |
| 19 | CAR | VILLA | HERO | CAR | JET |
| 20 | HERO | HERO | RIVAL | RIVAL | HERO |
| 21 | DIAMOND | JET | CAR | GOLD BAR | CAR |

FIG. 36

ADDITION GAME-NUMBER DETERMINATION TABLE

| BET FORM | PATTERN-NUMBER | ADDITION GAME-NUMBERS PER SYMBOL |
|---|---|---|
| MAXIMUM-BET | 1 | 1 |
| | 2 | 2 |
| | 3 | 3 |
| | 4 | 4 |
| | 5 | 5 |
| ONE-BET | 6 | 1 |

GAMING MACHINE WHICH IS LIKELY TO INCREASE PLAYER'S EXPECTATION FOR BONUS GAME AND PLAYING METHOD THEREOF

CROSS REFERENCE TO RELATED APPLICATION

The present application claims priority from: provisional application No. 61/037,496 filed on Mar. 18, 2008; provisional application No. 61/037,737 filed on Mar. 19, 2008; and provisional application No. 61/037,745 filed on Mar. 19, 2008, which applications are incorporated herein by reference in its entirety.

BACKGROUND OF THE INVENTION

1. Field of the Invention

The present invention relates to a gaming machine which is likely to increase player's expectation for a bonus game and a playing method thereof.

2. Description of Related Art

In a conventional slot machine, when a player inserts a game medium such as a coin or bill into an insertion slot of the slot machine and then presses a spin button, more than one symbols are scroll-displayed on a display provided at the front of a cabinet. Then, the symbols are automatically stopped.

In such a slot machine, as is disclosed in U.S. Pat. No. 6,604,999, or U.S. Patent Application Publication No. 2002/0065124, a predetermined number of game media are paid out when symbols stopped on a winning line correspond to a predetermined combination. Further, irrespective of a winning line, a predetermined number of game media are paid out according to the number of symbols which are called scatter symbols displayed on a display.

In a conventional slot machine, when a predetermined condition is satisfied, a bonus game is executed. The bonus game is more advantageous for a player in a payout than a basic game, in which a game medium is inserted to scroll-display symbols and then symbols are stopped. However, in the case where a bonus game is a free game or the like which does not require the insertion of a game medium, the number of bonus games is determined in advance, or is determined randomly. Therefore, it is difficult to increase player's expectation for the bonus game.

An object of the present invention is to provide a gaming machine having an entertainment characteristic unobtainable from a conventional art, and a playing method thereof.

Another object of the present invention is to provide a gaming machine which is likely to increase player's expectation for a bonus game and a playing method thereof.

SUMMARY OF THE INVENTION

A gaming machine of the present invention includes: a display having a matrix of arrangement areas in which scatter symbols are arranged; a count device which increments/decrements an accumulated value; and a controller. The controller is programmed to operate in the following steps of: (a1) rearranging scatter symbols in the arrangement areas; (a2) giving a payout according to the number of scatter symbols rearranged; (a3) when a specific symbol is rearranged in the arrangement areas as a result of a rearrangement of scatter symbols, adding, to the accumulated value, a value determined based on the number of specific symbols rearranged;

and (a4) when a predetermined condition is satisfied, executing a bonus game whose scale depends on the accumulated value.

With this structure, when a specific symbol is rearranged in the arrangement areas, a value determined based on the number of specific symbols rearranged is added to the accumulated value, and when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; an input device which receives plural types of bet operations from outside; and a controller. The controller is programmed to operate in the following steps of: (b1) rearranging scatter symbols in the arrangement areas; (b2) giving a payout according to the number of scatter symbols rearranged; (b3) when a specific symbol is rearranged in the arrangement areas as a result of a rearrangement of scatter symbols, adding, to the accumulated value, a value determined based on the number of specific symbols rearranged and a type of bet operation received by the input device; and (b4) when a predetermined condition is satisfied, executing a bonus game whose scale depends on the accumulated value.

With this structure, when a specific symbol is rearranged in the arrangement areas, a value determined based on the number of specific symbols rearranged and the type of bet operation received by the input device is added to the accumulated value. Then, when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; and a controller. The controller is programmed to operate in the following steps of: (c1) rearranging scatter symbols in the arrangement areas; (c2) giving a payout according to the number of scatter symbols rearranged; (c3) when a specific symbol is rearranged in the arrangement areas as a result of a rearrangement of scatter symbols, adding, to the accumulated value, a value determined based on the number of specific symbols rearranged; (c4) when a predetermined condition is satisfied and the accumulated value is not 0, executing a bonus game whose scale depends on the accumulated value; and (c5) when the predetermined condition is satisfied and the accumulated value is 0, executing, at a timing that the accumulated value becomes 1 or greater, a bonus game whose scale depends on the accumulated value of 1 or greater.

With this structure, when a specific symbol is rearranged in the arrangement areas, a value determined based on the number of specific symbols rearranged is added to the accumulated value. Then, when a predetermined condition is satisfied and the accumulated value is not 0, executed is a bonus game whose scale depends on the accumulated value. On the other hand, when the predetermined condition is satisfied and the accumulated value is 0, a bonus game is executed, at a timing that the accumulated value becomes 1 or greater, the scale of the bonus game depending on the accumulated value of 1 or greater. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; and a controller. The controller is programmed to operate in the following steps of: (d1) rearranging scatter symbols in the arrangement areas; (d2) giving a payout according to the number of scatter symbols rearranged; (d3) when a specific symbol is rearranged in the arrangement areas as a result of a rearrangement of scatter symbols, adding, to the accumulated value, a value determined based on the number of specific symbols rearranged; (d4) when a predetermined condition is satisfied and the accumulated value is not 0, executing a bonus game whose scale depends on the accumulated value; and (d5) when the predetermined condition is satisfied and the accumulated value is 0, executing an accumulated value determination game to determine an accumulated value of 1 or greater, and then executing a bonus game whose scale depends on the determined accumulated value.

With this structure, when a specific symbol is rearranged in the arrangement areas, a value determined based on the number of specific symbols rearranged is added to the accumulated value. Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game to determine an accumulated value of 1 or greater, and then executed is a bonus game whose scale depends on the determined accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; an input device which receives plural types of bet operations from outside; and a controller. The controller is programmed to operate in the following steps of: (e1) rearranging scatter symbols in the arrangement areas; (e2) giving a payout according to the number of scatter symbols rearranged; (e3) when a specific symbol is rearranged in the arrangement areas as a result of a rearrangement of scatter symbols, adding, to the accumulated value, a value determined based on the number of specific symbols rearranged and a type of bet operation received by the input device; (e4) when a predetermined condition is satisfied and the accumulated value is not 0, executing a bonus game whose scale depends on the accumulated value; and (e5) when the predetermined condition is satisfied and the accumulated value is 0, executing an accumulated value determination game to determine an accumulated value of 1 or greater, and then executing a bonus game whose scale depends on the determined accumulated value.

With this structure, when a specific symbol is rearranged in the arrangement areas, a value determined based on the number of specific symbols rearranged and the type of bet operation received by the input device is added to the accumulated value. Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game to determine an accumulated value of 1 or greater, and then executed is a bonus game whose scale depends on the determined accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

The present invention is a playing method of a gaming machine in which scatter symbols are arranged in a matrix of arrangement areas of a display. The playing method of the gaming machine including the steps of: (f1) rearranging scatter symbols in the arrangement areas; (f2) giving a payout according to the number of scatter symbols rearranged; (f3) when a specific symbol is rearranged in the arrangement areas as a result of a rearrangement of scatter symbols, adding a value determined based on the number of specific symbols rearranged to an accumulated value incremented/decremented by a count device; and (f4) when a predetermined condition is satisfied, executing a bonus game whose scale depends on the accumulated value.

With this structure, when a specific symbol is rearranged in the arrangement areas, a value determined based on the number of specific symbols rearranged is added to the accumulated value, and when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

With the above-described structure, it is possible to provide a gaming machine having an entertainment characteristic unobtainable from a conventional art, and a playing method thereof.

A gaming machine of the present invention includes: a display having a matrix of arrangement areas in which scatter symbols are arranged; a count device which increments/decrements an accumulated value; and a controller. The controller is programmed to operate in the following steps of: (a1) rearranging scatter symbols in the arrangement areas; (a2) giving a payout according to the number of scatter symbols rearranged; (a3) when a first symbol is rearranged in the arrangement areas as a result of a rearrangement of scatter symbols, adding, to the accumulated value, a value determined based on the number of first symbols rearranged; (a4) when a second symbol is rearranged in the arrangement areas as a result of a rearrangement of scatter symbols, subtracting, from the accumulated value, a value determined based on the number of second symbols rearranged; and (a5) when a predetermined condition is satisfied, executing a bonus game whose scale depends on the accumulated value.

With this structure, when a first symbol is rearranged in the arrangement areas, a value determined based on the number of first symbols rearranged is added to the accumulated value. On the other hand, when a second symbol is rearranged in the arrangement areas, a value determined based on the number of second symbols rearranged is subtracted from the accumulated value. When a predetermined condition is satisfied, executed is a bonus game whose scale depends on the accumulated value. Thus, the accumulated value, which is incremented due to a rearrangement of a first symbol and decremented due to a rearrangement of a second symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; an input device which receives plural types of bet operations from outside; and a controller. The controller is programmed to operate in the following steps of: (b1) rearranging scatter symbols in the arrangement areas; (b2) giving a payout according to the number of scatter symbols rearranged; (b3) when a first symbol is rearranged in the arrangement areas as a result of a rearrangement of scatter symbols, adding, to the accumulated value, a value determined based on the number of first symbols rearranged and a type of bet operation received by the input device; (b4) when a second symbol is rearranged in the arrangement areas as a result of a rearrangement of scatter symbols, subtracting, from the accumulated value, a value determined based on the number of second symbols rearranged and a type of bet operation received by the input device; and (b5) when a predetermined condition is satisfied, executing a bonus game whose scale depends on the accumulated value.

With this structure, when a first symbol is rearranged in the arrangement areas, a value determined based on the number of first symbols rearranged and a type of bet operation received by the input device is added to the accumulated value. On the other hand, when a second symbol is rearranged in the arrangement areas, a value determined based on the number of second symbols rearranged and a type of bet operation received by the input device is subtracted from the accumulated value. When a predetermined condition is satisfied, executed is a bonus game whose scale depends on the accumulated value. Thus, the accumulated value, which is incremented due to a rearrangement of a first symbol and decremented due to a rearrangement of a second symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; and a controller. The controller is programmed to operate in the following steps of: (c1) rearranging scatter symbols in the arrangement areas; (c2) giving a payout according to the number of scatter symbols rearranged; (c3) when a first symbol is rearranged in the arrangement areas as a result of a rearrangement of scatter symbols, adding, to the accumulated value, a value determined based on the number of first symbols rearranged; (c4) when a second symbol is rearranged in the arrangement areas as a result of a rearrangement of scatter symbols, subtracting, from the accumulated value, a value determined based on the number of second symbols rearranged; (c5) when a predetermined condition is satisfied and the accumulated value is not 0, executing a bonus game whose scale depends on the accumulated value; and (c6) when the predetermined condition is satisfied and the accumulated value is 0, executing, at a timing that the accumulated value becomes 1 or greater, a bonus game whose scale depends on the accumulated value of 1 or greater.

With this structure, when a first symbol is rearranged in the arrangement areas, a value determined based on the number of first symbols rearranged is added to the accumulated value. On the other hand, when a second symbol is rearranged in the arrangement areas, a value determined based on the number of second symbols rearranged is subtracted from the accumulated value. When a predetermined condition is satisfied and the accumulated value is not 0, executed is a bonus game whose scale depends on the accumulated value. On the other hand, when the predetermined condition is satisfied and the accumulated value is 0, a bonus game is executed, at a timing that the accumulated value becomes 1 or greater, the scale of the bonus game depending on the accumulated value of 1 or greater. Thus, the accumulated value, which is incremented due to a rearrangement of a first symbol and decremented due to a rearrangement of a second symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; and a controller. The controller is programmed to operate in the following steps of: (d1) rearranging scatter symbols in the arrangement areas; (d2) giving a payout according to the number of scatter symbols rearranged; (d3) when a first symbol is rearranged in the arrangement areas as a result of a rearrangement of scatter symbols, adding, to the accumulated value, a value determined based on the number of first symbols rearranged; (d4) when a second symbol is rearranged in the arrangement areas as a result of a rearrangement of scatter symbols, subtracting, from the accumulated value, a value determined based on the number of second symbols rearranged; (d5) when a predetermined condition is satisfied and the accumulated value is not 0, executing a bonus game whose scale depends on the accumulated value; and (d6) when the predetermined condition is satisfied and the accumulated value is 0, executing an accumulated value determination game to determine an accumulated value of 1 or greater, and then executing a bonus game whose scale depends on the determined accumulated value.

With this structure, when a first symbol is rearranged in the arrangement areas, a value determined based on the number of first symbols rearranged is added to the accumulated value. On the other hand, when a second symbol is rearranged in the arrangement areas, a value determined based on the number of second symbols rearranged is subtracted from the accumulated value. When a predetermined condition is satisfied and the accumulated value is not 0, executed is a bonus game whose scale depends on the accumulated value. On the other hand, when the predetermined condition is satisfied and the accumulated value is 0, executed is an accumulated value determination game to determine an accumulated value of 1 or greater, and then executed is a bonus game whose scale depends on the determined accumulated value. Thus, the accumulated value, which is incremented due to a rearrangement of a first symbol and decremented due to a rearrangement of a second symbol, enables a player to recognize in advance the scale of a bonus game to be executed at a time of satisfaction of the predetermined condition. Therefore, the player's expectation for the bonus game is likely to be increased.

A gaming machine of the present invention includes: a display having a matrix of arrangement areas in which scatter symbols are arranged; a count device which increments/decrements an accumulated value; an input device which receives plural types of bet operations from outside; and a controller. The controller is programmed to operate in the following steps of: (e1) rearranging scatter symbols in the arrangement areas; (e2) giving a payout according to the number of scatter symbols rearranged; (e3) when a first symbol is rearranged in the arrangement areas as a result of a rearrangement of scatter symbols, adding, to the accumulated value, a value determined based on the number of first symbols rearranged and a type of bet operation received by the input device; (e4) when a second symbol is rearranged in the arrangement areas as a result of a rearrangement of scatter symbols, subtracting, from the accumulated value, a value determined based on the number of second symbols rearranged and a type of bet operation received by the input device; (e5) when a predetermined condition is satisfied and the accumulated value is not 0, executing a bonus game whose scale depends on the accumulated value; and (e6) when the predetermined condition is satisfied and the accumulated value is 0, executing an accumulated value determination game to determine an accumulated value of 1 or greater, and then executing a bonus game whose scale depends on the determined accumulated value.

With this structure, when a first symbol is rearranged in the arrangement areas, a value determined based on the number of first symbols rearranged and a type of bet operation received by the input device is added to the accumulated value. On the other hand, when a second symbol is rearranged in the arrangement areas, a value determined based on the number of second symbols rearranged and a type of bet operation received by the input device is subtracted from the accumulated value. When a predetermined condition is satisfied and the accumulated value is not 0, executed is a bonus game whose scale depends on the accumulated value. On the other hand, when the predetermined condition is satisfied and the accumulated value is 0, executed is an accumulated value determination game to determine an accumulated value of 1 or greater, and then executed is a bonus game whose scale depends on the determined accumulated value. Thus, the accumulated value, which is incremented due to a rearrangement of a first symbol and decremented due to a rearrangement of a second symbol, enables a player to recognize in advance the scale of a bonus game to be executed at a time of satisfaction of the predetermined condition. Therefore, the player's expectation for the bonus game is likely to be increased.

The present invention is a playing method of a gaming machine in which scatter symbols are arranged in a matrix of arrangement areas of a display. The playing method of the gaming machine including the steps of: (f1) rearranging scatter symbols in the arrangement areas; (f2) giving a payout according to the number of scatter symbols rearranged; (f3) when a first symbol is rearranged in the arrangement areas as a result of a rearrangement of scatter symbols, adding, to an accumulated value incremented/decremented by a count device, a value determined based on the number of first symbols rearranged; (f4) when a second symbol is rearranged in the arrangement areas as a result of a rearrangement of scatter symbols, subtracting, from the accumulated value, a value determined based on the number of second symbols rearranged; and (f5) when a predetermined condition is satisfied, executing a bonus game whose scale depends on the accumulated value.

With this structure, when a first symbol is rearranged in the arrangement areas, a value determined based on the number of first symbols rearranged is added to the accumulated value. On the other hand, when a second symbol is rearranged in the arrangement areas, a value determined based on the number of second symbols rearranged is subtracted from the accumulated value. When a predetermined condition is satisfied, executed is a bonus game whose scale depends on the accumulated value. Thus, the accumulated value, which is incremented due to a rearrangement of a first symbol and decremented due to a rearrangement of a second symbol, enables a player to recognize in advance the scale of a bonus game to be executed at a time of satisfaction of the predetermined condition. Therefore, the player's expectation for the bonus game is likely to be increased.

With the above-described structure, it is possible to provide a gaming machine having an entertainment characteristic unobtainable from a conventional art, and a playing method thereof.

A gaming machine of the present invention includes: a display having a matrix of arrangement areas in which scatter symbols are arranged; a count device which increments/decrements an accumulated value; a sensor which senses the presence of a player; and a controller. The controller is programmed to operate in the following steps of: (a1) rearranging scatter symbols in the arrangement areas; (a2) giving a payout according to the number of scatter symbols rearranged; (a3) when a specific symbol is rearranged in the arrangement areas as a result of a rearrangement of scatter symbols, adding, to the accumulated value, a value determined based on the number of specific symbols rearranged; (a4) when a predetermined condition is satisfied, executing a bonus game whose scale depends on the accumulated value; and (a5) resetting the accumulated value when a period during which the sensor senses no presence of the player lasts a predetermined time.

With this structure, when a specific symbol is rearranged in the arrangement areas, a value determined based on the number of specific symbols rearranged is added to the accumulated value, and when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

In addition, when a period during which the sensor senses no presence of the player lasts a predetermined time, the accumulated value is reset. This causes the player to have a desire to consume, for oneself, a bonus game whose scale depends on the accumulated value that the player has accumulated, thereby increasing the player's motivation for a game.

A gaming machine of the present invention includes: a display having a matrix of arrangement areas in which scatter symbols are arranged; a count device which increments/decrements an accumulated value; an input device which receives plural types of bet operations from outside; a sensor which senses the presence of a player; and a controller. The controller is programmed to operate in the following steps of: (b1) rearranging scatter symbols in the arrangement areas; (b2) giving a payout according to the number of scatter symbols rearranged; (b3) when a specific symbol is rearranged in the arrangement areas as a result of a rearrangement of scatter symbols, adding, to the accumulated value, a value determined based on the number of specific symbols rearranged and a type of bet operation received by the input device; (b4) when a predetermined condition is satisfied, executing a bonus game whose scale depends on the accumulated value; and (b5) resetting the accumulated value when a period during which the sensor senses no presence of the player lasts a predetermined time.

With this structure, when a specific symbol is rearranged in the arrangement areas, a value determined based on the number of specific symbols rearranged and the type of bet operation received by the input device is added to the accumulated value. Then, when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

In addition, when a period during which the sensor senses no presence of the player lasts a predetermined time, the accumulated value is reset. This causes the player to have a desire to consume, for oneself, a bonus game whose scale depends on the accumulated value that the player has accumulated, thereby increasing the player's motivation for a game.

A gaming machine of the present invention includes: a display having a matrix of arrangement areas in which scatter symbols are arranged; a count device which increments/decrements an accumulated value; a sensor which senses the presence of a player; a timer which measures time; and a controller. The controller is programmed to operate in the following steps of: (c1) rearranging scatter symbols in the arrangement areas; (c2) giving a payout according to the number of scatter symbols rearranged; (c3) when a specific symbol is rearranged in the arrangement areas as a result of a rearrangement of scatter symbols, adding, to the accumulated value, a value determined based on the number of specific symbols rearranged; (c4) when a predetermined condition is satisfied, executing a bonus game whose scale depends on the accumulated value; (c5) triggering the timer, when the sensor which has sensed the presence of the player senses no presence of the player, to measure a period during which the sensor senses no presence of the player; and (c6) resetting the accumulated value when the period during which the sensor senses no presence of the player lasts a predetermined time.

With this structure, when a specific symbol is rearranged in the arrangement areas, a value determined based on the number of specific symbols rearranged is added to the accumulated value. Then, when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

In addition, when a period during which the sensor senses no presence of the player lasts a predetermined time, the accumulated value is reset. This causes the player to have a desire to consume, for oneself, a bonus game whose scale depends on the accumulated value that the player has accumulated, thereby increasing the player's motivation for a game. Furthermore, the timer measures, from when the sensor no longer senses the presence of the player, a period during which the sensor senses no presence of the player. Therefore, the player recognizes the period measured by the timer, and this increases a possibility of avoiding a disadvantage which is a reset of the accumulated value.

A gaming machine of the present invention includes: a display having a matrix of arrangement areas in which scatter symbols are arranged; a count device which increments/decrements an accumulated value; an input device which receives plural types of bet operations from outside; a sensor which senses the presence of a player; a timer which measures time; and a controller. The controller is programmed to operate in the following steps of: (d1) rearranging scatter symbols in the arrangement areas; (d2) giving a payout according to the number of scatter symbols rearranged; (d3) when a specific symbol is rearranged in the arrangement areas as a result of a rearrangement of scatter symbols, adding, to the accumulated value, a value determined based on the number of specific symbols rearranged and a type of bet operation received by the input device; (d4) when a predetermined condition is satisfied, executing a bonus game whose scale depends on the accumulated value; (d5) triggering the timer, when the sensor which has sensed the presence of the player senses no presence of the player, to measure a period during which the sensor senses no presence of the player; and (d6) resetting the accumulated value when the period during which the sensor senses no presence of the player lasts a predetermined time.

With this structure, when a specific symbol is rearranged in the arrangement areas, a value determined based on the number of specific symbols rearranged is added to the accumulated value. Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game to determine an accumulated value of 1 or greater, and then executed is a bonus game whose scale depends on the determined accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

In addition, when a period during which the sensor senses no presence of the player lasts a predetermined time, the accumulated value is reset. This causes the player to have a desire to consume, for oneself, a bonus game whose scale depends on the accumulated value that the player has accumulated, thereby increasing the player's motivation for a game. Furthermore, the timer measures, from when the sensor no longer senses the presence of the player, a period during which the sensor senses no presence of the player. Therefore, the player recognizes the period measured by the timer, and this increases a possibility of avoiding a disadvantage which is a reset of the accumulated value.

A gaming machine of the present invention includes: a display having a matrix of arrangement areas in which scatter symbols are arranged; a count device which increments/decrements an accumulated value; an input device which receives plural types of bet operations from outside; a sensor which senses the presence of a player; a timer which measures time; and a controller. The controller is programmed to operate in the following steps of: (e1) rearranging scatter symbols in the arrangement areas; (e2) giving a payout according to the number of scatter symbols rearranged; (e3) when a specific symbol is rearranged in the arrangement areas as a result of a rearrangement of scatter symbols, adding, to the accumulated value, a value determined based on the number of specific symbols rearranged and a type of bet operation received by the input device; (e4) when a predetermined condition is satisfied and the accumulated value is not 0, executing a bonus game whose scale depends on the accumulated value; (e5) when the predetermined condition is satisfied and the accumulated value is 0, executing an accumulated value determination game to determine an accumulated value of 1 or greater, and then executing a bonus game whose scale depends on the determined accumulated value; (e6) triggering the timer, when the sensor which has sensed the presence of the player senses no presence of the player, to measure a period during which the sensor senses no presence of the player; and (e7) resetting the accumulated value when the period during which the sensor senses no presence of the player lasts a predetermined time.

With this structure, when a specific symbol is rearranged in the arrangement areas, a value determined based on the number of specific symbols rearranged and the type of bet operation received by the input device is added to the accumulated value. Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game to determine an accumulated value of 1 or greater, and then executed is a bonus game whose scale depends on the determined accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

In addition, when a period during which the sensor senses no presence of the player lasts a predetermined time, the accumulated value is reset. This causes the player to have a desire to consume, for oneself, a bonus game whose scale depends on the accumulated value that the player has accumulated, thereby increasing the player's motivation for a game. Furthermore, the timer measures, from when the sensor no longer senses the presence of the player, a period during which the sensor senses no presence of the player. Therefore, the player recognizes the period measured by the timer, and this increases a possibility of avoiding a disadvantage which is a reset of the accumulated value.

The present invention is a playing method of a gaming machine in which scatter symbols are arranged in a matrix of arrangement areas of a display. The playing method of the gaming machine including the steps of: (f1) rearranging scatter symbols in the arrangement areas; (f2) giving a payout according to the number of scatter symbols rearranged; (f3) when a specific symbol is rearranged in the arrangement areas as a result of a rearrangement of scatter symbols, adding a value determined based on the number of specific symbols rearranged to an accumulated value incremented/decremented by a count device; (f4) when a predetermined condition is satisfied, executing a bonus game whose scale depends on the accumulated value; and (f5) resetting the accumulated value when a period during which a sensor senses no presence of a player lasts a predetermined time.

With this structure, when a specific symbol is rearranged in the arrangement areas, a value determined based on the number of specific symbols rearranged is added to the accumulated value, and when a predetermined condition is satisfied, executed is a bonus game whose scale depends on the accumulated value. Thus, the accumulated value, which is incremented due to a rearrangement of a specific symbol, enables a player to recognize in advance the scale of a bonus game to be executed at a time of satisfaction of the predetermined condition. Therefore, the player's expectation for the bonus game is likely to be increased.

In addition, when a period during which the sensor senses no presence of the player lasts a predetermined time, the accumulated value is reset. This causes the player to have a desire to consume, for oneself, a bonus game whose scale depends on the accumulated value that the player has accumulated, thereby increasing the player's motivation for a game.

With the above-described structure, it is possible to provide a gaming machine having an entertainment characteristic unobtainable from a conventional art, and a playing method thereof.

BRIEF DESCRIPTION OF THE DRAWINGS

FIG. 6 is a table showing symbols and code numbers of the symbols.

FIG. 9 is a diagram showing an addition game-number determination table.

FIG. 19 is a table showing symbols and code numbers of the symbols.

FIG. 22A is a diagram showing an addition game-number determination table.

FIG. 22B is a diagram showing an subtraction game-number determination table.

FIG. 30 is another explanatory view of the display screen.

FIG. 33 is a table showing symbols and code numbers of the symbols.

FIG. 36 is a diagram showing an addition game-number determination table.

DESCRIPTION OF THE PREFERRED EMBODIMENTS

First Embodiment

Figure 1:
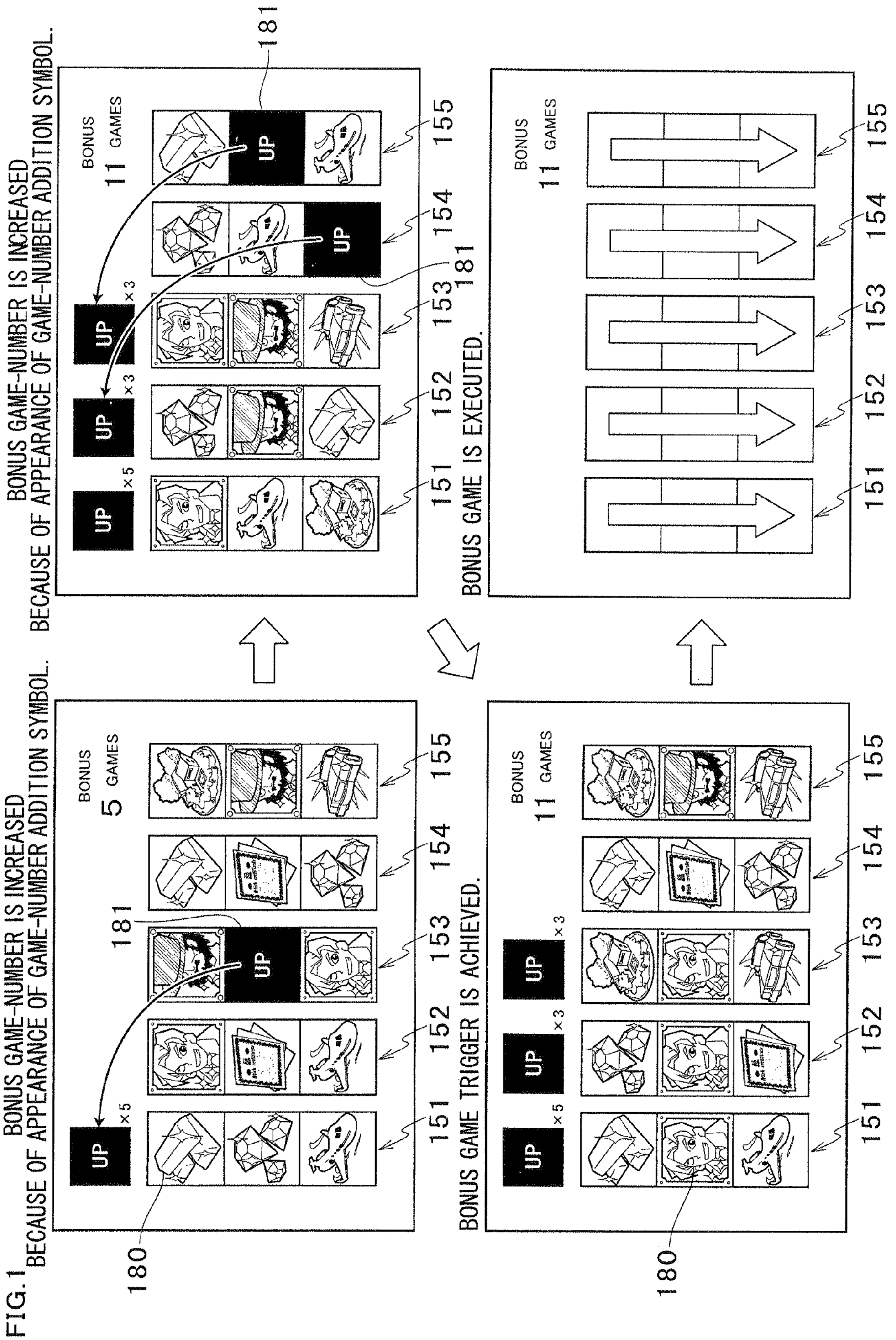
FIG. 1 is an explanatory view illustrating a playing method of a slot machine.

The following describes a first embodiment of a slot machine (a gaming machine) and playing method thereof according to the present invention, with reference to FIGS. 1 to 13. Note that reference numerals respectively given to members in the figures referred to in this embodiment, reference symbols (such as "S") respectively representing steps in flowcharts in the figures, and description using these reference numerals and reference symbols are effective only in this embodiment. Each of these numerals and symbols does not represent a member or step in other embodiments.

As shown in FIG. 1, the slot machine executes a playing method including the steps of: rearranging scatter symbols 180 in a matrix of arrangement areas 151 to 155 of a display; giving a payout according to the number of scatter symbols 180 rearranged; when a specific symbol 181 is rearranged in the arrangement areas 151 to 155 as a result of a rearrangement of scatter symbols 180, adding a value determined based on the number of specific symbols 181 rearranged and a type of bet operation received by an input device to an accumulated value incremented/decremented by a count device; when a predetermined condition is satisfied and the accumulated value is not 0, executing a bonus game whose scale depends on the accumulated value; and when the predetermined condition is satisfied and the accumulated value is 0, executing an accumulated value determination game to determine an accumulated value of 1 or greater, and then executing a bonus game whose scale depends on the determined accumulated value.

In this embodiment, "specific symbol" means a symbol for incrementing a game-number (hereinafter "game-number addition symbol") 181. Meanwhile, as scatter symbols 180, there exist eight kinds of scatter symbols, which are "HERO", "JET", "VILLA", "GOLD BAR", "CAR", "STOCK CERTIFICATE", "RIVAL", and "DIAMOND"; and a game-number addition symbol 181, which is "UP".

Also in this embodiment, "bet operation" includes: a one-bet operation of making a one-bet which is a bet form of betting a minimum game value; and a maximum-bet operation of making a maximum-bet which is a bet form of betting a maximum game value that can be bet in one unit game. In addition, "predetermined condition" means that, in this embodiment, three to five scatter symbols of the same kind are rearranged in any row in a row direction. Here, a row direction is a direction perpendicular to the direction in which symbols scroll.

Further, "accumulated value" means a bonus game-number which is the number of unit games in a bonus game. In addition, "bonus game" means a gaming state which provides a larger advantage than a basic game. In this embodiment, "accumulated value determination game" means a bonus game-number determination game to determine a bonus game-number for a bonus game.

[Display 101]

Figure 2:
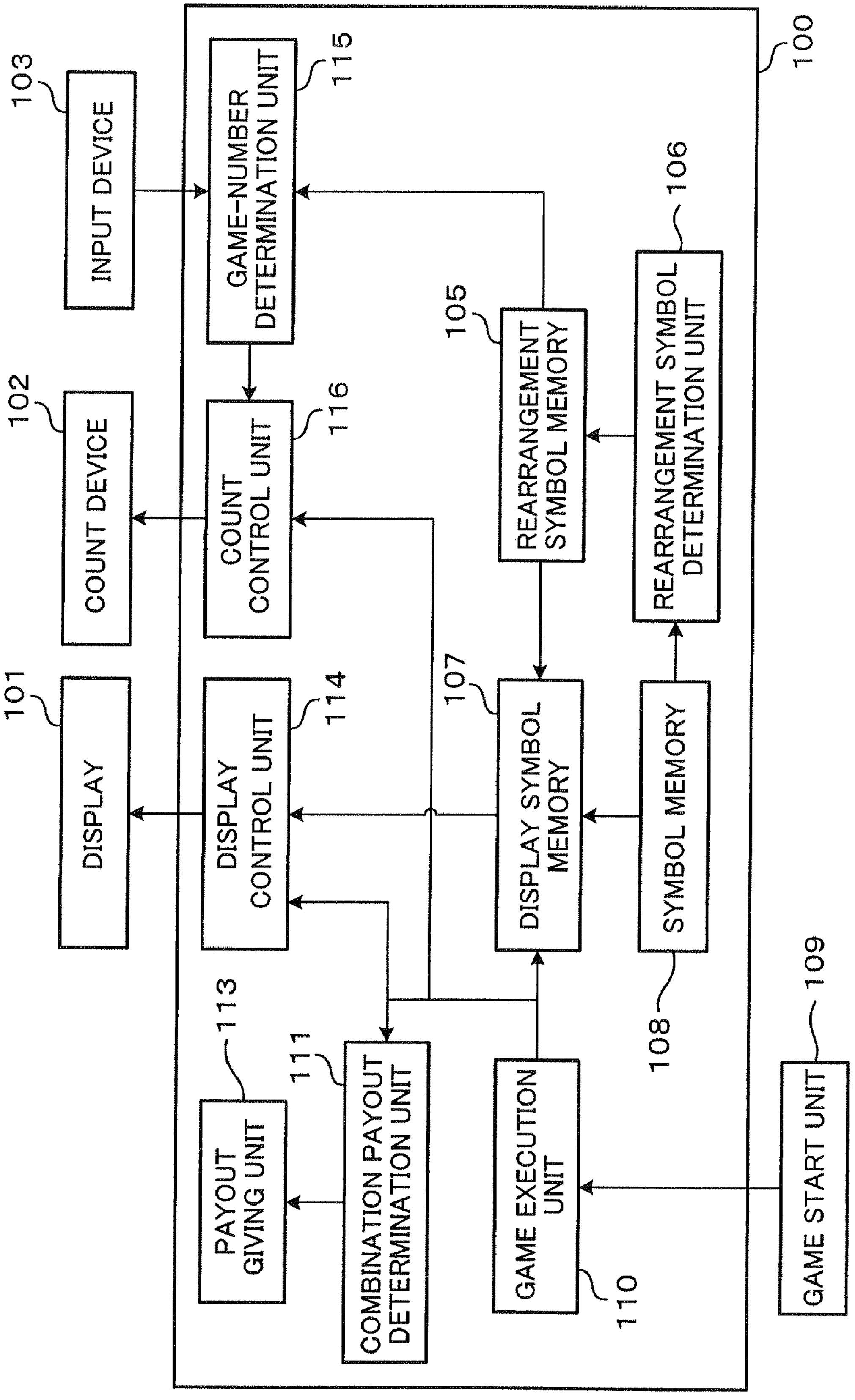
FIG. 2 is a block diagram of the slot machine.

As shown in FIG. 2, the slot machine which executes the above-described playing method has a display 101, a count device 102, an input device 103, and a controller 100. The display 101 has the matrix of arrangement areas 151 to 155. In these arrangement areas 151 to 155, more than one kinds of scatter symbols 180 are arranged.

Figure 3:
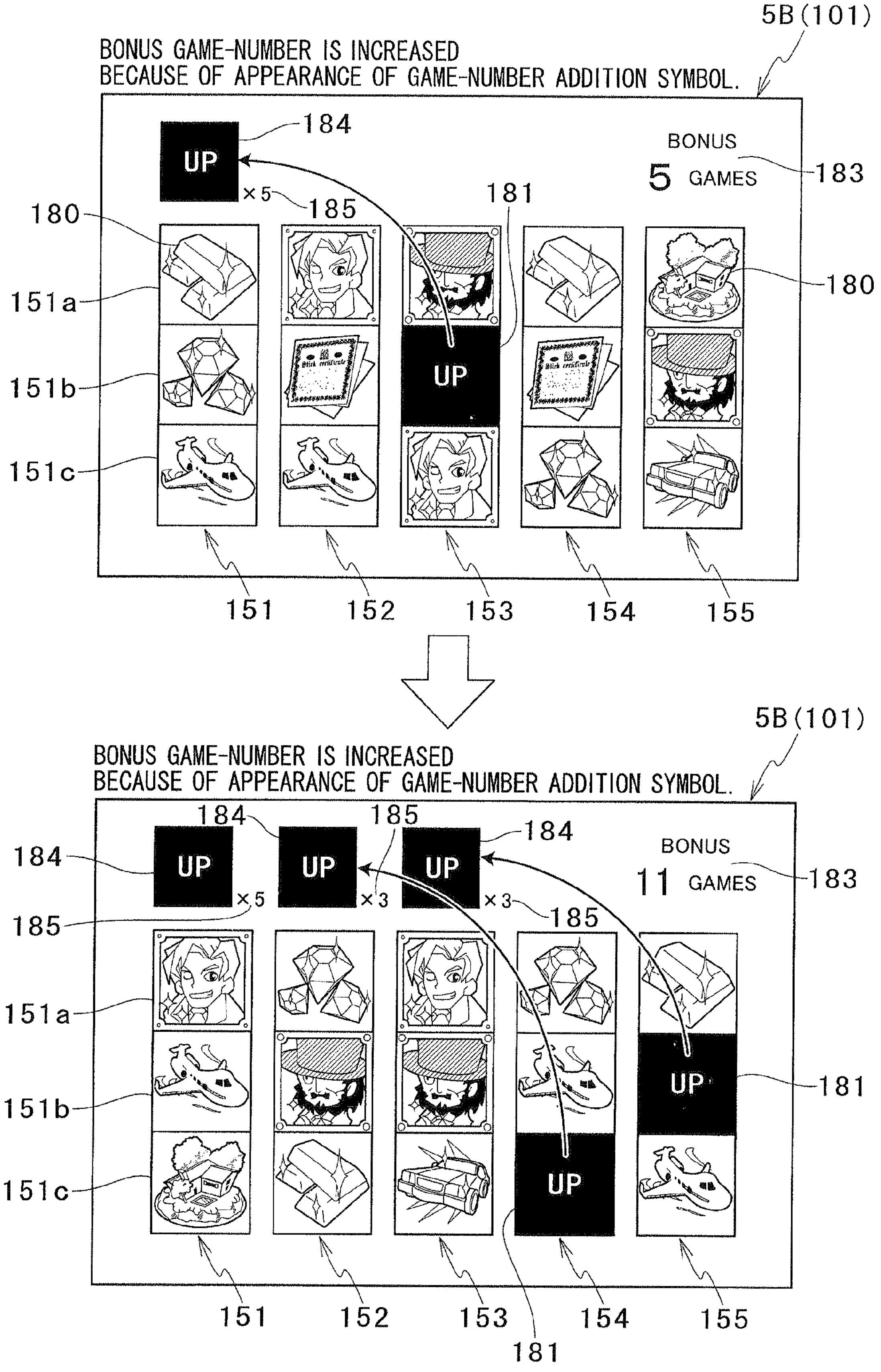
FIG. 3 is an explanatory view of a display screen.

Here, "arranged" means a state where scatter symbols 180 are visually identifiable by a player. In other words, it represents a state where scatter symbols 180 are displayed in the arrangement areas 151 to 155, as shown in FIG. 3. Meanwhile, "to rearrange" means to arrange scatter symbols 180 again after releasing them.

The display 101 may be mechanically structured with a reel device which arranges scatter symbols utilizing the rotation of a reel. Alternatively, the display 101 may have an electrical structure in which scatter symbols are arranged in a video reel displayed as an image. Further, the display 101 may have a structure of a combination of the mechanical structure (reels) and the electrical structure (video reels). The electrical structure may include a liquid crystal display device, a CRT (cathode-ray tube) device, a plasma display device, or the like. The specific structure of the display 101 will be detailed later.

[Count Device 102]

The count device 102 is configured to increment/decrement a bonus game-number for a bonus game. The bonus game-number is incremented every time a game-number addition symbol 181 is rearranged on the display 101.

The count device 102 may be mechanically structured with a counter which increments/decrements the bonus game-number, or may have an electrical structure in which the bonus game-number is displayed as an image. The electrical structure may include a liquid crystal display device, a CRT (cathode-ray tube) device, a plasma display device, or the like. The specific structure of the count device 102 will be detailed later.

[Input Device 103]

The input device 103 is configured to receive a one-bet operation and maximum-bet operation from outside. The input device 103 may be structured with buttons such as a later-mentioned one-bet button 76 and maximum-bet button 77, or may be structured with a touch panel or the like.

[Controller 100]

The controller 100 is configured to execute: a first process of rearranging scatter symbols 180 in the matrix of arrangement areas 151 to 155 of the display 101; a second process of giving a payout according to the number of scatter symbols 180 rearranged; a third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102; a fourth process of, when a predetermined condition is satisfied and the accumulated value is not 0, executing a bonus game whose scale depends on the accumulated value; and a fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value. In other words, the controller 100 has a first processing unit, a second processing unit, a third processing unit, a fourth processing unit, and a fifth processing unit.

The controller 100 has a symbol memory 108 which stores all the scatter symbols 180, and a display symbol memory 107 which stores scatter symbols to be displayed among the scatter symbols 180 stored in the symbol memory 108. The display symbol memory 107 can be accessed by a display control unit 114. In response to a control by a game execution unit 110, the display control unit 114 reads out the scatter symbols in the display symbol memory 107, and displays the scatter symbols on the display 101. A specific display state will be detailed later.

The controller 100 has a rearrangement symbol determination unit 106 which determines scatter symbols to be rearranged (hereinafter, rearrangement scatter symbols) every unit game, based on the scatter symbols 180 stored in the symbol memory 108. The rearrangement scatter symbols determined by the rearrangement symbol determination unit 106 are stored in a rearrangement symbol memory 105. Then, the rearrangement scatter symbols are output to the display symbol memory 107. After that, the rearrangement scatter symbols are displayed on the display 101 through image processing performed in the display control unit 114. That is, the controller 100 executes the first process of rearranging scatter symbols 180 in the matrix of arrangement areas 151 to 155 of the display 101.

Further, the controller 100 is connected to a game start unit 109. The game start unit 109 has a function of outputting a game start signal in response to an operation by a player. The controller 100 has: the game execution unit 110 which executes a unit game of rearranging scatter symbols 180, triggered by a game start signal from the game start unit 109; a combination payout determination unit 111 which determines a payout according to the number of scatter symbols 180 rearranged in a unit game; and a payout giving unit 113 which gives a payout determined by the combination payout determination unit 111. That is, the controller 100 executes the second process of giving a payout according to the number of scatter symbols 180 rearranged.

Further, the controller 100 has a game-number determination unit 115, and a count control unit 116. To the game-number determination unit 115 are input: rearrangement scatter symbols determined by the rearrangement symbol determination unit 106 and stored in the rearrangement symbol memory 105; and the type of bet operation received by the input device 103 from outside.

Based on the rearrangement scatter symbols input from the rearrangement symbol memory 105, the game-number determination unit 115 determines if a game-number addition symbol 181 is rearranged or not as a result of a rearrangement of scatter symbols 180 in a unit game. Then, when it is determined that a game-number addition symbol 181 is rearranged, the game-number determination unit 115 determines a bonus game-number to be added (“addition-number”), based on the number of game-number addition symbols 181 rearranged and the type of bet operation received by the input device 103 from outside.

The count control unit 116 causes the count device 102 to add the addition-number determined by the game-number determination unit 115 to the bonus game number, at a timing of rearrangement of scatter symbols 180 on the display 101. That is, the controller 100 executes the third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102.

The game execution unit 110 executes a bonus game when a predetermined condition is satisfied. In the bonus game, a free game is carried out, of which number of times is same as the bonus game-number that the count device 102 has, at a time of satisfaction of the predetermined condition, for increment/decrement operation. Every time a free game is carried out, the count control unit 116 causes the count device 102 to decrement the bonus game-number by 1. Meanwhile, when the predetermined condition is satisfied and the bonus game-number incremented/decremented by the count device 102 is “0”, the game execution unit 110 executes a bonus game-number determination game, and executes a bonus game after the bonus game-number incremented/decremented by the count device 102 becomes “1” or greater. That is, the controller 100 executes the fourth process of, when a predetermined condition is satisfied and the accumulated value (bonus game-number) is not 0, executing a bonus game whose scale depends on the accumulated value; and the fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

Each of the blocks of the controller 100 may be realized in the form of hardware or in the form of software if necessary.

[Operation of Controller 100]

The following describes an operation of the controller 100 having the above-described structure. First, rearrangement scatter symbols are determined by the rearrangement symbol determination unit 106. The rearrangement scatter symbols determined are stored in the rearrangement symbol memory 105. Then, the rearrangement scatter symbols stored in the rearrangement symbol memory 105 are stored in the display symbol memory 107 and the game-number determination unit 115. Then, the rearrangement scatter symbols stored in the display symbol memory 107 are prepared to be displayed by the display control unit 114 on the display 101. When the game execution unit 110 executes a unit game, scatter symbols 180 are rearranged by having the display 101 display thereon the rearrangement scatter symbols stored in the display symbol memory 107. Thus, the controller 100 executes the first process of rearranging scatter symbols 180 in the matrix of arrangement areas 151 to 155 of the display 101.

Then, the combination payout determination unit 111 and the payout giving unit 113 give a payout according to the number of scatter symbols 180 rearranged. Thus, the controller 100 executes the second process of giving a payout according to the number of scatter symbols 180 rearranged.

On the other hand, the rearrangement scatter symbols stored in the game-number determination unit 115 are used for determining a bonus game-number. Specifically, when a game-number addition symbol 181 is rearranged as a result of a rearrangement of scatter symbols 180, the bonus game-number to be added (“addition-number”) is determined based on the number of game-number addition symbols 181 rearranged and the type of bet operation received by the input device 103 from outside. On the other hand, when no game-number addition symbol 181 is rearranged, the addition-number is not determined.

The addition-number determined by the game-number determination unit 115 is output to the count control unit 116. Then, the addition-number determined by the game-number determination unit 115 is added by the count control unit 116 to the bonus game-number of the count device 102, at a timing of rearrangement of scatter symbols 180 on the display 101. Thus, the controller 100 executes the third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102.

Then, when a predetermined condition is satisfied, a bonus game is executed by the game execution unit 110. In the bonus game, a free game is carried out, of which number of times is same as the bonus game-number that the count device 102 has, at a time of satisfaction of the predetermined condition, for increment/decrement operation. Every time a free game is carried out, the bonus game-number incremented/decremented by the count device 102 is decreased by 1 by the count control unit 116. Meanwhile, when the predetermined condition is satisfied and the bonus game-number incremented/decremented by the count device 102 is “0”, a bonus game-number determination game is executed by the game execution unit 110, and a bonus game is executed after the bonus game-number incremented/decremented by the count device 102 becomes “1” or greater. Thus, the controller 100 executes the fourth process of, when a predetermined condition is satisfied and the accumulated value (bonus game-number) is not 0, executing a bonus game whose scale depends on the accumulated value; and the fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

As clearly seen from the above operations, as well as shown in FIG. 1, the slot machine 1 realizes a playing method including: rearranging scatter symbols 180 in the matrix of arrangement areas 151 to 155 of the display 101; giving a payout according to the number of scatter symbols 180 rearranged; when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102; when a predetermined condition is satisfied and the accumulated value is not 0, executing a bonus game whose scale depends on the accumulated value; and when the predetermined condition is satisfied and the accumulated value is 0, executing an accumulated value determination game (bonus game-number determination game) to determine an accumulated value of 1 or greater, and then executing a bonus game whose scale depends on the determined accumulated value.

According to the above playing method, when a specific symbol (game-number addition symbol) 181 is rearranged in the arrangement areas 151 to 155, a value determined based on the number of specific symbols 181 rearranged and the type of bet operation received by the input device 103 is added to the accumulated value (bonus game-number) incremented/decremented by the count device 102. Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game (bonus game-number determination game) to determine an accumulated value of 1 or greater, and then executed is a bonus game whose scale depends on the determined accumulated value. Thus, the accumulated value, which is incremented due to a rearrangement of a specific symbol 181, enables a player to recognize in advance the scale of a bonus game to be executed at a time of satisfaction of the predetermined condition. Therefore, the player’s expectation for the bonus game is likely to be increased.

[Display State]

Specifically described hereinafter is an exemplary display state of the display 101 in the slot machine 1 and in the operation process of the playing method thereof. The following description deals with a case where scatter symbols are arranged on the display 101 of a video reel-type, as shown in FIG. 3.

The display 101 has arrangement areas 151, 152, 153, 154, and 155 in which scatter symbols 180 are arranged. In the arrangement areas 151, 152, 153, 154, and 155, symbol columns having more than one scatter symbols 180 are scroll-displayed, respectively. Each of the arrangement areas 151, 152, 153, 154, and 155 is divided into an upper row 151*a*, a middle row 151*b*, and a lower row 151*c*. Scatter symbols 180 are stopped (arranged) in the rows 151*a*, 151*b*, and 151*c* of the respective arrangement areas. For example, in FIG. 3, “GOLD BAR” is stopped in the upper row 151*a* of the arrangement area 151, “DIAMOND” is stopped in the middle row 151*b* of the arrangement area 151, and “JET” is stopped in the lower row 151*c* of the arrangement area 151. Thus, the arrangement areas 151, 152, 153, 154, and 155 display a symbol matrix of five columns and three rows. Note that the symbol matrix is not limited to a matrix of five columns and three rows.

This embodiment deals with a case where a process of paying out a coin or the like is performed when a predetermined number (e.g., four) or more scatter symbols of a same kind are displayed in the symbol matrix. However, it is possible to employ such a configuration that, for example, a payline L is provided so as to cross the middle row 151*b* of the arrangement areas 151, 152, 153, 154, and 155, and a coin is paid out when scatter symbols stopped on the payline L correspond to a predetermined combination.

As shown in FIG. 3, when a game-number addition symbol 181 is rearranged, an addition icon 184 imitating a game-number addition symbol 181, and an addition game-number icon 185 are displayed above the arrangement areas 151, 152, 153, 154, and 155. In addition, the bonus game-number displayed on a bonus game-number indicator 183 of the display 101 is increased by the value indicated by the addition game-number icon 185. Every time a game-number addition symbol 181 is rearranged, another addition icon 184 and addition game-number icon 185 are displayed in an addition manner, and the bonus game-number displayed on the bonus game-number indicator 183 is incremented.

Here, the game-number to be added (“addition game-number”) corresponding to one game-number addition symbol 181 is different depending on the type of bet operation. In this embodiment, when a unit game is played through a one-bet operation, the addition game-number is “1”. When a unit game is played through a maximum-bet operation, the addition game-number is any one of “1” to “5”. As described later, the addition game-number in the case of a maximum-bet operation is randomly determined from the numbers of “1” to “5”.

Figure 4:
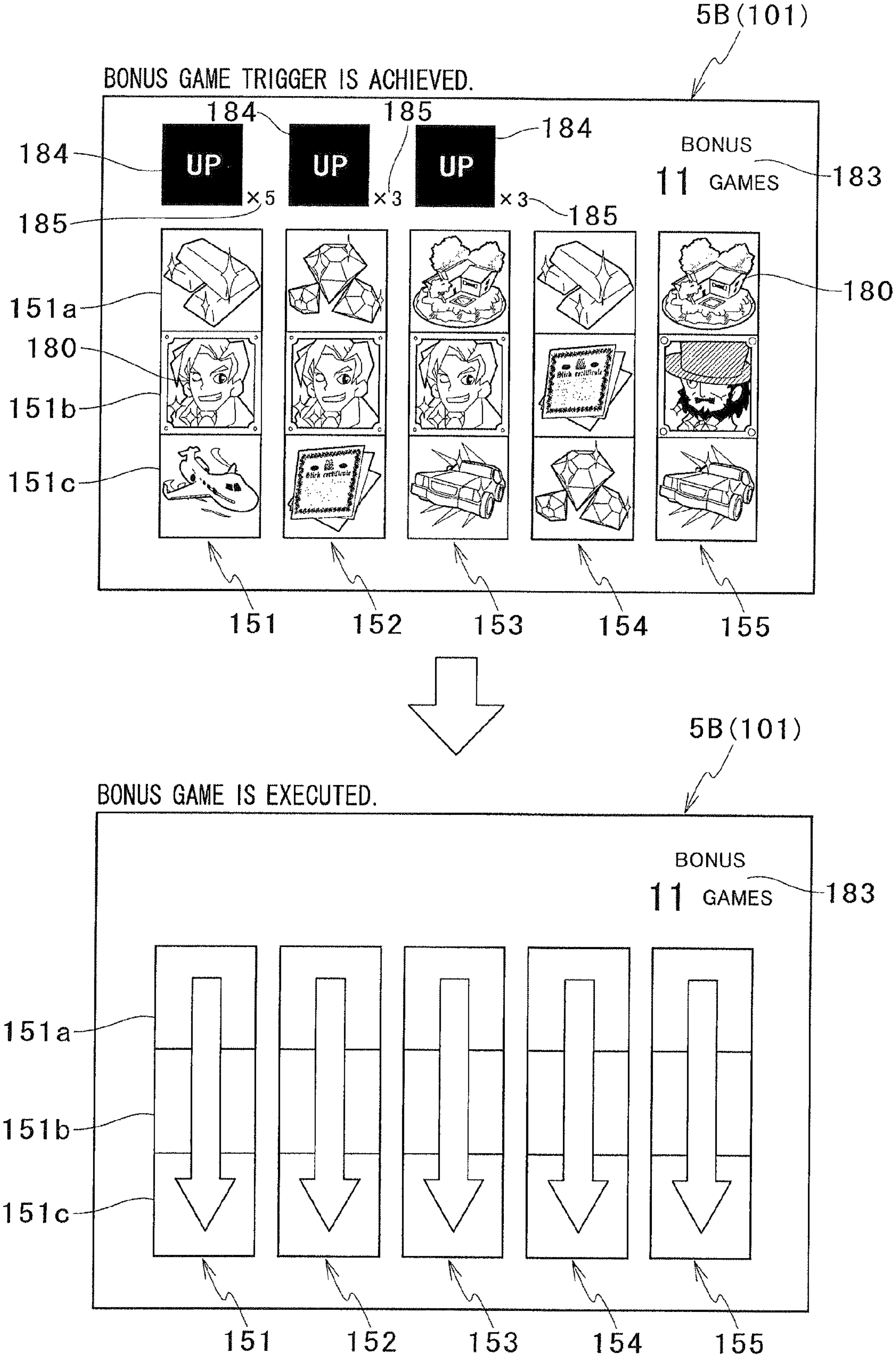
FIG. 4 is another explanatory view of the display screen.

As shown in FIG. 4, when a predetermined number (three to five) scatter symbols of the same kind are rearranged in any row in a row direction, a bonus game is triggered and executed. In FIG. 4, three scatter symbols 180 of the same kind ("HERO") are rearranged in the middle row 151*b* of the arrangement areas 151, 152, and 153. This triggers a bonus game so that a bonus game is executed.

In this embodiment, a bonus game is a free game. In a free game, a unit game can be played without betting a coin, the number of games being same as the bonus game-number displayed on the bonus game-number indicator 183.

Figure 5:
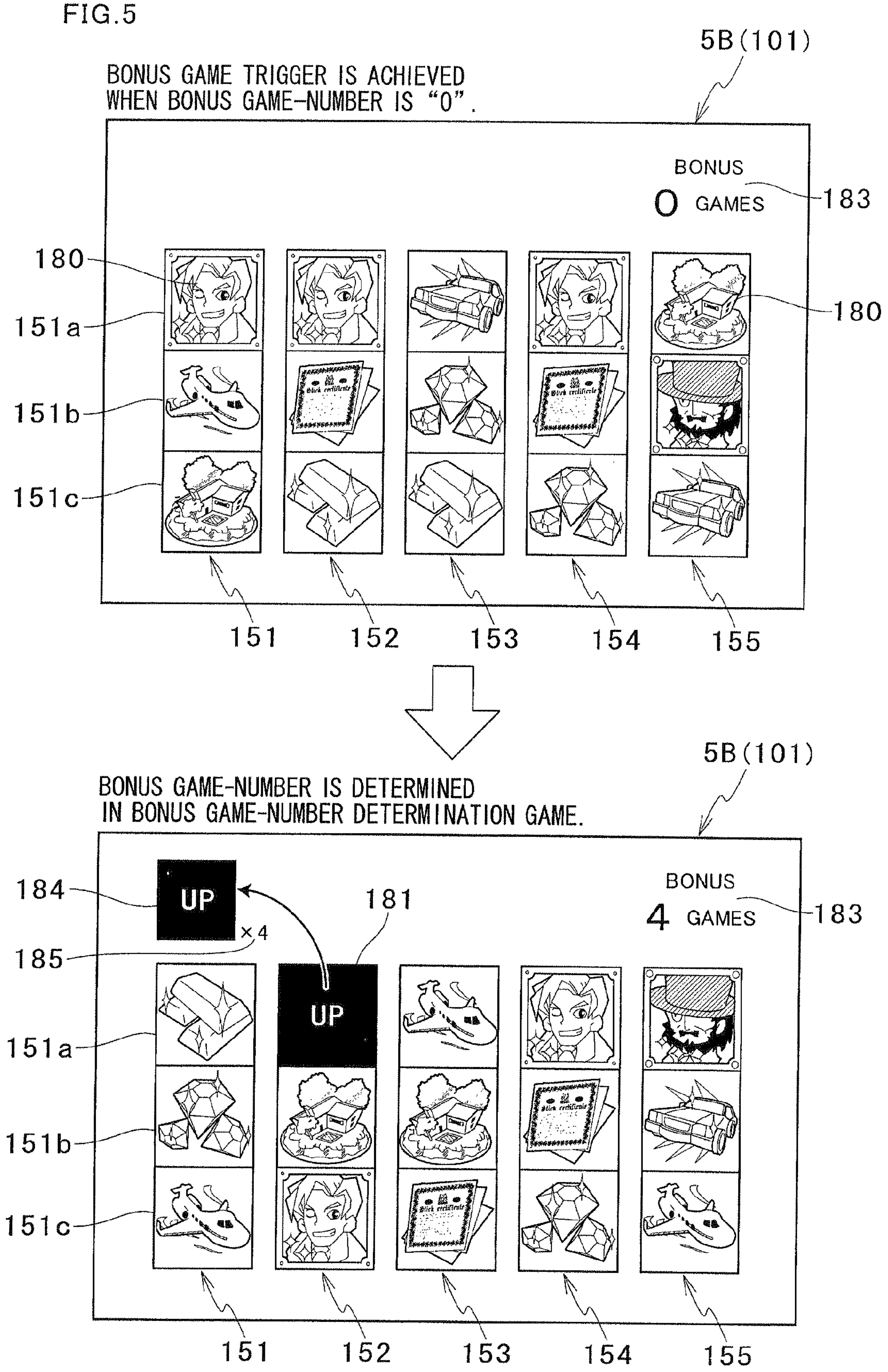
FIG. 5 is another explanatory view of the display screen.

In the meantime, as shown in FIG. 5, when the bonus game-number displayed on the bonus game-number indicator 183 is "0" and a bonus game trigger is achieved, a bonus game-number determination game is executed. In FIG. 5, three scatter symbols 180 of the same kind ("HERO") are rearranged in the upper row 151*a* of the arrangement areas 151, 152, and 154. With this, a bonus trigger is achieved, so that a bonus game-number determination game is executed.

In this embodiment, a bonus game-number determination game is a game without a payout, in which scatter symbols 180 are scroll-displayed and rearranged. In a bonus game-number determination game, scroll-display and rearrangement of scatter symbols 180 are repeated three times to determine a bonus game-number of "1" or greater, as a result of a rearrangement of a game-number addition symbol 181. When a bonus game-number of "1" or greater is not determined even if a bonus game-number determination game is repeated three times, the bonus game-number determination game is repeated until a bonus game-number of "1" or greater is determined. After a bonus game-number of "1" or greater is determined, a bonus game is executed.

Another structure is possible, as for the case where the bonus game-number is "0" and a bonus game trigger is achieved, such that: a predetermined number (e.g. three) is used as a bonus game-number to execute a bonus game; no bonus game is executed; or execution of a bonus game is suspended, and the suspended bonus game is executed at a timing that the bonus game-number becomes "1" or greater.

[Scatter Symbols]

As shown in FIG. 6, scatter symbols 180 displayed in the arrangement areas 151, 152, 153, 154, and 155 of the display 101 constitute symbol columns, each symbol column having twenty-two scatter symbols. Each symbol of each symbol column has a code number, any one of numbers from 0 to 21. Each symbol column is constituted of a combination of scatter symbols of "HERO", "JET", "VILLA", "GOLD BAR", "CAR", "STOCK CERTIFICATE", "RIVAL", "DIAMOND", and "UP".

Successive three scatter symbols of each symbol column are displayed (arranged) respectively in the upper row 151*a*, the middle row 151*b*, and the lower row 151*c* of each of the arrangement areas 151, 152, 153, 154, and 155, thereby constituting a symbol matrix of five columns and three rows. When a later-mentioned bet button and a spin button are sequentially pressed in this order to start a game, scatter symbols constituting a symbol matrix start to scroll. After the symbols are scrolled for a predetermined period of time, the scrolling of symbols stops (symbols are rearranged).

When a predetermined number or more scatter symbols of a same kind are displayed in the arrangement areas 151, 152, 153, 154, and 155, a player gets an advantage. To get an advantage means that coins are paid out according to scatter symbols displayed, the value of coins to be paid out is added to a credit value, a bonus game is started, or the like.

Specifically, when four or more scatter symbols of a same kind are rearranged in the arrangement areas 151, 152, 153, 154, and 155, twenty coins (game media) are paid out for one bet. When a predetermined number (three to five) of scatter symbols of a same kind are rearranged in any row in a row direction, a bonus game is triggered. This causes a transition of gaming state from a basic game to a bonus game.

Here, a bonus game is a gaming state which provides a larger advantage than a basic game. In this embodiment, the bonus game is a free game. The free game is a game in which a unit game can be played without betting a coin. Note that another bonus game may be employed in combination, provided that the other bonus game is advantageous to a player, i.e., the other bonus game is more advantageous than a basic game. For example, that other bonus game which may be employed is a game providing: a state where a larger amount of game media can be obtained than in a basic game; a state where game media can be obtained more likely than in a basic game; or a state where a smaller amount of game media are consumed than in a basic game.

[Mechanical Structure of the Slot Machine 1]

Next, the following describes a specific example of mechanical and electrical structures of the slot machine 1 thus structured.

Figure 7:
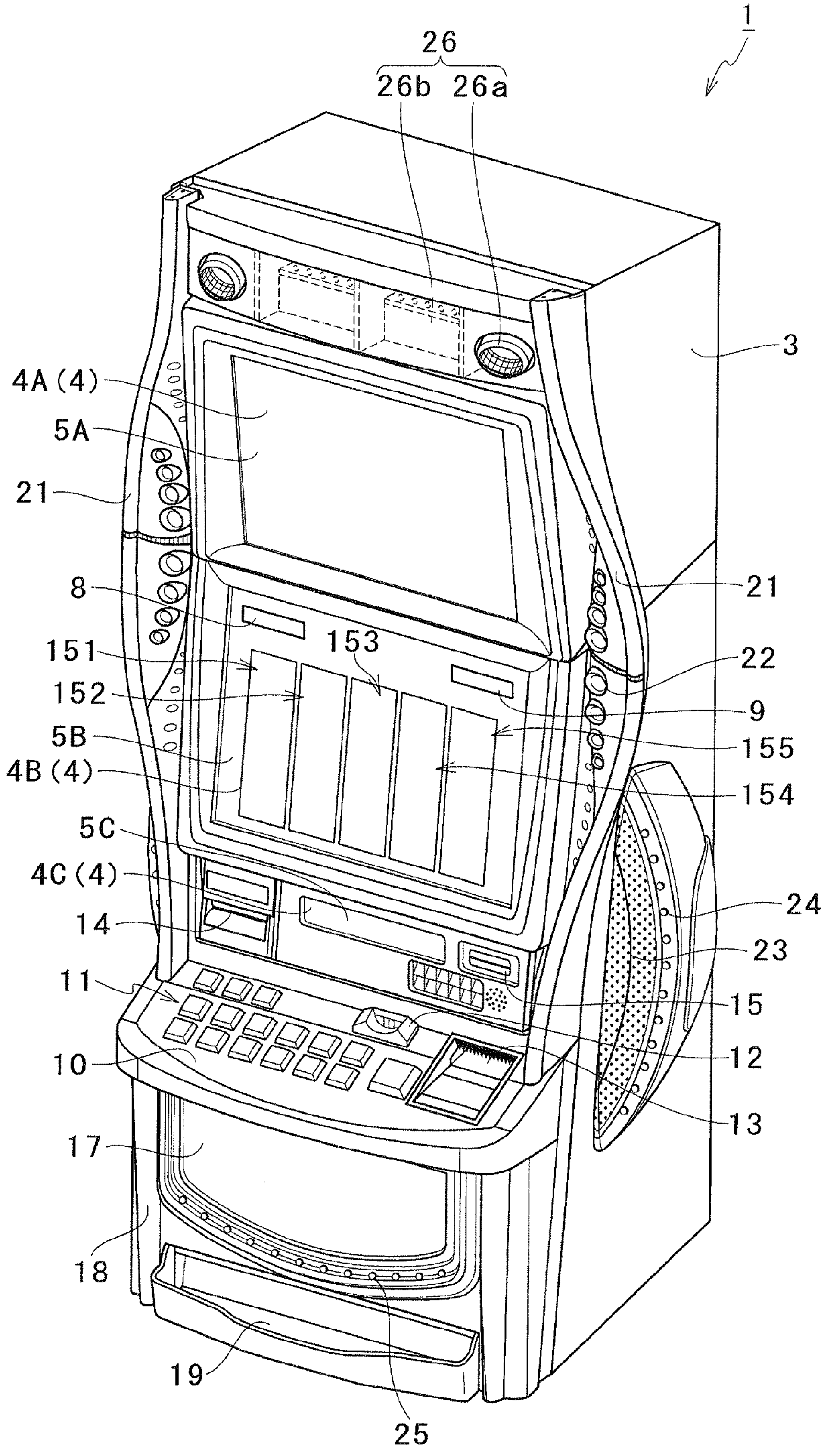
FIG. 7 is a perspective view illustrating an appearance of the slot machine.

As shown in FIG. 7, the slot machine 1 is an upright slot machine and has a cabinet 3 for housing electrical or mechanical components for executing a predetermined game mode. As a display unit 4 for displaying game information in response to a player's game operation, there may be provided an upper variable display unit 4A, a middle variable display unit 4B, and a lower variable display unit 4C. The display units 4A to 4C are attached to the front face of the cabinet 3 having a longer length in the vertical direction.

The upper variable display unit 4A has a transparent upper liquid crystal panel 5A fixed to a front door of the cabinet 3. The upper liquid crystal panel 5A displays thereon an image showing, for example, an effect image, an introduction of a game, or rules of the game.

The middle variable display unit 4B is a display panel for rotating symbols, which is to be constantly viewed by a player. The middle variable display unit 4B has a transparent center liquid crystal panel 5B (display 101) fixed to the front door of the cabinet 3. On the center liquid crystal panel 5B, five arrangement areas 151, 152, 153, 154, and 155 are displayed. Further, on the center liquid crystal panel 5B, an effect of moving images is performed at a time of winning or the like. Further, in an upper portion of the center liquid crystal panel 5B, a payout number indicator 8 and a credit number indicator 9 are displayed.

The lower variable display unit 4C has a lower liquid crystal panel 5C which displays the number of points stored in a card or the number of points of a game. Such a number is displayed on the lower liquid crystal panel 5C based on a result displayed on the middle variable display unit 4B. When a winning combination is achieved in the middle variable display unit 4B, the number of points of the game displayed on the lower liquid crystal panel 5C is increased according to the type of the winning achieved. On the left of the lower liquid crystal panel 5C, a ticket printer 14 is provided. On the right of the lower liquid crystal panel 5C, a card reader 15 is provided. Note that winning means an occasion where four or more scatter symbols of the same kind are rearranged, awarding various payouts according to the result.

Below the lower variable display unit 4C is disposed an operation table 10 which protrudes forward from the front face of the cabinet 3. On the operation table 10, there are arranged operation buttons 11 (e.g., a spin button 73, change button 74, cash-out button 75, one-bet button 76, maximum bet button 77, or the like) serving as a control panel which enables a player to perform a game-related operation. In addition, the operation table 10 is provided with a coin insertion slot 12 and a bill insertion slot 13.

Below the operation table 10, a waist-high panel 17 is disposed. The waist-high panel 17 is a plastic panel having a game-related image printed thereon. This waist-high panel 17 is fixed to a lower front door 18 and illuminated by a cold cathode tube. Further, below the waist-high panel 17 is disposed a coin receiving tray 19 for storing a coin paid out based on a game result.

Further, lamps 30 are disposed on the cabinet 3 of the slot machine 1 so as to surround game areas including the upper variable display unit 4A, the middle variable display unit 4B, the lower variable display unit 4C, and the operation table 10. The lamps 30 include side lamps 22, speaker lamps 24, under lamps 25, and top lamps 26. The side lamps 22 are provided on inclined parts 21 provided at the front right and front left of the cabinet 3, each of which parts protruding in a bow shape so as to extend over the upper variable display unit 4A, the middle variable display unit 4B and the lower variable display unit 4C. The speaker lamps 24 are provided on arc-shaped speakers 23 which protrudes sideways at the right and a left ends of the cabinet 3 adjacent to the operation table 10. The speaker lamps 24 are arranged along edges of the speakers 23. The under lamps 25 are provided on the lower front door 18 and arranged along a lower edge of the waist-high panel 17. The top lamps 26 are provided above the upper variable display unit 4A. The top lamps include power lamps 26*a* disposed at both sides respectively and band-type lamps 26*b* arranged in a horizontal direction between the power lamps.

[Electrical Structure of the Slot Machine 1]

Figure 8:
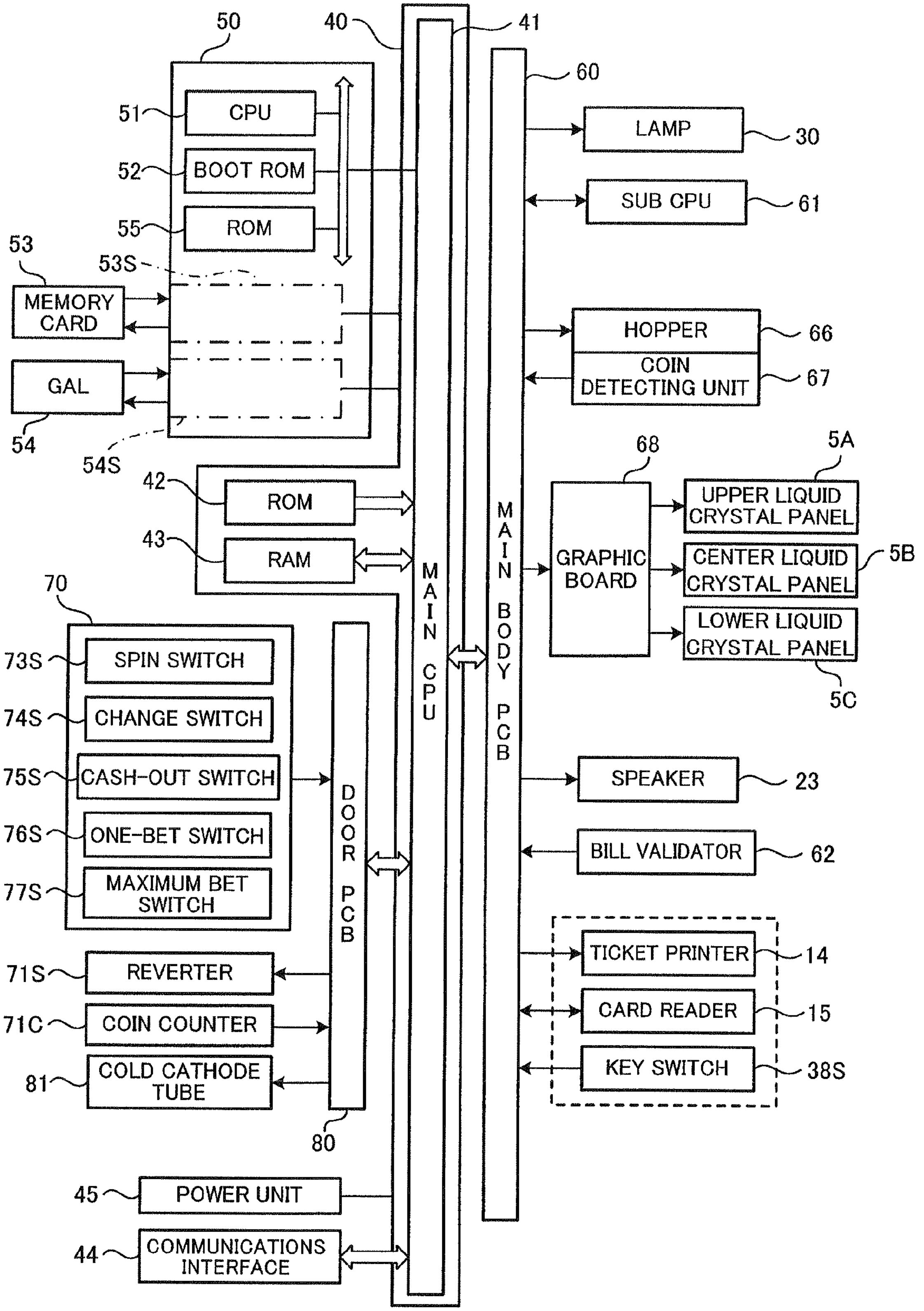
FIG. 8 is a block diagram illustrating a control board of the slot machine.

Inside the cabinet 3 is provided a control unit including the controller 100 of FIG. 2. As shown in FIG. 8, the control unit includes components such as a motherboard 40, a main body PCB (Printed Circuit Board) 60, a gaming board 50, a sub CPU 61, a door PCB 80, various switches, and a sensor.

The gaming board 50 is provided with a CPU (Central Processing Unit) 51, a ROM 55 and a boot ROM 52, a card slot 53S for a memory card 53, and an IC socket 54S for a GAL (Generic Array Logic) 54, which are connected to one another through an internal bus.

The memory card 53 stores therein a game program and a game system program. The game program contains a program to determine symbols to be stopped (hereinafter "stop symbol determination program"). The stop symbol determination program is a program for determining a symbol matrix of five columns and three rows. This stop symbol determination program contains sets of symbol weighting data respectively correspond to several kinds of payout rates (e.g., 80%, 84%, and 88%). Each set of symbol weighting data indicates, for each of the arrangement areas 151, 152, 153, 154, and 155, a relation between a code number of each symbol and at least one random number values. The random number value is a value within a predetermined range of 0 to 256 for example.

A payout rate is set based on payout rate setting data output from the GAL 54. Rearrangement symbols are determined based on a set of symbol weighting data corresponding to the payout rate set.

The memory card 53 stores therein various types of data for use in the game program and game system program. Specifically, the memory card 53 stores, in the form of table, data indicating relations between scatter symbols 180 displayed in the arrangement areas 151, 152, 153, 154, and 155 of FIG. 3 and a range of random number values. This data is transferred to a RAM 43 of the motherboard 40, at a time of execution of the game program.

The card slot 53S is structured so that the memory card 53 is inserted/removed thereto/therefrom. This card slot 53S is connected to the motherboard 40 via an IDE bus. Thus, the type and content of a game run by the slot machine 1 can be modified by removing the memory card 53 from the card slot 53S, writing a different game program and game system program into the memory card 53, and inserting the memory card 53 back to the card slot 53S.

The game program includes a program related to the progress of a game and/or a program for causing a transition to a bonus game. Also, the game program includes image data and audio data output during a game.

The GAL 54 has input ports and output ports. Upon the input of data to an input port, the GAL 54 outputs data corresponding to the input data from an output port. This data output from the output port is the before-mentioned payout rate setting data.

The IC socket 54S is structured so that the GAL 54 is attached/detached thereto/therefrom. The IC socket 54S is connected to the motherboard 40 via a PCI bus. Thus, the payout rate setting data to be output from the GAL 54 can be modified by detaching GAL 54 from the IC socket 54S, overwriting a program stored in the GAL 45, and attaching the GAL45 back to the IC socket 54S.

The CPU 51, the ROM 55, and the boot ROM 52, which are connected to one another via the internal bus, are connected to the motherboard 40 via the PCI bus. The PCI bus communicates a signal between the motherboard 40 and the gaming board 50, and supplies power from the motherboard 40 to the gaming board 50. The ROM 55 stores therein country identification information and an authentication program. The boot ROM 52 stores therein a preliminary authentication program, a program (boot code) for enabling the CPU 51 to run the preliminary authentication program, or the like.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (controller), a ROM (Read Only Memory) 42, the RAM (Random Access Memory) 43, and a communications interface 44.

The main CPU 41 serves as a controller that controls the overall slot machine 1. Specifically, the main CPU 41 performs the controls of: outputting a command signal, upon pressing the spin button 73 after a bet of credit, to the sub CPU 61 so as to scroll-display scatter symbols on the center liquid crystal panel 5B; determining symbols to be stopped after the scroll-display of symbols; and stopping the determined symbols in the arrangement areas 151, 152, 153, 154, and 155.

That is, the main CPU 41 functions as an arrangement controller to execute an arrangement control by which, among various kinds of scatter symbols, symbols to be arranged in a symbol matrix are selected and determined, and then scrolling of the symbols is stopped so that the determined symbol matrix appears. With this function, scatter symbols displayed while being scrolled on the center liquid crystal panel 5B are rearranged in a new symbol matrix.

The main CPU 41 functions as a controller 100 which executes: the first process of rearranging scatter symbols 180 in the matrix of arrangement areas 151 to 155 of the display 101 (center liquid crystal panel 5B); the second process of giving a payout according to the number of scatter symbols 180 rearranged; the third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 (operation buttons 11) to an accumulated value (bonus game-number) incremented/decremented by the count device 102 (center liquid crystal panel 5B); the fourth process of, when a predetermined condition is satisfied and the accumulated value is not 0, executing a bonus game whose scale depends on the accumulated value; and the fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

The ROM 42 stores a program such as BIOS (Basic Input/Output System) run by the main CPU 41, and data that is permanently used. When the BIOS is run by the main CPU 41, each of peripheral devices is initialized and the game program and the game system program stored in the memory card 53 are read out through the gaming board 50.

The RAM 43 stores data or program used for the main CPU 41 to perform a process. For example, in the RAM 43 are formed: the symbol memory 108, the display symbol memory 107, and the rearrangement symbol memory 105, which are shown in FIG. 2, in the forms of data areas, respectively. In the data area of the symbol memory 108, scatter symbols 180 are stored in the form of a data table of FIG. 6. In the data area of the rearrangement symbol memory 105, rearrangement symbols are stored. In the data area of the display symbol memory 107, a symbol matrix is stored.

The communications interface 44 communicates via a communication line with a host computer or the like provided in a game arcade. The motherboard 40 is connected to the main body PCB (Printed Circuit Board) 60 and the door PCB 80 through USBs (Universal Serial Buses). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51.

The main body PCB 60 and the door PCB 80 are connected to: a device or apparatus which generates an input signal to be input to the main CPU 41; and a device or apparatus controlled by a control signal output from the main CPU 41. The main CPU 41 runs the game program and the game system program stored in the RAM 43 based on the input signal input to the main CPU 41, to carry out an arithmetic process, thereby storing a result thereof in the RAM 43 or transmitting a control signal to each device or apparatus to control them.

The main body PCB 60 is connected to the lamps 30 (to be more specific, the side lamps 22, the speaker lamps 24, the under lamps 25, and the top lamps 26), the sub CPU 61, a hopper 66, a coin detecting unit 67, a graphic board 68, the speakers 23, a bill validator 62, the ticket printer 14, the card reader 15, and a key switch 38S.

The lamps 30 are turned on/off based on a control signal output from the main CPU 41. The sub CPU 61 controls an operation of scrolling symbols in the arrangement areas 151 to 155, and is connected to a later-mentioned VDP (Video Display Processor). The VDP reads out image data of symbols stored in an image data ROM (not shown), and then generates an image of scrolling symbols to be displayed in the arrangement areas 151, 152, 153, 154, and 155 to output the image to the center liquid crystal panel 5B.

The hopper 66 is provided in the cabinet 3, and pays out a predetermined number of coins from a coin payout opening to the coin receiving tray 19 based on a control signal output from the main CPU 41. The coin detecting unit 67 is provided inside the coin payout opening, and outputs an input signal to the main CPU 41 when detecting that a predetermined number of coins are paid out from the coin payout opening.

The graphic board 68 controls image displaying of the upper liquid crystal panel 5A, the center liquid crystal panel 5B, and the lower liquid crystal panel 5C, based on a control signal output from the main CPU 41. The graphic board 68 is provided with a VDP which generates image data based on a control signal output from the main CPU 41, a video RAM which temporarily stores image data generated by the VDP, and the like.

The bill validator 62 reads an image on a bill inserted to the bill insertion slot 13 and accepts a genuine bill into the cabinet 3. When accepting a genuine bill, the bill validator 62 outputs an input signal to the main CPU 41 corresponding to the amount of the bill. The main CPU 41 stores in the RAM 43 the number of credits corresponding to the amount of the bill transmitted by the input signal.

Based on a control signal output from the main CPU 41, the ticket printer 14 prints a bar code on a ticket, and then outputs the ticket with a bar code. Data such as the number of credits stored in the RAM 43, time and date, identification number of a slot machine 1, or the like is encoded to the bar code.

The card reader 15 reads data from a smart card to transmit them to the main CPU 41, or write data to a smart card based on a control signal from the main CPU 41. The key switch 38S is mounted on a keypad (not shown), and outputs an input signal to the main CPU 41 in response to an operation of the keypad by a player.

The door PCB 80 is connected to a control panel 70, a reverter 71S, a coin counter 71C, and a cold cathode tube 81. The control panel 70 is provided with: a spin switch 73S corresponding to the spin button 73, a change switch 74S corresponding to the change button 74, a cash-out switch 75S corresponding to the cash-out button 75, a one-bet switch 76S corresponding to the one-bet button 76, and a maximum bet switch 77S corresponding to the maximum-bet button 77. The switches 735 to 77S output input signals to the main CPU 41 upon operations of the corresponding buttons 73 to 77 by a player, respectively.

The coin counter 71C is provided inside the coin insertion slot 12, and validates whether a coin inserted by a player into the coin insertion slot 12 is genuine. Anything other than a genuine coin is discharged to the coin receiving tray 19. The coin counter 71C outputs an input signal to the main CPU 41 when detecting a genuine coin.

The reverter 71S is operated based on a control signal output from the main CPU 41. The reverter 71S distributes a coin that is recognized as genuine by the coin counter 71C to a cash box (not shown) or the hopper 66 mounted in the slot machine 1. In other words, when the hopper 66 is filled with coins, the reverter 71S distributes a genuine coin to the cash box. On the other hand, when the hopper 66 is not filled with coins, a genuine coin is distributed to the hopper 66. The cold cathode tube 81 functions as a backlight mounted to the rear sides of the upper liquid crystal panel 5A and the center liquid crystal panel 5B. The cold cathode tube 81 is turned on based on a control signal output from the main CPU 41.

[Addition Game-Number Determination Table]

The following describes an addition game-number determination table used for determining an addition game-number per game-number addition symbol 181 when a game-number addition symbol 181 is rearranged. The addition game-number determination table is stored in the ROM 42 of the motherboard 40.

As shown in FIG. 9, the addition game-number determination table includes bet forms, pattern-numbers of 1 to 6, and addition game-numbers per symbol associated with one another. Specifically, the bet form of maximum-bet is associated with the pattern-numbers of 1 to 5, and the pattern-number "1" is associated with the addition game-number per symbol of "1". The pattern-number "4" is associated with the addition game-number per symbol of "4". In the case where a maximum-bet operation has been made, a pattern-number is randomly determined from the pattern-numbers 1 to 5, so that an addition game-number per symbol is determined.

On the other hand, the bet form of one-bet is associated with the pattern-number "6", and the pattern-number "6" is associated with the addition game-number per symbol of "1". That is, in the case where a one-bet operation has been made, the addition game-number per symbol of "1" is determined. Thus, an addition game-number to be added in the case of maximum-bet operation is larger than an addition game-number to be added in the case of one-bet operation. This encourages a player to carry out a maximum-bet operation.

[Process Operation of the Slot Machine 1]

Next, the process operation of the slot machine 1 will be described.

[Boot Process]

Figure 10:
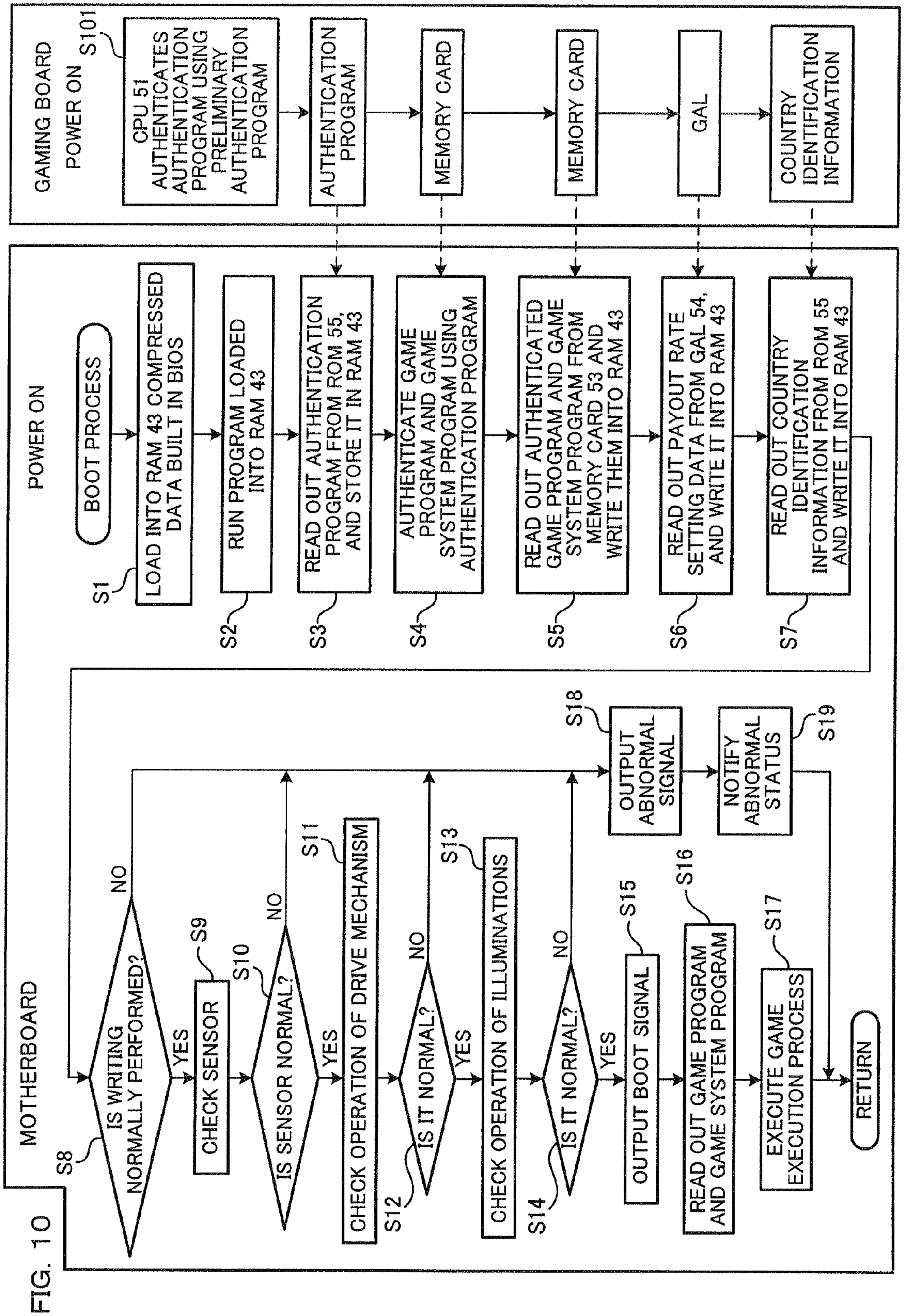
FIG. 10 is a flow chart of a boot process.

First, the main CPU 41 of the slot machine 1 executes a boot process routine shown in FIG. 10. This boot process routine is performed by the motherboard 40 and the gaming board 50. The memory card 53 is assumed to be inserted into the card slot 53S of the gaming board 50, and the GAL 54 is assumed to be attached to the IC socket 54S.

First, turning on a power switch of (powering on) the power unit 45 boots the motherboard 40 and the gaming board 50. Booting the motherboard 40 and the gaming board 50 starts separate processes in parallel. That is, in the gaming board 50, the CPU 51 reads out the preliminary authentication program stored in the boot ROM 52, and according to the preliminary authentication program read out, the CPU 51 performs the preliminary authentication to confirm and verify that the authentication program is not falsified, before reading that program in the motherboard 40 (S101).

On the other hand, in the motherboard 40, the main CPU 41 runs the BIOS stored in the ROM 42, to load into the RAM 43 compressed data built in the BIOS (S1). Then, the main CPU 41 runs a procedure of the BIOS according to the data loaded into the RAM 43 so as to diagnose and initialize various peripheral devices (S2).

The main CPU 41, which is connected to the ROM 55 of the gaming board 50 via the PCI bus, reads out the authentication program stored in the ROM 55, and stores it in the RAM 43 (S3). During this step, the main CPU 41 derives a checksum through ADDSUM method (a standard check function) which is adopted in a standard BIOS, and stores the authentication program in the RAM 43 while confirming if the operation of storing is carried out without an error.

Next, the main CPU 41 checks what is connected via the IDE bus. Then, the main CPU 41 accesses via the IDE bus to the memory card 53 inserted into the card slot 53S to read out the game program and the game system program from the memory card 53. In this case, the main CPU 41 reads out four bytes of data constituting the game program and the game system program at one time. Subsequently, according to the authentication program stored in the RAM 43, the main CPU 41 performs an authentication to confirm and verify that the game program and game system program read out are not falsified (S4). When this authentication process is properly finished, the main CPU 41 writes and store in the RAM 43 the game program and game system program which were the subjects of the authentication (authenticated) (S5).

Then, the main CPU 41 accesses, via the PCI bus, the GAL 54 attached to the IC socket 54S, and reads out the payout rate setting data from the GAL 54, which data is written to and stored in the RAM 43 (S6). Next, the main CPU 41 reads out, via the PCI bus, the country identification information stored in the ROM 55 of the gaming board 50. The country identification information read out is stored in the RAM 43 (S7).

Then, the main CPU 41 determines if the writing to the RAM 43 is normally performed (S8). When it is determined that the writing to the RAM 43 is normally performed (S8, YES), the sensor is checked (S9). Then, it is determined if the sensor is normal (S10). When it is determined that the sensor is normal (S10, YES), the operation of a drive mechanism is checked (S11). Then, it is determined if the operation of the drive mechanism is normal (S12). When it is determined that the operation of the drive mechanism is normal (S12, YES), the operation of illuminations (the lamps 30 or the like) is checked (S13). Then, it is determined if the operation of illuminations is normal (S14). When it is determined that the operation of the illuminations is normal (S14, YES), a boot signal is output (S15), the game program and game system program are read out from the RAM 43 (S16), a game execution process is executed (S17), and this routine ends.

In the case where: it is determined that the writing to the RAM 43 is not normally performed in the step S8 (S8, NO); it is determined that the sensor is not normal in the step S10 (S10, NO); it is determined that the operation of the drive mechanism is not normal in the step S12 (S12, NO); or it is determined that the operation of the illuminations is not normal in the step S14 (S14, NO); an abnormal signal is output (S18) and an abnormal status is notified (S19) to end this routine.

[Game Execution Process]

Figure 11:
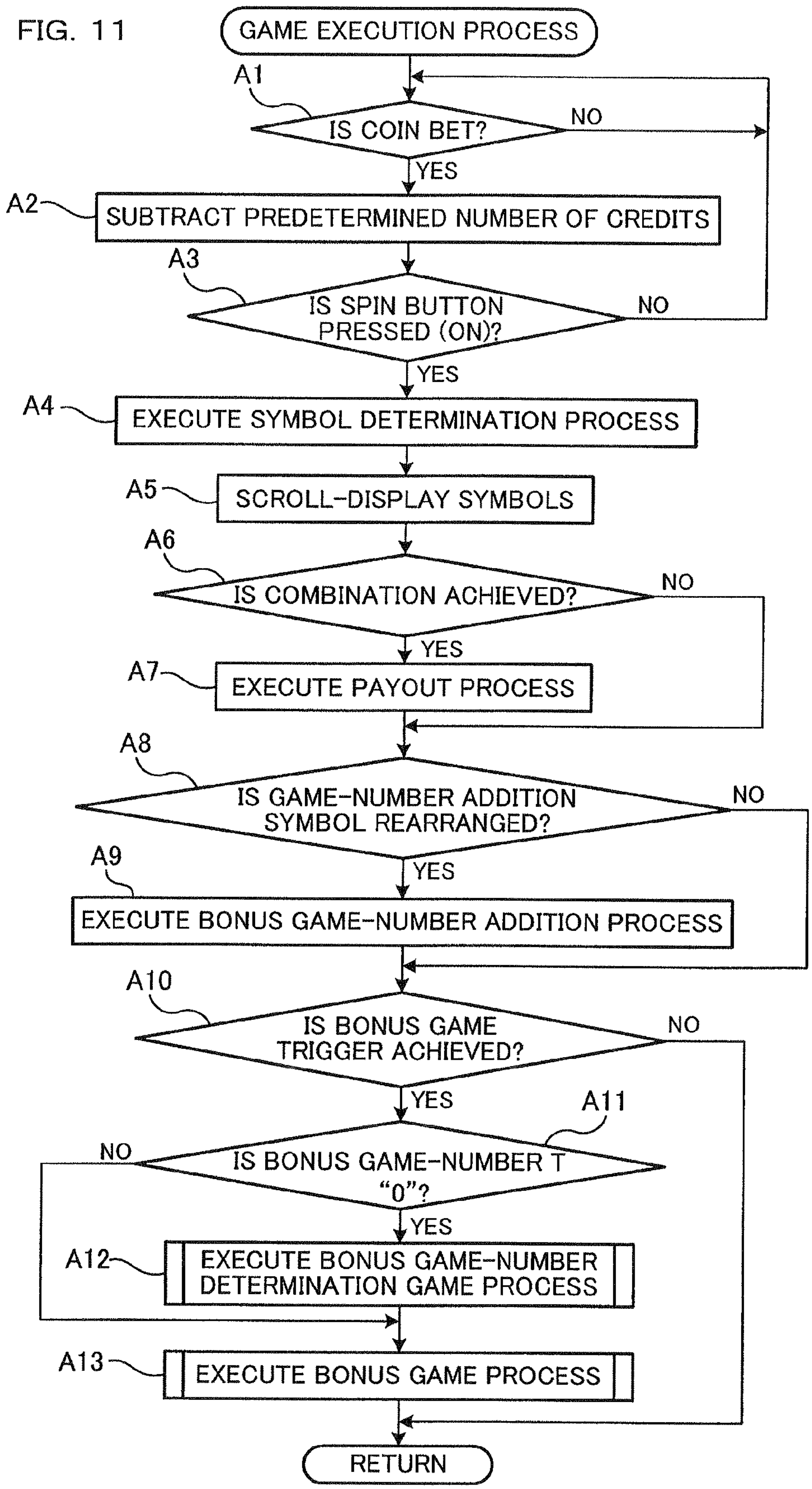
FIG. 11 is a flow chart of a game execution process.

After the boot process routine shown in FIG. 10, the main CPU 41 of the slot machine 1 executes a game execution process routine shown in FIG. 11. In the game execution process routine, first, the main CPU 41 determines if a coin is bet (A1). In this process, determined is if an input signal is received in response to pressing of the one-bet button 76 or the maximum bet button 77. When it is determined that a coin is not bet (A1, NO), the step A1 is executed again to enter a standby mode until a coin is bet.

On the other hand, when it is determined that a coin is bet (A1, YES), the number of credits corresponding to the number of coins bet is subtracted from the number of credits stored in the RAM 43 (A2). When the number of coins bet is larger than the number of credits stored in the RAM 43, the process of subtracting the number of credits is not performed, and the step A1 is executed again.

Then, it is determined if the spin button 73 is pressed (set to ON) (A3). When it is determined that the spin button 73 is not pressed (not set to ON) (A3, NO), the process returns to the step A1. When the spin button 73 is not pressed (not set to ON) (for example, when an instruction to finish the game is input while the spin button 73 is not pressed (not set to ON)), the result of subtraction in the step A2 is canceled.

On the other hand, when it is determined that the spin button 73 is pressed (set to ON) (A3, YES), a symbol determination process is performed (A4). That is, a stop symbol determination program stored in the RAM 43 is executed to determine a symbol matrix.

Next, scatter symbols 180 in the arrangement areas 151, 152, 153, 154, and 155 are scroll-displayed (A5). After scatter symbols 180 are scrolled, symbols of the symbol matrix determined in the step A4 are stopped (rearranged) in the arrangement areas 151, 152, 153, 154, and 155.

Then, it is determined if a combination is achieved, i.e., if four or more scatter symbols 180 of the same kind are rearranged (A6). When it is determined that a combination is achieved (A6, YES), a payout process is executed (A7). That is, the number of coins to be paid out is calculated according to the number of scatter symbols of the same kind. When a coin to be paid out is reserved, a predetermined number of credits are added to the number of credits stored in the RAM 43. On the other hand, when a coin is paid out, a control signal is transmitted to the hopper 66 to pay out a predetermined number of coins to the coin receiving tray 19.

When it is determined that a combination is not achieved in the step A6 (A6, NO), or after the step A7, it is determined if a game-number addition symbol 181 is rearranged (A8). When it is determined that a game-number addition symbol 181 is rearranged (A8, YES), a bonus game-number addition process is performed using the addition game-number determination table shown in FIG. 9 (A9).

When it is determined that a game-number addition symbol 181 is not rearranged in the step A8 (A8, NO), or after the step A9, it is determined if a bonus game trigger is achieved (A10). When it is determined that a bonus game trigger is not achieved (A10, NO), this routine ends. On the other hand, when it is determined that a bonus game trigger is achieved (A10, YES), it is determined if the bonus game-number T is "0" (A11).

When it is determined that the bonus game-number T is "0" (A11, YES), a bonus game-number determination game process is executed (A12). The bonus game-number determination game process will be described later.

When it is determined that the bonus game-number T is not "0" in the step A11 (A11, NO), or after the step A12, a bonus game process is executed (A13). The bonus game process will be described later. Then, this routine ends.

[Bonus Game-Number Determination Game Process]

Figure 12:
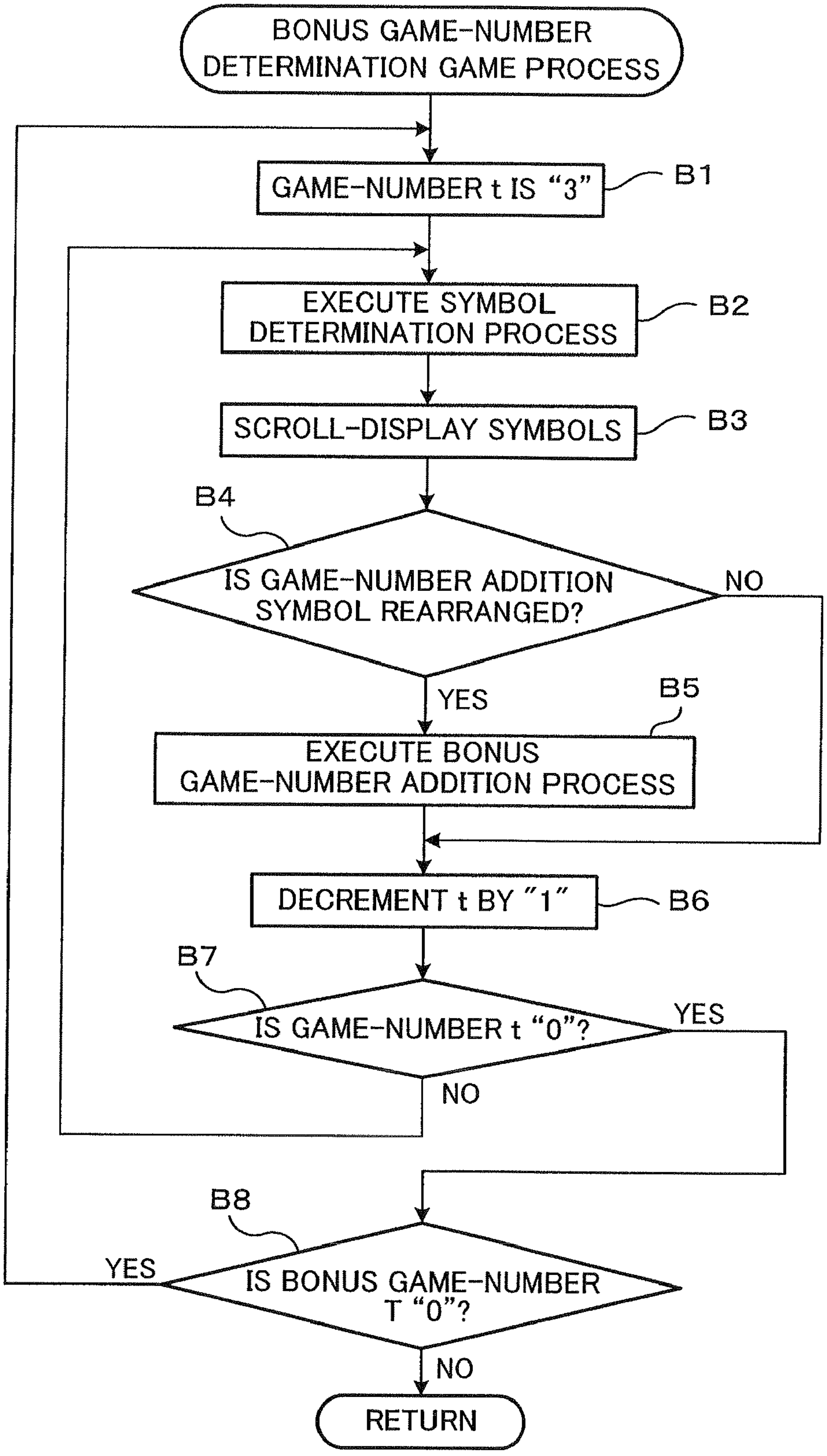
FIG. 12 is a flow chart of a bonus game-number determination game process.

When it is determined that the bonus game-number T is "0" in the step A11 of FIG. 11, the main CPU 41 of the slot machine 1 executes a bonus game-number determination game process routine shown in FIG. 12. In the bonus game-number determination game process routine, first, the main CPU 41 sets a game-number t to "3" (B1). Then, a symbol determination process is performed (B2). That is, a stop symbol determination program stored in the RAM 43 is run to determine a symbol matrix.

Next, scatter symbols 180 are scroll-displayed in the arrangement areas 151, 152, 153, 154, and 155 (B3). After scatter symbols 180 are scrolled, symbols of the symbol matrix determined in the step B2 are stopped (rearranged) in the arrangement areas 151, 152, 153, 154, and 155.

Next, it is determined if a game-number addition symbol 181 is rearranged (B4). When it is determined that a game-number addition symbol 181 is rearranged (B4, YES), a bonus game-number addition process is performed using the addition game-number determination table shown in FIG. 9 (B5).

When it is determined that a game-number addition symbol 181 is not rearranged in the step B4 (B4, NO), or after the step B5, the game-number t is decremented by "1" (B6), and it is determined if the game-number t is "0" (B7). When it is determined that the game-number t is not "0" (B7, NO), the process returns to the step B2. On the other hand, when it is determined that the game-number t is "0" (B7, YES), it is determined if the bonus game-number T is "0" (B8).

When it is determined that the bonus game-number T is "0" (B8, YES), the process returns to the step B1. Thus, a bonus game-number determination game is executed again. On the other hand, when it is determined that bonus game-number T is not "0" (B8, NO), this routine ends.

[Bonus Game Process]

Figure 13:
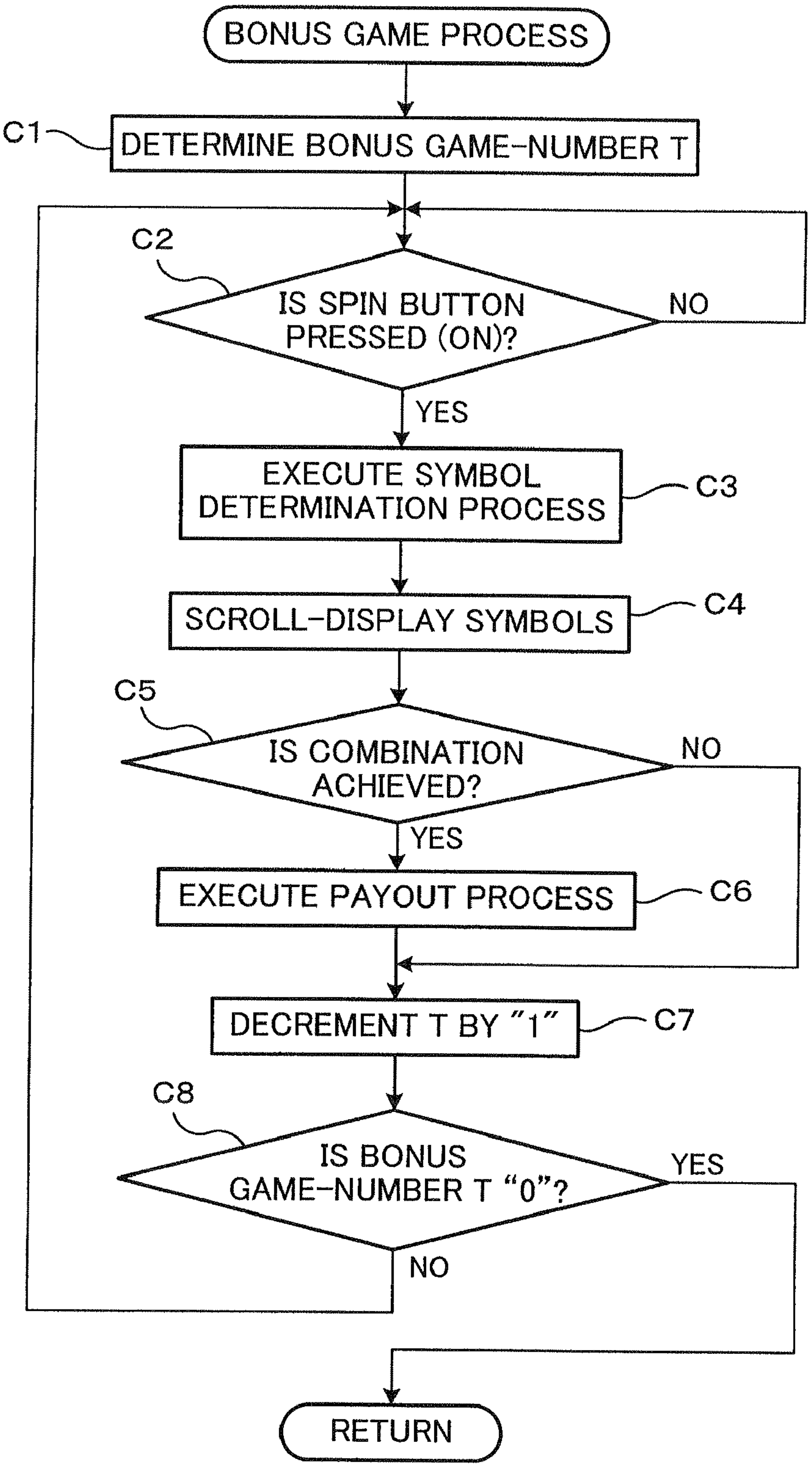
FIG. 13 is a flow chart of a bonus game process.

When it is determined that the bonus game-number T is not "0" in the step A11 of FIG. 11, or after the step A12 of FIG. 11, the main CPU 41 of the slot machine 1 executes a bonus game process routine shown in FIG. 13. In the bonus game process routine, first, the main CPU 41 determines a bonus game-number T (C1). The bonus game-number T is same as the bonus game-number displayed on the bonus game-number indicator 183 of the display 101 (center liquid crystal panel 5B) at a time of transition to the bonus game.

Then, it is determined if the spin button 73 is pressed (set to ON) (C2). When it is determined that the spin button 73 is not pressed (not set to ON) (C2, NO), the process returns to the step C2. On the other hand, when it is determined that the spin button 73 is pressed (set to ON) (C2, YES), a symbol determination process is performed (C3). That is, a stop symbol determination program stored in the RAM 43 is executed to determine a symbol matrix.

Then, scatter symbols 180 are scroll-displayed in the arrangement areas 151, 152, 153, 154, and 155 (C4). After scatter symbols 180 are scrolled, symbols of the symbol matrix determined in the step C3 are stopped (rearranged) in the arrangement areas 151, 152, 153, 154, and 155.

Then, it is determined if a combination is achieved, i.e., if four or more scatter symbols 180 of the same kind are rearranged (C5). When it is determined that a combination is achieved (C5, YES), a payout process is executed (C6). That is, the number of coins to be paid out is calculated according to the number of scatter symbols of the same kind. When a coin to be paid out is reserved, a predetermined number of credits are added to the number of credits stored in the RAM 43. On the other hand, when a coin is paid out, a control signal is transmitted to the hopper 66 to pay out a predetermined number of coins to the coin receiving tray 19.

When it is determined that a combination is not achieved in the step C5 (C5, NO), or after the step C6, the bonus game-number T is decremented by "1" (C7), and it is determined if the bonus game-number T is "0" (C8). When it is determined that the bonus game-number T is not "0" (C8, NO), the process returns to the step C2. On the other hand, when it is determined that the bonus game-number T is "0" (C8, YES), this routine ends.

As described above, when a specific symbol (game-number addition symbol) 181 is rearranged in the arrangement areas 151 to 155, a value determined based on the number of specific symbols 181 rearranged and the type of bet operation received by the input device 103 (operation buttons 11) is added to an accumulated value (bonus game-number) incremented/decremented by the count device 102 (center liquid crystal panel 5B). Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game (bonus game-number determination game) to determine an accumulated value of 1 or greater, and then executed is a bonus game whose scale depends on the determined accumulated value. Thus, the accumulated value, which is incremented due to a rearrangement of a specific symbol 181, enables a player to recognize in advance the scale of a bonus game to be executed at a time of satisfaction of the predetermined condition. Therefore, the player's expectation for the bonus game is likely to be increased.

In the detailed description provided above, characteristic parts have mainly been described in order that the present invention can be understood more easily. However, the present invention is not limited to the embodiment shown in the detailed description provided above, and may be applied to other embodiments. The scope of application of the present invention should be construed as broadly as possible. Terms and phraseologies adopted in the present specification are for correctly illustrating the present invention, not for limiting. It would be easy for those skilled in the art to derive, from the spirit of the invention described in the present specification, other structures, systems, methods and the like which are included in the spirit of the invention. Accordingly, it should be considered that claims cover equivalent structures, too, without departing from the technical idea of the present invention. An object of the abstract is to enable an intellectual property office, general public institutions, persons belonging to the art but not familiar with patent, legal terms, or technical terms to quickly understand technical contents and essences of the present invention through a simple research. Therefore, the abstract is not intended to limit the scope of the invention that should be evaluated by the claims. In addition, it is desirable to sufficiently refer to already-disclosed documents and the like, in order to fully understand the objects and effects of the present invention.

The detailed description provided above includes a processing which is executed on a computer or a computer network. The descriptions and expressions provided above are given for the purpose of allowing those skilled in the art to understand the invention most effectively. In the specification, respective steps used to induce one result, or blocks having a predetermined processing function should be understood as a processing having no self-contradiction. In addition, in each step or block, an electrical or magnetic signal is transmitted/received, recorded, and the like. In a processing in each step or block, such a signal is embodied in the form of a bit, a value, a symbol, a character, a term, a number, and the like. However, it should be noted that they have been used simply because they are convenient for explanations. A processing in each step or block has sometimes been described using an expression which is common to a human behavior. However, in principle, the processing described in the specification is executed by various devices. In addition, other structures necessary for each step or block are apparent from the above description.

Second Embodiment

The following describes a second embodiment of a slot machine (a gaming machine) and playing method thereof according to the present invention, with reference to FIGS. 14 to 26. Note that reference numerals respectively given to members in the figures referred to in this embodiment, reference symbols (such as "S") respectively representing steps in flowcharts in the figures, and description using these reference numerals and reference symbols are effective only in this embodiment. Each of these numerals and symbols does not represent a member or step in other embodiments.

Figure 14:
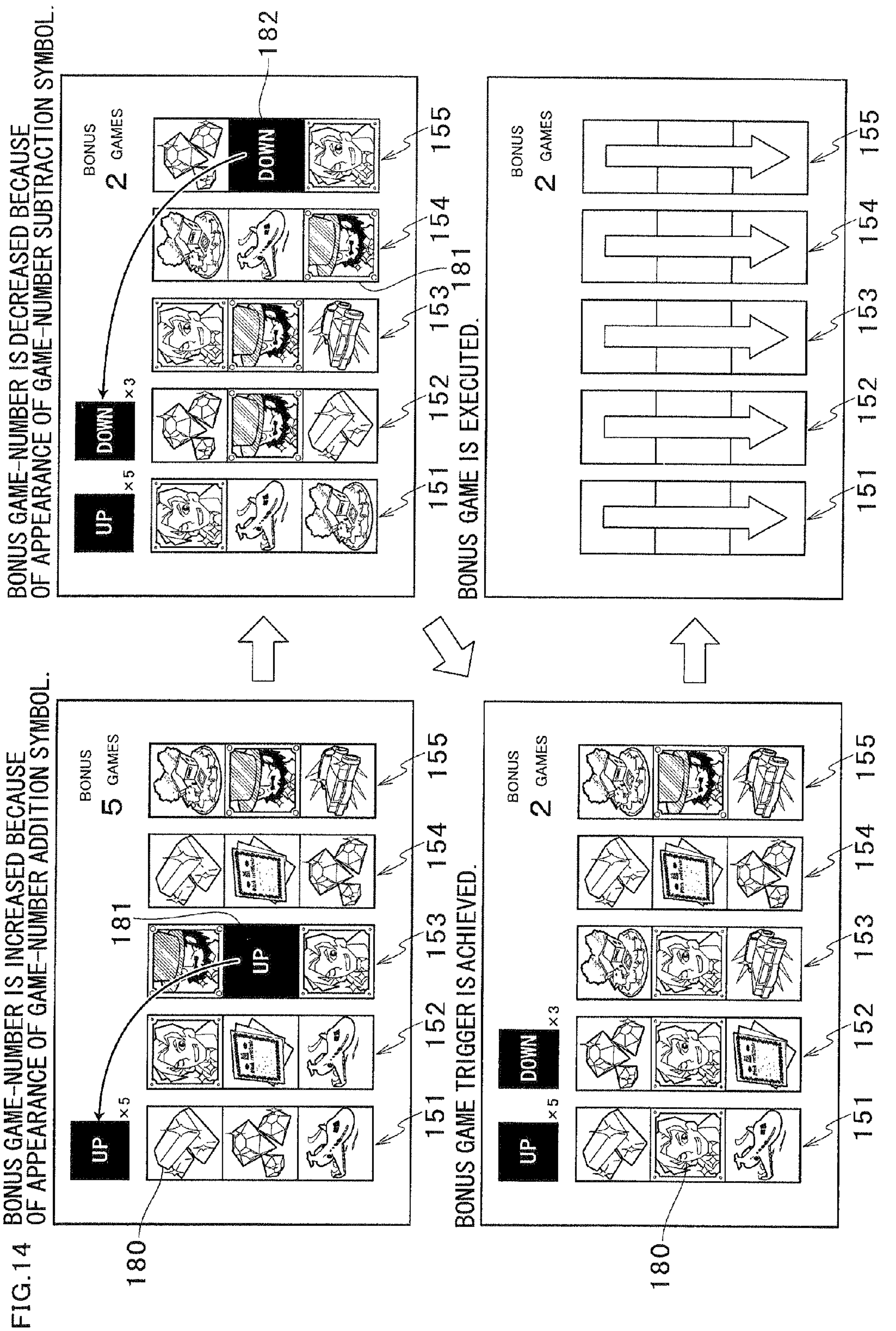
FIG. 14 is an explanatory view illustrating a playing method of a slot machine.

As shown in FIG. 14, the slot machine executes a playing method including the steps of: rearranging scatter symbols 180 in a matrix of arrangement areas 151 to 155 of a display; giving a payout according to the number of scatter symbols 180 rearranged; when a first symbol 181 is rearranged in the arrangement areas 151 to 155 as a result of a rearrangement of scatter symbols 180, adding, to an accumulated value incremented/decremented by a count device, a value determined based on the number of first symbols 181 rearranged and a type of bet operation received by an input device; when a second symbol 182 is rearranged in the arrangement areas 151 to 155, as a result of a rearrangement of scatter symbols 180, subtracting, from the accumulated value, a value determined based on the number of second symbols 182 rearranged and a type of bet operation received by the input device; when a predetermined condition is satisfied and the accumulated value is not 0, executing a bonus game whose scale depends on the accumulated value; and when the predetermined condition is satisfied and the accumulated value is 0, executing an accumulated value determination game to determine an accumulated value of 1 or greater, and then executing a bonus game whose scale depends on the determined accumulated value.

In this embodiment, "first symbol" means a symbol for incrementing a game-number (hereinafter "game-number addition symbol") 181. Also in this embodiment, "second symbol" means a symbol for decrementing a game-number (hereinafter "game-number subtraction symbol") 182. Meanwhile, as scatter symbols 180, there exist: eight kinds of scatter symbols, which are "HERO", "JET", "VILLA", "GOLD BAR", "CAR", "STOCK CERTIFICATE", "RIVAL", and "DIAMOND"; a game-number addition symbol 181 which is "UP"; and a game-number subtraction symbol 182 which is "DOWN".

Also in this embodiment, "bet operation" includes: a one-bet operation of making a one-bet which is a bet form of betting a minimum game value; and a maximum-bet operation of making a maximum-bet which is a bet form of betting a maximum game value that can be bet in one unit game. In addition, "predetermined condition" means that, in this embodiment, three to five scatter symbols of the same kind are rearranged in any row in a row direction. Here, a row direction is a direction perpendicular to the direction in which symbols scroll.

Further, "accumulated value" means a bonus game-number which is the number of unit games in a bonus game. In addition, "bonus game" means a gaming state which provides a larger advantage than a basic game. In this embodiment, "accumulated value determination game" means a bonus game-number determination game to determine a bonus game-number for a bonus game.

[Display 101]

Figure 15:
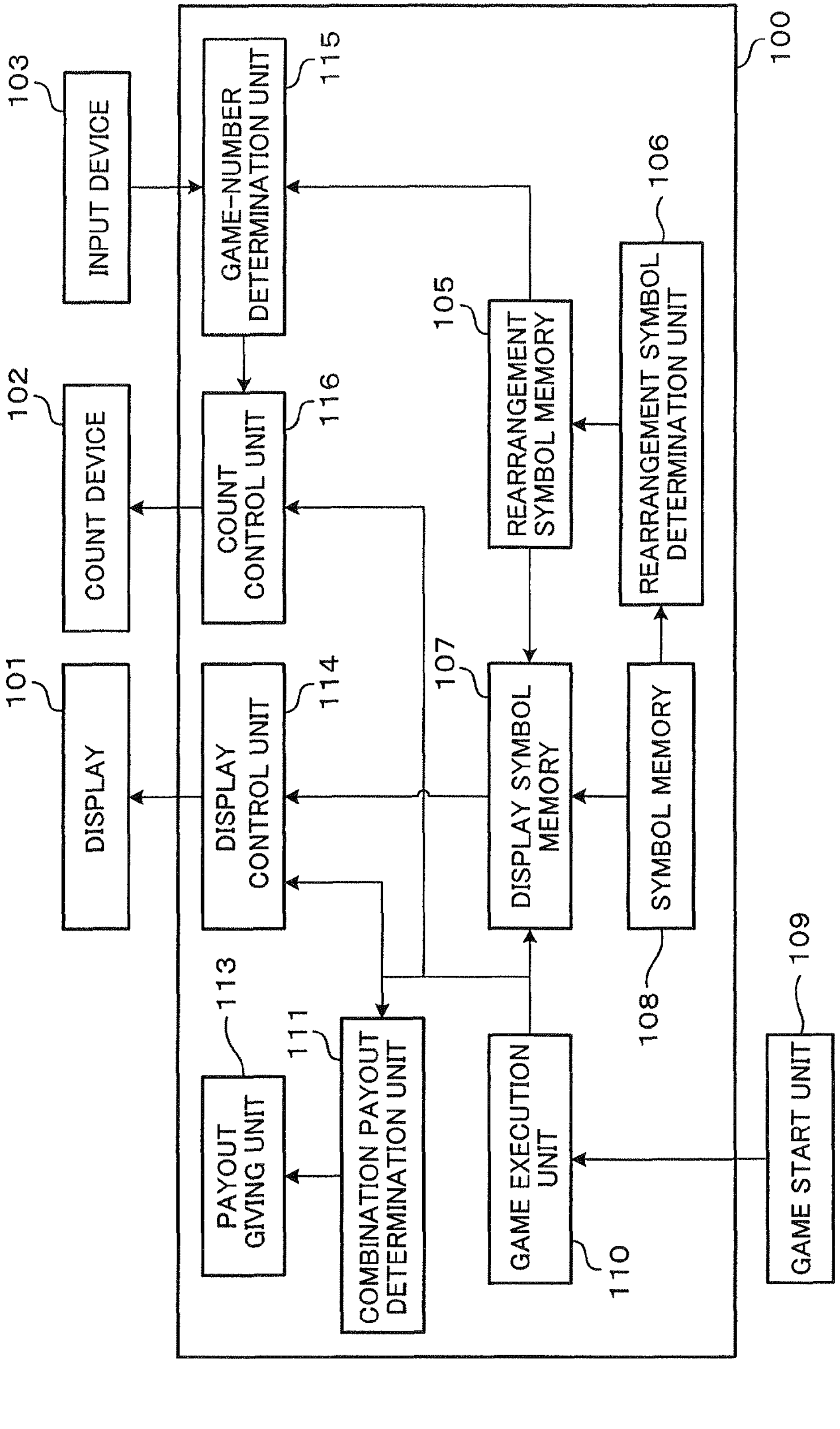
FIG. 15 is a block diagram of the slot machine.

As shown in FIG. 15, the slot machine which executes the above-described playing method has a display 101, a count device 102, an input device 103, and a controller 100. The display 101 has the matrix of arrangement areas 151 to 155. In these arrangement areas 151 to 155, more than one kinds of scatter symbols 180 are arranged.

Figure 16:
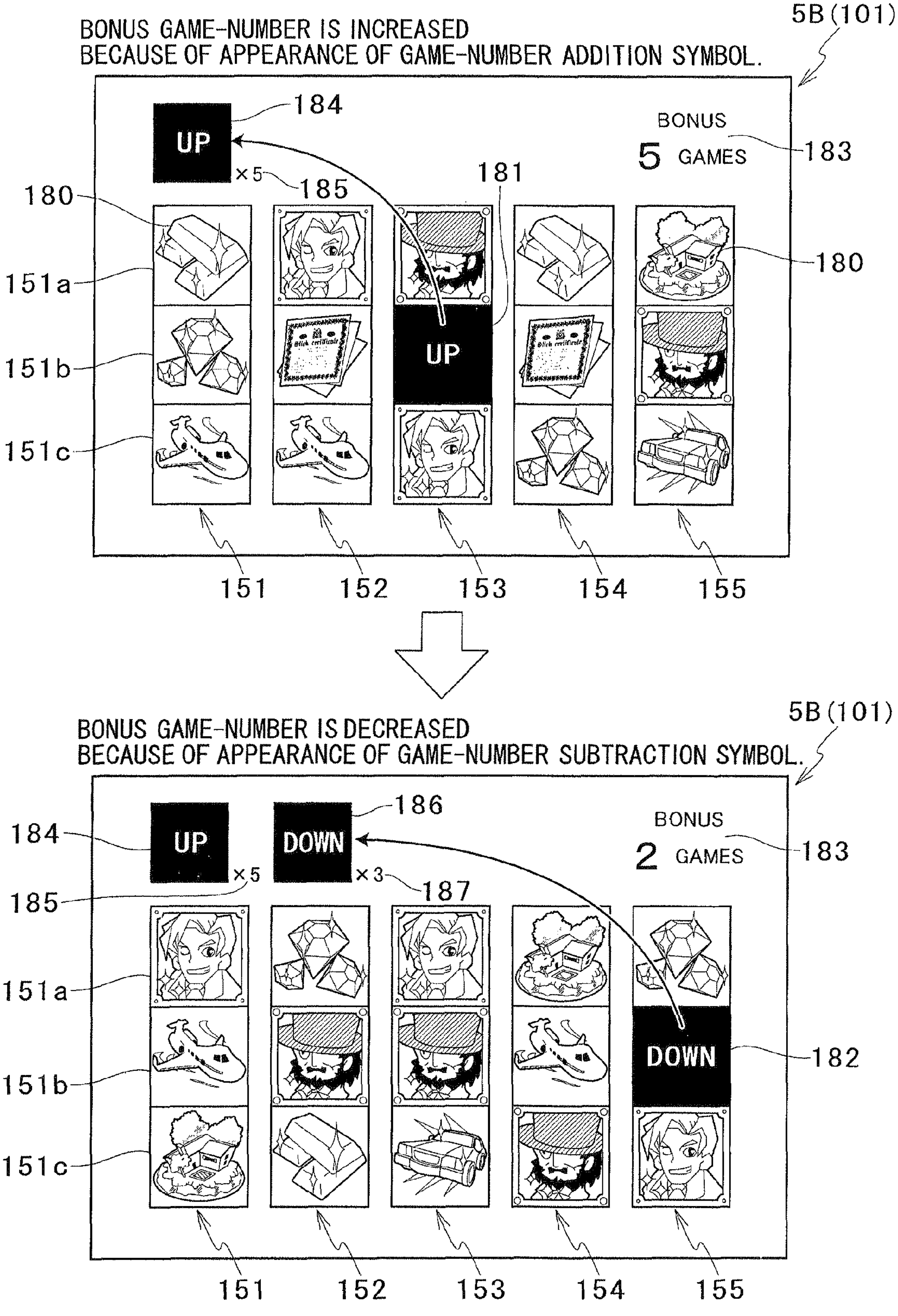
FIG. 16 is an explanatory view of a display screen.

Here, "arranged" means a state where scatter symbols 180 are visually identifiable by a player. In other words, it represents a state where scatter symbols 180 are displayed in the arrangement areas 151 to 155, as shown in FIG. 16. Meanwhile, "to rearrange" means to arrange scatter symbols 180 again after releasing them.

The display 101 may be mechanically structured with a reel device which arranges scatter symbols utilizing the rotation of a reel. Alternatively, the display 101 may have an electrical structure in which scatter symbols are arranged in a video reel displayed as an image. Further, the display 101 may have a structure of a combination of the mechanical structure (reels) and the electrical structure (video reels). The electrical structure may include a liquid crystal display device, a CRT (cathode-ray tube) device, a plasma display device, or the like. The specific structure of the display 101 will be detailed later.

[Count Device 102]

The count device 102 is configured to increment/decrement a bonus game-number for a bonus game. The bonus game-number is incremented every time a game-number addition symbol 181 is rearranged on the display 101, and is decremented every time a game-number subtraction symbol 182 is rearranged.

The count device 102 may be mechanically structured with a counter which increments/decrements the bonus game-number, or may have an electrical structure in which the bonus game-number is displayed as an image. The electrical structure may include a liquid crystal display device, a CRT (cathode-ray tube) device, a plasma display device, or the like. The specific structure of the count device 102 will be detailed later.

[Input Device 103]

The input device 103 is configured to receive a one-bet operation and maximum-bet operation from outside. The input device 103 may be structured with buttons such as a later-mentioned one-bet button 76 and a maximum bet button 77, or may be structured with a touch panel or the like.

[Controller 100]

The controller 100 is configured to execute: a first process of rearranging scatter symbols 180 in the matrix of arrangement areas 151 to 155 of the display 101; a second process of giving a payout according to the number of scatter symbols 180 rearranged; a third process of, when a first symbol (game-number addition symbol) 181 is rearranged in the arrangement areas 151 to 155 as a result of a rearrangement of scatter symbols 180, adding, to an accumulated value (bonus game-number) incremented/decremented by the count device 102, a value determined based on the number of first symbols 181 rearranged and a type of bet operation received by the input device 103; a fourth process of, when a second symbol (game-number subtraction symbol) 182 is rearranged in the arrangement areas 151 to 155, as a result of a rearrangement of scatter symbols 180, subtracting, from the accumulated value, a value determined based on the number of second symbols 182 rearranged and a type of bet operation received by the input device 103; a fifth process of, when a predetermined condition is satisfied and the accumulated value is not 0, executing a bonus game whose scale depends on the accumulated value; and a sixth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value. In other words, the controller 100 has a first processing unit, a second processing unit, a third processing unit, a fourth processing unit, a fifth processing unit, and a sixth processing unit.

The controller 100 has a symbol memory 108 which stores all the scatter symbols 180, and a display symbol memory 107 which stores scatter symbols to be displayed among the scatter symbols 180 stored in the symbol memory 108. The display symbol memory 107 can be accessed by a display control unit 114. In response to a control by a game execution unit 110, the display control unit 114 reads out the scatter symbols in the display symbol memory 107, and displays the scatter symbols on the display 101. A specific display state will be detailed later.

The controller 100 has a rearrangement symbol determination unit 106 which determines scatter symbols to be rearranged (hereinafter, rearrangement scatter symbols) every unit game, based on the scatter symbols 180 stored in the symbol memory 108. The rearrangement scatter symbols determined by the rearrangement symbol determination unit 106 are stored in a rearrangement symbol memory 105. Then, the rearrangement scatter symbols are output to the display symbol memory 107. After that, the rearrangement scatter symbols are displayed on the display 101 through image processing performed in the display control unit 114. That is, the controller 100 executes the first process of rearranging scatter symbols 180 in the matrix of arrangement areas 151 to 155 of the display 101.

Further, the controller 100 is connected to a game start unit 109. The game start unit 109 has a function of outputting a game start signal in response to an operation by a player. The controller 100 has: the game execution unit 110 which executes a unit game of rearranging scatter symbols 180, triggered by a game start signal from the game start unit 109; a combination payout determination unit 111 which determines a payout according to the number of scatter symbols 180 rearranged in a unit game; and a payout giving unit 113 which gives a payout determined by the combination payout determination unit 111. That is, the controller 100 executes the second process of giving a payout according to the number of scatter symbols 180 rearranged.

Further, the controller 100 has a game-number determination unit 115, and a count control unit 116. To the game-number determination unit 115 are input: rearrangement scatter symbols determined by the rearrangement symbol determination unit 106 and stored in the rearrangement symbol memory 105; and the type of bet operation received by the input device 103 from outside.

Based on the rearrangement scatter symbols input from the rearrangement symbol memory 105, the game-number determination unit 115 determines if a game-number addition symbol 181 is rearranged or not, and if a game-number subtraction symbol 182 is rearranged or not, as a result of a rearrangement of scatter symbols 180 in a unit game. When it is determined that a game-number addition symbol 181 is rearranged, the game-number determination unit 115 determines a bonus game-number to be added ("addition-number"), based on the number of game-number addition symbols 181 rearranged and the type of bet operation received by the input device 103 from outside. In addition, when it is determined that a game-number subtraction symbol 182 is rearranged, the game-number determination unit 115 determines a bonus game-number to be subtracted ("subtraction-number"), based on the number of game-number subtraction symbols 182 rearranged and the type of bet operation received by the input device 103 from outside.

The count control unit 116 causes the count device 102 to add the addition number determined by the game-number determination unit 115 and/or to subtract the subtraction number determined by the game-number determination unit 115, at a timing of rearrangement of scatter symbols 180 on the display 101. That is, the controller 100 executes: the third process of, when a first symbol (game-number addition symbol) 181 is rearranged in the arrangement areas 151 to 155 as a result of a rearrangement of scatter symbols 180, adding, to an accumulated value (bonus game-number) incremented/decremented by the count device 102, a value determined based on the number of first symbols 181 rearranged and a type of bet operation received by the input device 103; and the fourth process of, when a second symbol (game-number subtraction symbol) 182 is rearranged in the arrangement areas 151 to 155, as a result of a rearrangement of scatter symbols 180, subtracting, from the accumulated value incremented/decremented by the count device 102, a value determined based on the number of second symbols 182 rearranged and a type of bet operation received by the input device 103.

The game execution unit 110 executes a bonus game when a predetermined condition is satisfied. In the bonus game, a free game is carried out, of which number of times (number of unit games) is same as the bonus game-number that the count device 102 has, at a time of satisfaction of the predetermined condition, for increment/decrement operation. Every time a unit game of a free game is carried out, the count control unit 116 causes the count device 102 to decrement the bonus game-number by 1. Meanwhile, when the predetermined condition is satisfied and the bonus game-number incremented/decremented by the count device 102 is "0", the game execution unit 110 executes a bonus game-number determination game, and executes a bonus game after the bonus game-number of the count device 102 becomes "1" or greater. That is, the controller 100 executes the fifth process of, when a predetermined condition is satisfied and the accumulated value (bonus game-number) is not 0, executing a bonus game whose scale depends on the accumulated value; and the sixth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

Each of the blocks of the controller 100 may be realized in the form of hardware or in the form of software if necessary.

[Operation of Controller 100]

The following describes an operation of the controller 100 having the above-described structure. First, rearrangement scatter symbols are determined by the rearrangement symbol determination unit 106. The rearrangement scatter symbols determined are stored in the rearrangement symbol memory 105. Then, the rearrangement scatter symbols stored in the rearrangement symbol memory 105 are stored in the display symbol memory 107 and the game-number determination unit 115. Then, the rearrangement scatter symbols stored in the display symbol memory 107 are prepared to be displayed by the display control unit 114 on the display 101. When the game execution unit 110 executes a unit game, scatter symbols 180 are rearranged by having the display 101 display thereon the rearrangement scatter symbols stored in the display symbol memory 107. Thus, the controller 100 executes the first process of rearranging scatter symbols 180 in the matrix of arrangement areas 151 to 155 of the display 101.

Then, the combination payout determination unit 111 and the payout giving unit 113 give a payout according to the number of scatter symbols 180 rearranged. Thus, the controller 100 executes the second process of giving a payout according to the number of scatter symbols 180 rearranged.

On the other hand, the rearrangement scatter symbols stored in the game-number determination unit 115 are used for determining a bonus game-number. Specifically, when a game-number addition symbol 181 is rearranged as a result of a rearrangement of scatter symbols 180, a bonus game-number to be added ("addition-number") is determined based on the number of game-number addition symbols 181 rearranged and the type of bet operation received by the input device 103 from outside. On the other hand, when no game-number addition symbol 181 is rearranged, the addition-number is not determined. In the meantime, when a game-number subtraction symbol 182 is rearranged as a result of a rearrangement of scatter symbols 180, a bonus game-number to be subtracted ("subtraction-number") is determined based on the number of game-number subtraction symbols 182 rearranged and the type of bet operation received by the input device 103 from outside. On the other hand, when no game-number subtraction symbol 182 is rearranged, the subtraction-number is not determined.

The bonus game-number determined by the game-number determination unit 115 is output to the count control unit 116. By the count control unit 116, the addition-number determined in the game-number determination unit 115 is added to the bonus game-number of the count device 102, and/or the subtraction-number determined in the game-number determination unit 115 is subtracted from the bonus game-number of the count device 102, at a timing of rearrangement of scatter symbols 180 on the display 101. Thus, the controller 100 executes the third process of, when a first symbol (game-number addition symbol) 181 is rearranged in the arrangement areas 151 to 155 as a result of a rearrangement of scatter symbols 180, adding, to an accumulated value (bonus game-number) incremented/decremented by the count device 102, a value determined based on the number of first symbols 181 rearranged and a type of bet operation received by the input device 103; and the fourth process of, when a second symbol (game-number subtraction symbol) 182 is rearranged in the arrangement areas 151 to 155, as a result of a rearrangement of scatter symbols 180, subtracting, from the accumulated value (bonus game-number) incremented/decremented by the count device 102, a value determined based on the number of second symbols 182 rearranged and the type of bet operation received by the input device 103.

Then, when a predetermined condition is satisfied, a bonus game is executed by the game execution unit 110. In the bonus game, a free game is carried out, of which number of times (number of unit games) is same as the bonus game-number that the count device 102 has, at a time of satisfaction of the predetermined condition, for increment/decrement operation. Every time a unit game of a free game is carried out, the bonus game-number incremented/decremented by the count device 102 is decreased by 1 by the count control unit 116. Meanwhile, when the predetermined condition is satisfied and the bonus game-number incremented/decremented by the count device 102 is "0", a bonus game-number determination game is executed by the game execution unit 110, and a bonus game is executed after the bonus game-number incremented/decremented by the count device 102 becomes "1" or greater. Thus, the controller 100 executes the fifth process of, when a predetermined condition is satisfied and the accumulated value (bonus game-number) is not 0, executing a bonus game whose scale depends on the accumulated value; and the sixth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

As clearly seen from the above operations, as well as shown in FIG. 14, the slot machine 1 realizes a playing method including: rearranging scatter symbols 180 in the matrix of arrangement areas 151 to 155 of the display 101; giving a payout according to the number of scatter symbols 180 rearranged; when a first symbol (game-number addition symbol) 181 is rearranged in the arrangement areas 151 to 155 as a result of a rearrangement of scatter symbols 180, adding, to an accumulated value (bonus game-number) incremented/decremented by the count device 102, a value determined based on the number of first symbols 181 rearranged and a type of bet operation received by the input device 103; when a second symbol (game-number subtraction symbol) 182 is rearranged in the arrangement areas 151 to 155, as a result of a rearrangement of scatter symbols 180, subtracting, from the accumulated value, a value determined based on the number of second symbols 182 rearranged and a type of bet operation received by the input device 103; when a predetermined condition is satisfied and the accumulated value is not 0, executing a bonus game whose scale depends on the accumulated value; and when the predetermined condition is satisfied and the accumulated value is 0, executing an accumulated value determination game (bonus game-number determination game) to determine an accumulated value of 1 or greater, and then executing a bonus game whose scale depends on the determined accumulated value.

According to the above-described playing method, when a first symbol (game-number addition symbol) 181 is rearranged in the arrangement areas 151 to 155, a value determined based on the number of first symbols 181 rearranged and a type of bet operation received by the input device 103 is added to the accumulated value (bonus game-number) incremented/decremented by the count device 102. On the other hand, when a second symbol (game-number subtraction symbol) 182 is rearranged in the arrangement areas 151 to 155, a value determined based on the number of second symbols 182 rearranged and a type of bet operation received by the input device 103 is subtracted from the accumulated value. When a predetermined condition is satisfied and the accumulated value is not 0, executed is a bonus game whose scale depends on the accumulated value. On the other hand, when the predetermined condition is satisfied and the accumulated value is 0, executed is an accumulated value determination game (bonus game-number determination game) to determine an accumulated value of 1 or greater, and then executed is a bonus game whose scale depends on the determined accumulated value. Thus, the accumulated value, which is incremented due to a rearrangement of a first symbol 181 and decremented due to a rearrangement of a second symbol 182, enables a player to recognize in advance the scale of a bonus game to be executed at a time of satisfaction of the predetermined condition. Therefore, the player's expectation for the bonus game is likely to be increased.

[Display State]

Specifically described hereinafter is an exemplary display state of the display 101 in the slot machine 1 and in the operation process of the playing method thereof. The following description deals with a case where scatter symbols are arranged on the display 101 of a video reel-type, as shown in FIG. 16.

The display 101 has arrangement areas 151, 152, 153, 154, and 155 in which scatter symbols 180 are arranged. In the arrangement areas 151, 152, 153, 154, and 155, symbol columns having more than one scatter symbols 180 are scroll-displayed, respectively. Each of the arrangement areas 151, 152, 153, 154, and 155 is divided into an upper row 151*a*, a middle row 151*b*, and a lower row 151*c*. Scatter symbols 180 are stopped (arranged) in the rows 151*a*, 151*b*, and 151*c* of the respective arrangement areas. For example, in FIG. 16, "GOLD BAR" is stopped in the upper row 151*a* of the arrangement area 151, "DIAMOND" is stopped in the middle row 151*b* of the arrangement area 151, and "JET" is stopped in the lower row 151*c* of the arrangement area 151. Thus, the arrangement areas 151, 152, 153, 154, and 155 display a symbol matrix of five columns and three rows. Note that the symbol matrix is not limited to a matrix of five columns and three rows.

This embodiment deals with a case where a process of paying out a coin or the like is performed when a predetermined number (e.g., four) or more scatter symbols of a same kind are displayed in the symbol matrix. However, it is possible to employ such a configuration that, for example, a payline L is provided so as to cross the middle row 151*b* of the arrangement areas 151, 152, 153, 154, and 155, and a coin is paid out when scatter symbols stopped on the payline L correspond to a predetermined combination.

As shown in FIG. 16, when a game-number addition symbol 181 is rearranged, an addition icon 184 imitating a game-number addition symbol 181, and an addition game-number icon 185 are displayed above the arrangement areas 151, 152, 153, 154, and 155. In addition, the bonus game-number displayed on a bonus game-number indicator 183 of the display 101 is increased by the value indicated by the addition game-number icon 185.

Also as shown in FIG. 16, when a game-number subtraction symbol 182 is rearranged, a subtraction icon 186 imitating a game-number subtraction symbol 182, and a subtraction game-number icon 187 are displayed above the arrangement areas 151, 152, 153, 154, and 155. In addition, the bonus game-number displayed on the bonus game-number indicator 183 is decreased by the value indicated by the subtraction game-number icon 187.

Every time a game-number addition symbol 181 is rearranged, an addition icon 184 and an addition game-number icon 185 are displayed in an addition manner, and the bonus game-number displayed on the bonus game-number indicator 183 is increased accordingly. Every time a game-number subtraction symbol 182 is rearranged, a subtraction icon 186 and a subtraction game-number icon 187 are displayed in an addition manner, and the bonus game-number displayed on the bonus game-number indicator 183 is decreased accordingly. Note that, this embodiment may have a structure that the bonus game-number is not decreased to less than "0", or a structure that the bonus game-number may be a negative value.

Here, the game-number to be added ("addition game-number") corresponding to one game-number addition symbol 181 is different depending on the type of bet operation. In this embodiment, when a unit game is played through a one-bet operation, the addition game-number is "1". When a unit game is played through a maximum-bet operation, the addition game-number is any one of "1" to "5". As described later, the addition game-number in the case of a maximum-bet operation is randomly determined from the numbers of "1" to "5".

Also, the game-number to be subtracted ("subtraction game-number") corresponding to one game-number subtraction symbol 182 is different depending on the type of bet operation. In this embodiment, when a unit game is played through a one-bet operation, the subtraction game-number is "1". When a unit game is played through a maximum-bet operation, the subtraction game-number is any one of "1" to "5". As described later, the subtraction game-number in the case of a maximum-bet operation is randomly determined from the numbers of "1" to "5".

Figure 17:
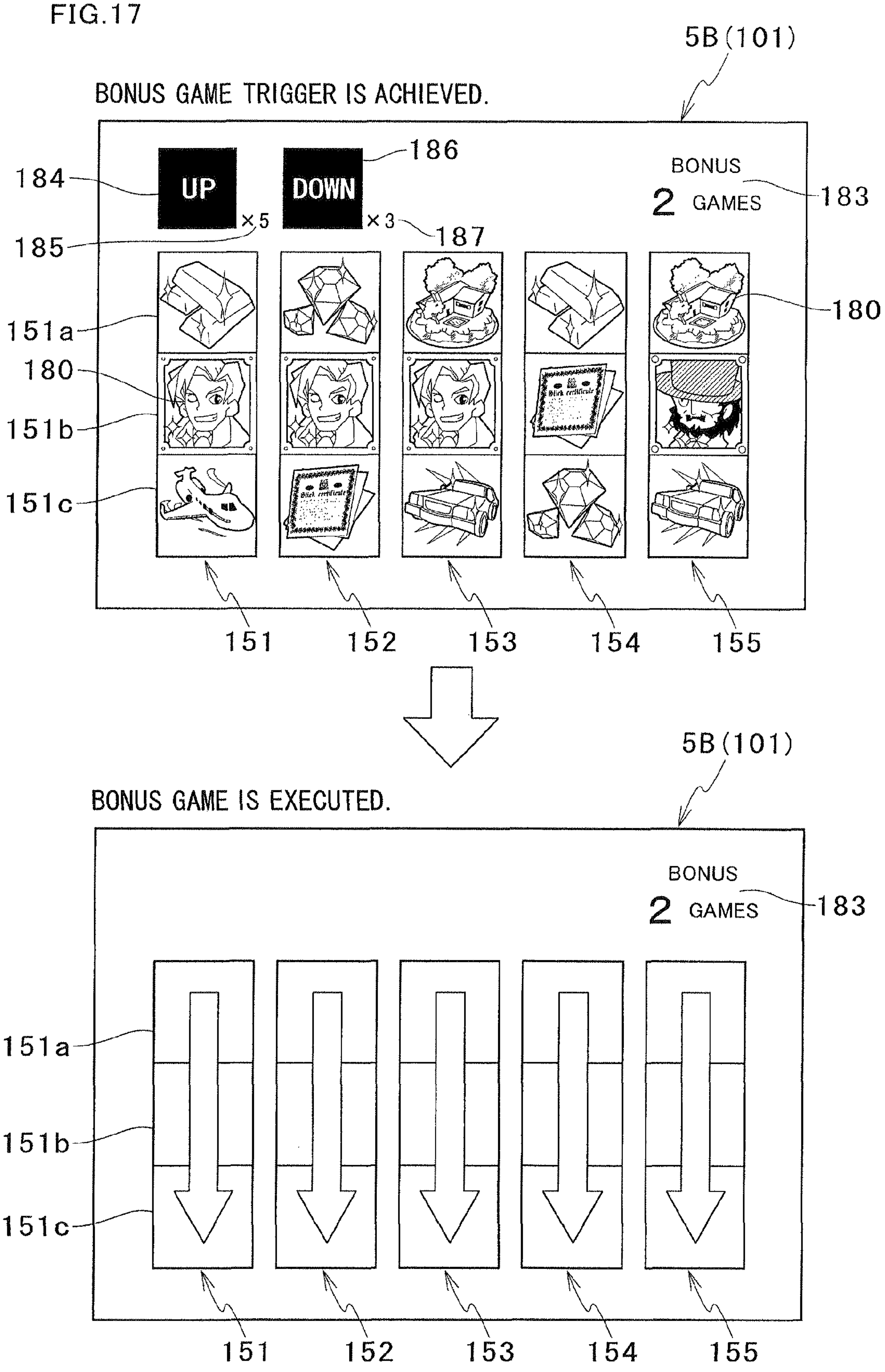
FIG. 17 is another explanatory view of the display screen.

As shown in FIG. 17, when a predetermined number (three to five) scatter symbols of the same kind are rearranged in any row in a row direction, a bonus game is triggered and executed. In FIG. 17, three scatter symbols 180 of the same kind ("HERO") are rearranged in the middle row 151*b* of the arrangement areas 151, 152, and 153. This triggers a bonus game so that a bonus game is executed.

In this embodiment, a bonus game is a free game. In a free game, a unit game can be played without betting a coin, the number of games being same as the bonus game-number displayed on the bonus game-number indicator 183.

Figure 18:
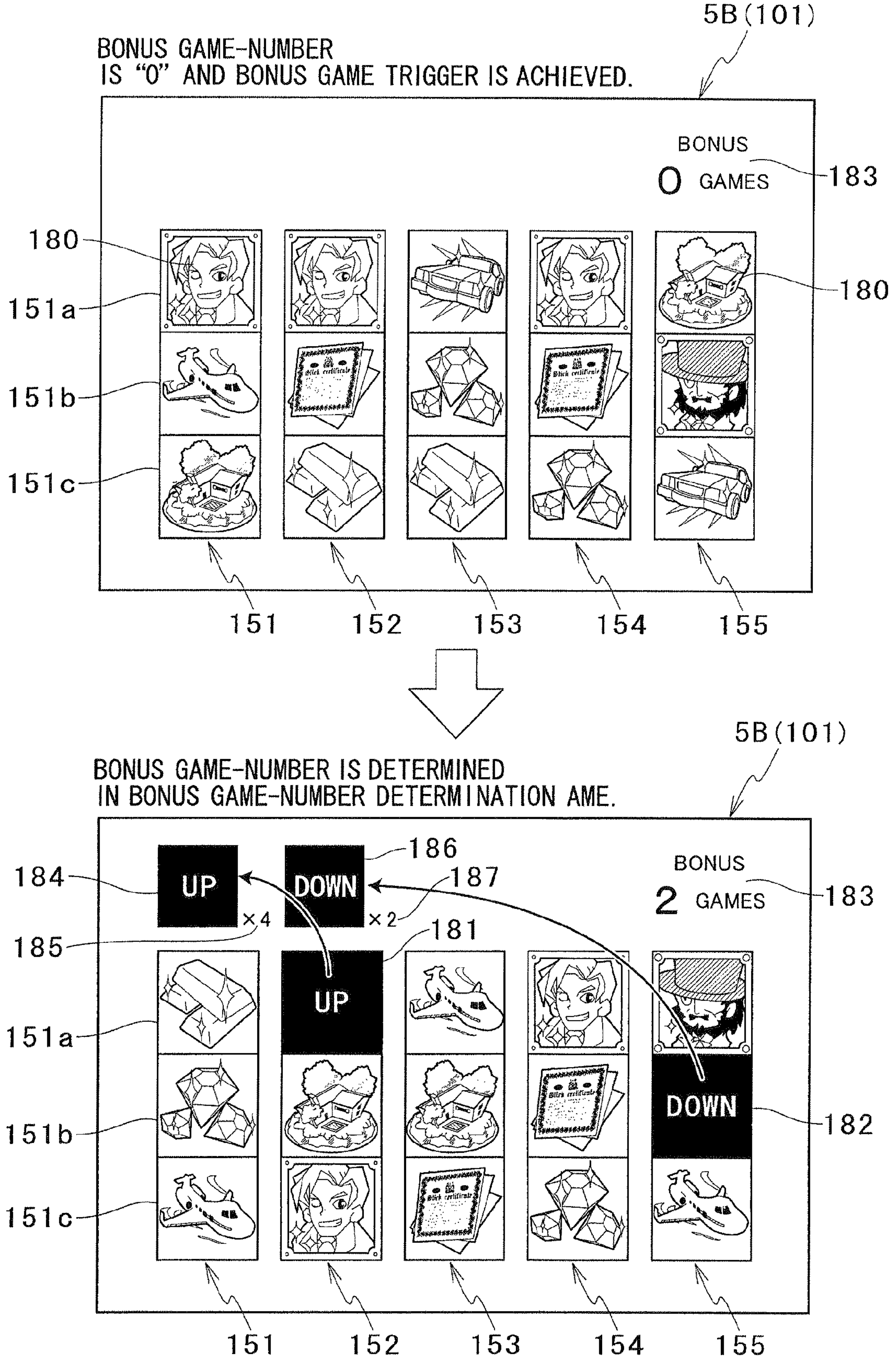
FIG. 18 is another explanatory view of the display screen.

In the meantime, as shown in FIG. 18, when the bonus game-number displayed on the bonus game-number indicator 183 is "0" and a bonus game trigger is achieved, a bonus game-number determination game is executed. In FIG. 18, three scatter symbols 180 of the same kind ("HERO") are rearranged in the upper row 151*a* of the arrangement areas 151, 152, and 154. With this, a bonus trigger is achieved, so that a bonus game-number determination game is executed.

In this embodiment, a bonus game-number determination game is a game without a payout, in which scatter symbols 180 are scroll-displayed and rearranged. In a bonus game-number determination game, scroll-display and rearrangement of scatter symbols 180 are repeated three times to determine a bonus game-number of "1" or greater, as a result of a rearrangement of a game-number addition symbol 181 and a game-number subtraction symbol 182. When a bonus game-number of "1" or greater is not determined even if a bonus game-number determination game is repeated three times, the bonus game-number determination game is repeated until a bonus game-number of "1" or greater is determined. After a bonus game-number of "1" or greater is determined, a bonus game is executed.

Another structure is possible, as for the case where the bonus game-number is "0" and a bonus game trigger is achieved, such that: a predetermined number (e.g. three) is used as a bonus game-number to execute a bonus game; no bonus game is executed; or execution of a bonus game is suspended, and the suspended bonus game is executed at a timing that the bonus game-number becomes "1" or greater.

[Scatter Symbols]

As shown in FIG. 19, scatter symbols 180 displayed in the arrangement areas 151, 152, 153, 154, and 155 of the display 101 constitute symbol columns, each symbol column having twenty-two scatter symbols. Each symbol of each symbol column has a code number, any one of numbers from 0 to 21. Each symbol column is constituted of a combination of scatter symbols of "HERO", "JET", "VILLA", "GOLD BAR", "CAR", "STOCK CERTIFICATE", "RIVAL", "DIAMOND", "UP", and "DOWN".

Successive three scatter symbols of each symbol column are displayed (arranged) respectively in the upper row 151*a*, the middle row 151*b*, and the lower row 151*c* of each of the arrangement areas 151, 152, 153, 154, and 155, thereby constituting a symbol matrix of five columns and three rows. When a later-mentioned bet button and a spin button are sequentially pressed in this order to start a game, scatter symbols constituting a symbol matrix start to scroll. After the symbols are scrolled for a predetermined period of time, the scrolling of symbols stops (symbols are rearranged).

When a predetermined number or more scatter symbols of a same kind are displayed in the arrangement areas 151, 152, 153, 154, and 155, a player gets an advantage. To get an advantage means that coins are paid out according to scatter symbols displayed, the value of coins to be paid out is added to a credit value, a bonus game is started, or the like.

Specifically, when four or more scatter symbols of a same kind are rearranged in the arrangement areas 151, 152, 153, 154, and 155, twenty coins (game media) are paid out for one bet. When a predetermined number (three to five) of scatter symbols of a same kind are rearranged in any row in a row direction, a bonus game is triggered. This causes a transition of gaming state from a basic game to a bonus game.

Here, a bonus game is a gaming state which provides a larger advantage than a basic game. In this embodiment, the bonus game is a free game. The free game is a game in which a unit game can be played without betting a coin. Note that another bonus game may be employed in combination, provided that the other bonus game is advantageous to a player, i.e., the other bonus game is more advantageous than a basic game. For example, that other bonus game which may be employed is a game providing: a state where a larger amount of game media can be obtained than in a basic game; a state where game media can be obtained more likely than in a basic game; or a state where a smaller amount of game media are consumed than in a basic game.

[Mechanical Structure of the Slot Machine 1]

Next, the following describes a specific example of mechanical and electrical structures of the slot machine 1 thus structured.

Figure 20:
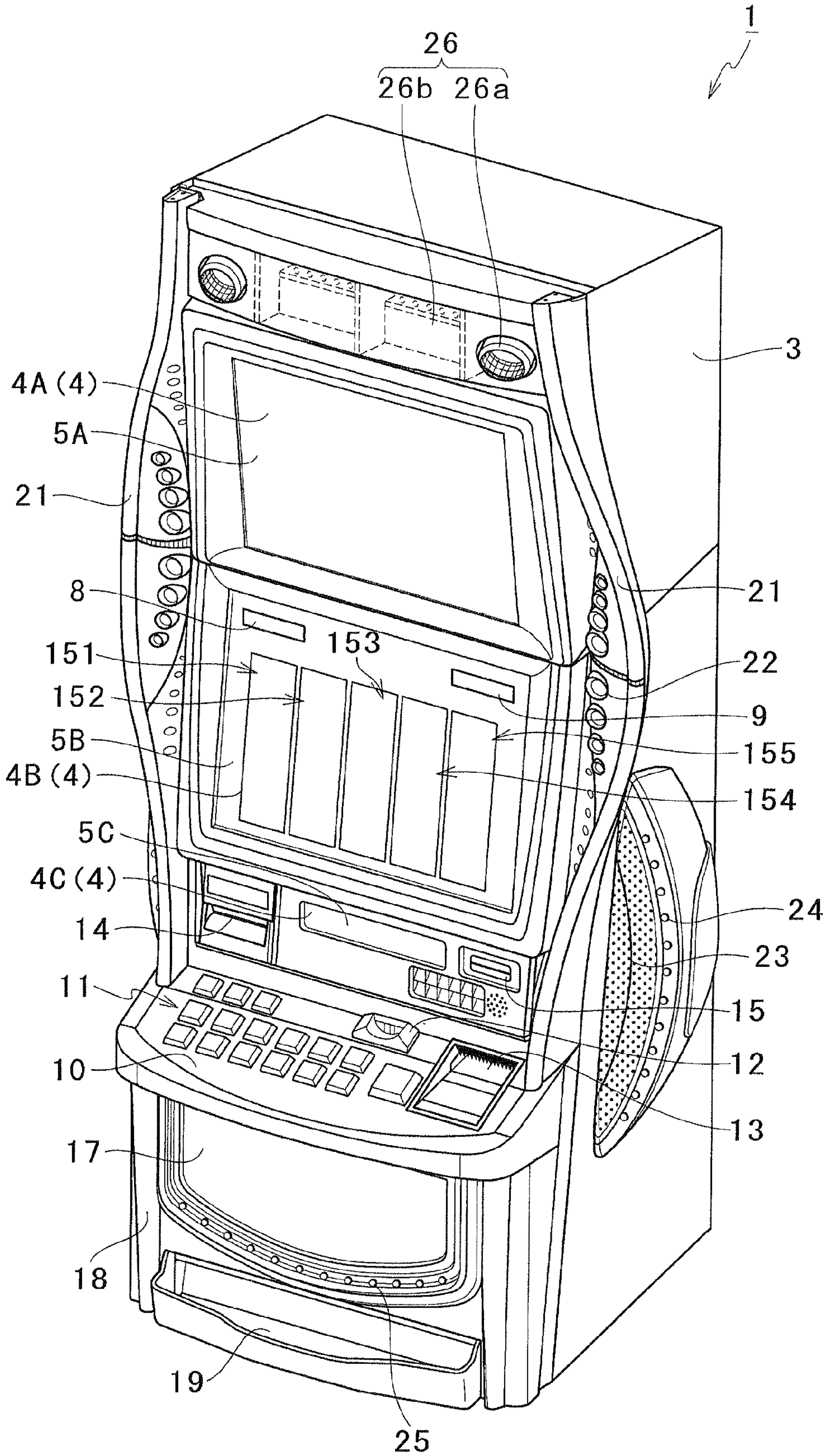
FIG. 20 is a perspective view illustrating an appearance of the slot machine.

As shown in FIG. 20, the slot machine 1 is an upright slot machine and has a cabinet 3 for housing electrical or mechanical components for executing a predetermined game mode. As a display unit 4 for displaying game information in response to a player's game operation, there may be provided an upper variable display unit 4A, a middle variable display unit 4B, and a lower variable display unit 4C. The display units 4A to 4C are attached to the front face of the cabinet 3 having a longer length in the vertical direction.

The upper variable display unit 4A has a transparent upper liquid crystal panel 5A fixed to a front door of the cabinet 3. The upper liquid crystal panel 5A displays thereon an image showing, for example, an effect image, an introduction of a game, or rules of the game.

The middle variable display unit 4B is a display panel for rotating symbols, which is to be constantly viewed by a player. The middle variable display unit 4B has a transparent center liquid crystal panel 5B (display 101) fixed to the front door of the cabinet 3. On the center liquid crystal panel 5B, five arrangement areas 151, 152, 153, 154, and 155 are displayed. Further, on the center liquid crystal panel 5B, an effect of moving images is performed at a time of winning or the like. Further, in an upper portion of the center liquid crystal panel 5B, a payout number indicator 8 and a credit number indicator 9 are displayed.

The lower variable display unit 4C has a lower liquid crystal panel 5C which displays the number of points stored in a card or the number of points of a game. Such a number is displayed on the lower liquid crystal panel 5C based on a result displayed on the middle variable display unit 4B. When a winning combination is achieved in the middle variable display unit 4B, the number of points of the game displayed on the lower liquid crystal panel 5C is increased according to the type of the winning achieved. On the left of the lower liquid crystal panel 5C, a ticket printer 14 is provided. On the right of the lower liquid crystal panel 5C, a card reader 15 is provided. Note that winning means an occasion where four or more scatter symbols of the same kind are rearranged, awarding various payouts according to the result.

Below the lower variable display unit 4C is disposed an operation table 10 which protrudes forward from the front face of the cabinet 3. On the operation table 10, there are arranged operation buttons 11 (e.g., a spin button 73, change button 74, cash-out button 75, one-bet button 76, maximum bet button 77, or the like) serving as a control panel which enables a player to perform a game-related operation. In addition, the operation table 10 is provided with a coin insertion slot 12 and a bill insertion slot 13.

Below the operation table 10, a waist-high panel 17 is disposed. The waist-high panel 17 is a plastic panel having a game-related image printed thereon. This waist-high panel 17 is fixed to a lower front door 18 and illuminated by a cold cathode tube. Further, below the waist-high panel 17 is disposed a coin receiving tray 19 for storing a coin paid out based on a game result.

Further, lamps 30 are disposed on the cabinet 3 of the slot machine 1 so as to surround game areas including the upper variable display unit 4A, the middle variable display unit 4B, the lower variable display unit 4C, and the operation table 10. The lamps 30 include side lamps 22, speaker lamps 24, under lamps 25, and top lamps 26. The side lamps 22 are provided on inclined parts 21 provided at the front right and front left of the cabinet 3, each of which parts protruding in a bow shape so as to extend over the upper variable display unit 4A, the middle variable display unit 4B and the lower variable display unit 4C. The speaker lamps 24 are provided on arc-shaped speakers 23 which protrudes sideways at the right and a left ends of the cabinet 3 adjacent to the operation table 10. The speaker lamps 24 are arranged along edges of the speakers 23. The under lamps 25 are provided on the lower front door 18 and arranged along a lower edge of the waist-high panel 17. The top lamps 26 are provided above the upper variable display unit 4A. The top lamps include power lamps 26*a* disposed at both sides respectively and band-type lamps 26*b* arranged in a horizontal direction between the power lamps.

[Electrical Structure of the Slot Machine 1]

Figure 21:
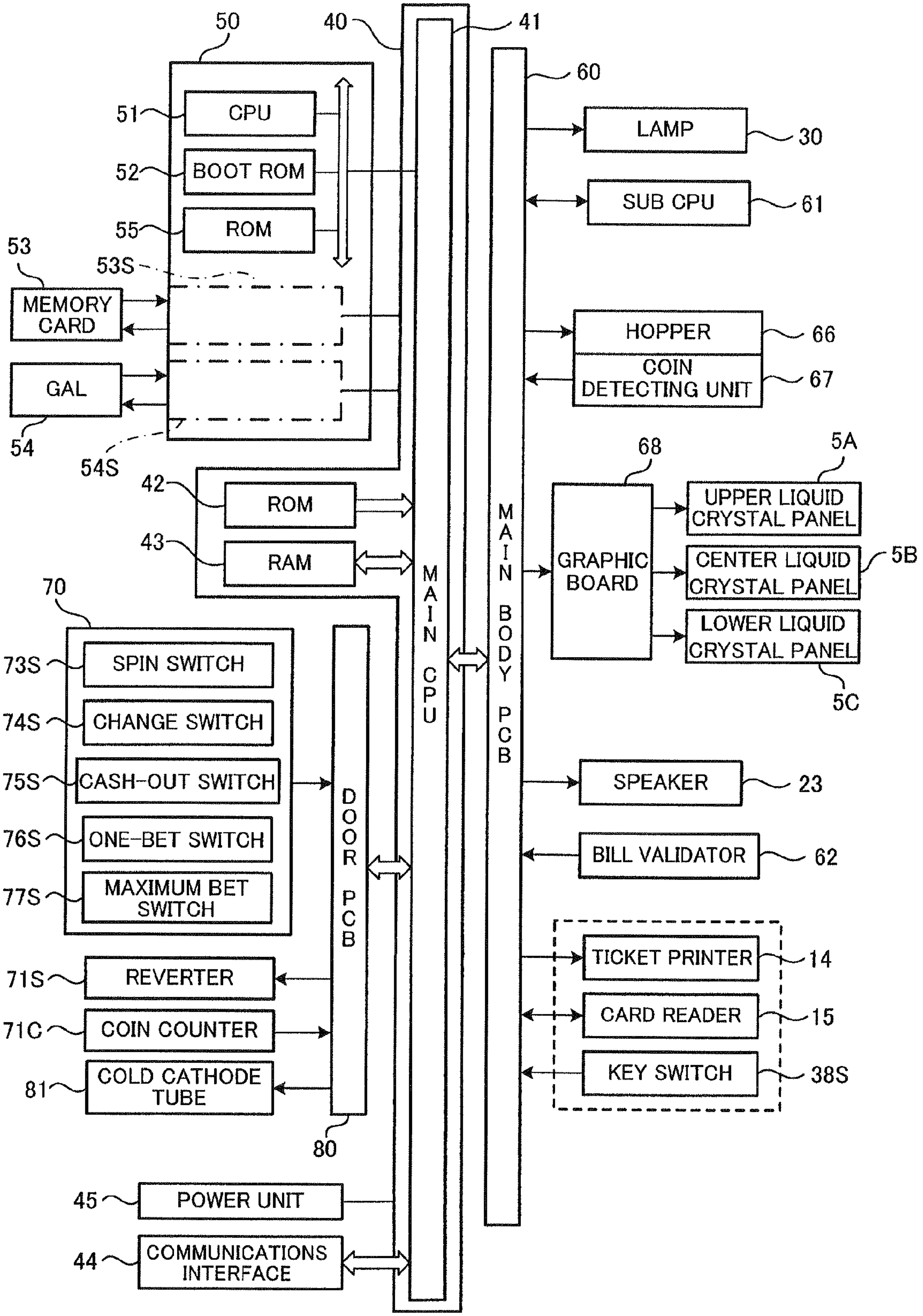
FIG. 21 is a block diagram illustrating a control board of the slot machine.

Inside the cabinet 3 is provided a control unit including the controller 100 of FIG. 15. As shown in FIG. 21, the control unit includes components such as a motherboard 40, a main body PCB (Printed Circuit Board) 60, a gaming board 50, a sub CPU 61, a door PCB 80, various switches, and a sensor.

The gaming board 50 is provided with a CPU (Central Processing Unit) 51, a ROM 55 and a boot ROM 52, a card slot 53S for a memory card 53, and an IC socket 54S for a GAL (Generic Array Logic) 54, which are connected to one another through an internal bus.

The memory card 53 stores therein a game program and a game system program. The game program contains a program to determine symbols to be stopped (hereinafter "stop symbol determination program"). The stop symbol determination program is a program for determining a symbol matrix of five columns and three rows. This stop symbol determination program contains sets of symbol weighting data respectively correspond to several kinds of payout rates (e.g., 80%, 84%, and 88%). Each set of symbol weighting data indicates, for each of the arrangement areas 151, 152, 153, 154, and 155, a relation between a code number of each symbol and at least one random number values. The random number value is a value within a predetermined range of 0 to 256 for example.

A payout rate is set based on payout rate setting data output from the GAL 54. Rearrangement symbols are determined based on a set of symbol weighting data corresponding to the payout rate set.

The memory card 53 stores therein various types of data for use in the game program and game system program. Specifically, the memory card 53 stores, in the form of table, data indicating relations between scatter symbols 180 displayed in the arrangement areas 151, 152, 153, 154, and 155 of FIG. 16 and a range of random number values. This data is transferred to a RAM 43 of the motherboard 40, at a time of execution of the game program.

The card slot 53S is structured so that the memory card 53 is inserted/removed thereto/therefrom. This card slot 53S is connected to the motherboard 40 via an IDE bus. Thus, the type and content of a game run by the slot machine 1 can be modified by removing the memory card 53 from the card slot 53S, writing a different game program and game system program into the memory card 53, and inserting the memory card 53 back to the card slot 53S.

The game program includes a program related to the progress of a game and/or a program for causing a transition to a bonus game. Also, the game program includes image data and audio data output during a game.

The GAL 54 has input ports and output ports. Upon the input of data to an input port, the GAL 54 outputs data corresponding to the input data from an output port. This data output from the output port is the before-mentioned payout rate setting data.

The IC socket 54S is structured so that the GAL 54 is attached/detached thereto/therefrom. The IC socket 54S is connected to the motherboard 40 via a PCI bus. Thus, the payout rate setting data to be output from the GAL 54 can be modified by detaching GAL 54 from the IC socket 54S, overwriting a program stored in the GAL 45, and attaching the GAL45 back to the IC socket 54S.

The CPU 51, the ROM 55, and the boot ROM 52, which are connected to one another via the internal bus, are connected to the motherboard 40 via the PCI bus. The PCI bus communicates a signal between the motherboard 40 and the gaming board 50, and supplies power from the motherboard 40 to the gaming board 50. The ROM 55 stores therein country identification information and an authentication program. The boot ROM 52 stores therein a preliminary authentication program, a program (boot code) for enabling the CPU 51 to run the preliminary authentication program, or the like.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (controller), a ROM (Read Only Memory) 42, the RAM (Random Access Memory) 43, and a communications interface 44.

The main CPU 41 serves as a controller that controls the overall slot machine 1. Specifically, the main CPU 41 performs the controls of: outputting a command signal, upon pressing the spin button 73 after a bet of credit, to the sub CPU 61 so as to scroll-display scatter symbols on the center liquid crystal panel 5B; determining symbols to be stopped after the scroll-display of symbols; and stopping the determined symbols in the arrangement areas 151, 152, 153, 154, and 155.

That is, the main CPU 41 functions as an arrangement controller to execute an arrangement control by which, among various kinds of scatter symbols, symbols to be arranged in a symbol matrix are selected and determined, and then scrolling of the symbols is stopped so that the determined symbol matrix appears. With this function, scatter symbols displayed while being scrolled on the center liquid crystal panel 5B are rearranged in a new symbol matrix.

The main CPU 41 functions as a controller 100 which executes: the first process of rearranging scatter symbols 180 in the matrix of arrangement areas 151 to 155 of the display 101 (center liquid crystal panel 5B); the second process of giving a payout according to the number of scatter symbols 180 rearranged; the third process of, when a first symbol (game-number addition symbol) 181 is rearranged in the arrangement areas 151 to 155 as a result of a rearrangement of scatter symbols 180, adding, to an accumulated value (bonus game-number) incremented/decremented by the count device 102 (center liquid crystal panel 5B), a value determined based on the number of first symbols 181 rearranged and a type of bet operation received by the input device 103 (operation buttons 11); the fourth process of, when a second symbol (game-number subtraction symbol) 182 is rearranged in the arrangement areas 151 to 155 as a result of a rearrangement of scatter symbols 180, subtracting, from the accumulated value, a value determined based on the number of second symbols 182 rearranged and a type of bet operation received by the input device 103; the fifth process of, when a predetermined condition is satisfied and the accumulated value is not 0, executing a bonus game whose scale depends on the accumulated value; and the sixth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

The ROM 42 stores a program such as BIOS (Basic Input/Output System) run by the main CPU 41, and data that is permanently used. When the BIOS is run by the main CPU 41, each of peripheral devices is initialized and the game program and the game system program stored in the memory card 53 are read out through the gaming board 50.

The RAM 43 stores data or program used for the main CPU 41 to perform a process. For example, in the RAM 43 are formed: the symbol memory 108, the display symbol memory 107, and the rearrangement symbol memory 105, which are shown in FIG. 15, in the forms of data areas, respectively. In the data area of the symbol memory 108, scatter symbols 180 are stored in the form of a data table of FIG. 19. In the data area of the rearrangement symbol memory 105, rearrangement symbols are stored. In the data area of the display symbol memory 107, a symbol matrix is stored.

The communications interface 44 communicates via a communication line with a host computer or the like provided in a game arcade. The motherboard 40 is connected to the main body PCB (Printed Circuit Board) 60 and the door PCB 80 through USBs (Universal Serial Buses). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51.

The main body PCB 60 and the door PCB 80 are connected to: a device or apparatus which generates an input signal to be input to the main CPU 41; and a device or apparatus controlled by a control signal output from the main CPU 41. The main CPU 41 runs the game program and the game system program stored in the RAM 43 based on the input signal input to the main CPU 41, to carry out an arithmetic process, thereby storing a result thereof in the RAM 43 or transmitting a control signal to each device or apparatus to control them.

The main body PCB 60 is connected to the lamps 30 (to be more specific, the side lamps 22, the speaker lamps 24, the under lamps 25, and the top lamps 26), the sub CPU 61, a hopper 66, a coin detecting unit 67, a graphic board 68, the speakers 23, a bill validator 62, the ticket printer 14, the card reader 15, and a key switch 38S.

The lamps 30 are turned on/off based on a control signal output from the main CPU 41. The sub CPU 61 controls an operation of scrolling symbols in the arrangement areas 151 to 155, and is connected to a later-mentioned VDP (Video Display Processor). The VDP reads out image data of symbols stored in an image data ROM (not shown), and then generates an image of scrolling symbols to be displayed in the arrangement areas 151, 152, 153, 154, and 155 to output the image to the center liquid crystal panel 5B.

The hopper 66 is provided in the cabinet 3, and pays out a predetermined number of coins from a coin payout opening to the coin receiving tray 19 based on a control signal output from the main CPU 41. The coin detecting unit 67 is provided inside the coin payout opening, and outputs an input signal to the main CPU 41 when detecting that a predetermined number of coins are paid out from the coin payout opening.

The graphic board 68 controls image displaying of the upper liquid crystal panel 5A, the center liquid crystal panel 5B, and the lower liquid crystal panel 5C, based on a control signal output from the main CPU 41. The graphic board 68 is provided with a VDP which generates image data based on a control signal output from the main CPU 41, a video RAM which temporarily stores image data generated by the VDP, and the like.

The bill validator 62 reads an image on a bill inserted to the bill insertion slot 13 and accepts a genuine bill into the cabinet 3. When accepting a genuine bill, the bill validator 62 outputs an input signal to the main CPU 41 corresponding to the amount of the bill. The main CPU 41 stores in the RAM 43 the number of credits corresponding to the amount of the bill transmitted by the input signal.

Based on a control signal output from the main CPU 41, the ticket printer 14 prints a bar code on a ticket, and then outputs the ticket with a bar code. Data such as the number of credits stored in the RAM 43, time and date, identification number of a slot machine 1, or the like is encoded to the bar code.

The card reader 15 reads data from a smart card to transmit them to the main CPU 41, or write data to a smart card based on a control signal from the main CPU 41. The key switch 38S is mounted on a keypad (not shown), and outputs an input signal to the main CPU 41 in response to an operation of the keypad by a player.

The door PCB 80 is connected to a control panel 70, a reverter 71S, a coin counter 71C, and a cold cathode tube 81. The control panel 70 is provided with: a spin switch 73S corresponding to the spin button 73, a change switch 74S corresponding to the change button 74, a cash-out switch 75S corresponding to the cash-out button 75, a one-bet switch 76S corresponding to the one-bet button 76, and a maximum bet switch 77S corresponding to the maximum bet button 77. The switches 73S to 77S output input signals to the main CPU 41 upon operations of the corresponding buttons 73 to 77 by a player, respectively.

The coin counter 71C is provided inside the coin insertion slot 12, and validates whether a coin inserted by a player into the coin insertion slot 12 is genuine. Anything other than a genuine coin is discharged to the coin receiving tray 19. The coin counter 71C outputs an input signal to the main CPU 41 when detecting a genuine coin.

The reverter 71S is operated based on a control signal output from the main CPU 41. The reverter 71S distributes a coin that is recognized as genuine by the coin counter 71C to a cash box (not shown) or the hopper 66 mounted in the slot machine 1. In other words, when the hopper 66 is filled with coins, the reverter 71S distributes a genuine coin to the cash box. On the other hand, when the hopper 66 is not filled with coins, a genuine coin is distributed to the hopper 66. The cold cathode tube 81 functions as a backlight mounted to the rear sides of the upper liquid crystal panel 5A and the center liquid crystal panel 5B. The cold cathode tube 81 is turned on based on a control signal output from the main CPU 41.

[Addition Game-Number Determination Table]

The following describes an addition game-number determination table used for determining an addition game-number per game-number addition symbol 181 when a game-number addition symbol 181 is rearranged. The addition game-number determination table is stored in the ROM 42 of the motherboard 40.

As shown in FIG. 22A, the addition game-number determination table includes bet forms, pattern-numbers of 1 to 6, and addition game-numbers per symbol associated with one another. Specifically, the bet form of maximum-bet is associated with the pattern-numbers of 1 to 5, and the pattern-number “1” is associated with the addition game-number per symbol of “1”. The pattern-number “4” is associated with the addition game-number per symbol of “4”. In the case where a maximum-bet operation has been made, a pattern-number is randomly determined from the pattern-numbers 1 to 5, so that an addition game-number per symbol is determined.

On the other hand, the bet form of one-bet is associated with the pattern-number “6”, and the pattern-number “6” is associated with the addition game-number per symbol of “1”. That is, in the case where a one-bet operation has been made, the addition game-number per symbol of “1” is determined. Thus, an addition game-number to be added in the case of maximum-bet operation is larger than an addition game-number to be added in the case of one-bet operation. This encourages a player to carry out a maximum-bet operation.

[Subtraction Game-Number Determination Table]

The following describes a subtraction game-number determination table for determining, when a game-number subtraction symbol 182 is rearranged, a subtraction game-number per game-number subtraction symbol 182. The subtraction game-number determination table is stored in the ROM 42 of the motherboard 40.

As shown in FIG. 22B, the subtraction game-number determination table includes bet forms, pattern numbers of 1 to 6, and subtraction game-numbers per symbol associated with one another. Specifically, the bet form of maximum-bet is associated with the pattern-numbers of 1 to 5, and the pattern-number “1” is associated with the subtraction game-number per symbol of “1”. The pattern number “4” is associated with the subtraction game-number per symbol of “4”. In the case where a maximum-bet operation has been made, a pattern-number is randomly determined from the pattern-numbers 1 to 5, so that an subtraction game-number per symbol is determined.

On the other hand, the bet form of one-bet is associated with the pattern-number “6”, and the pattern number “6” is associated with the subtraction game-number per symbol of “1”. Thus, in the case where a one-bet operation has been made, the subtraction game-number per symbol of “1” is determined.

[Process Operation of the Slot Machine 1]

Next, the process operation of the slot machine 1 will be described.

[Boot Process]

Figure 23:
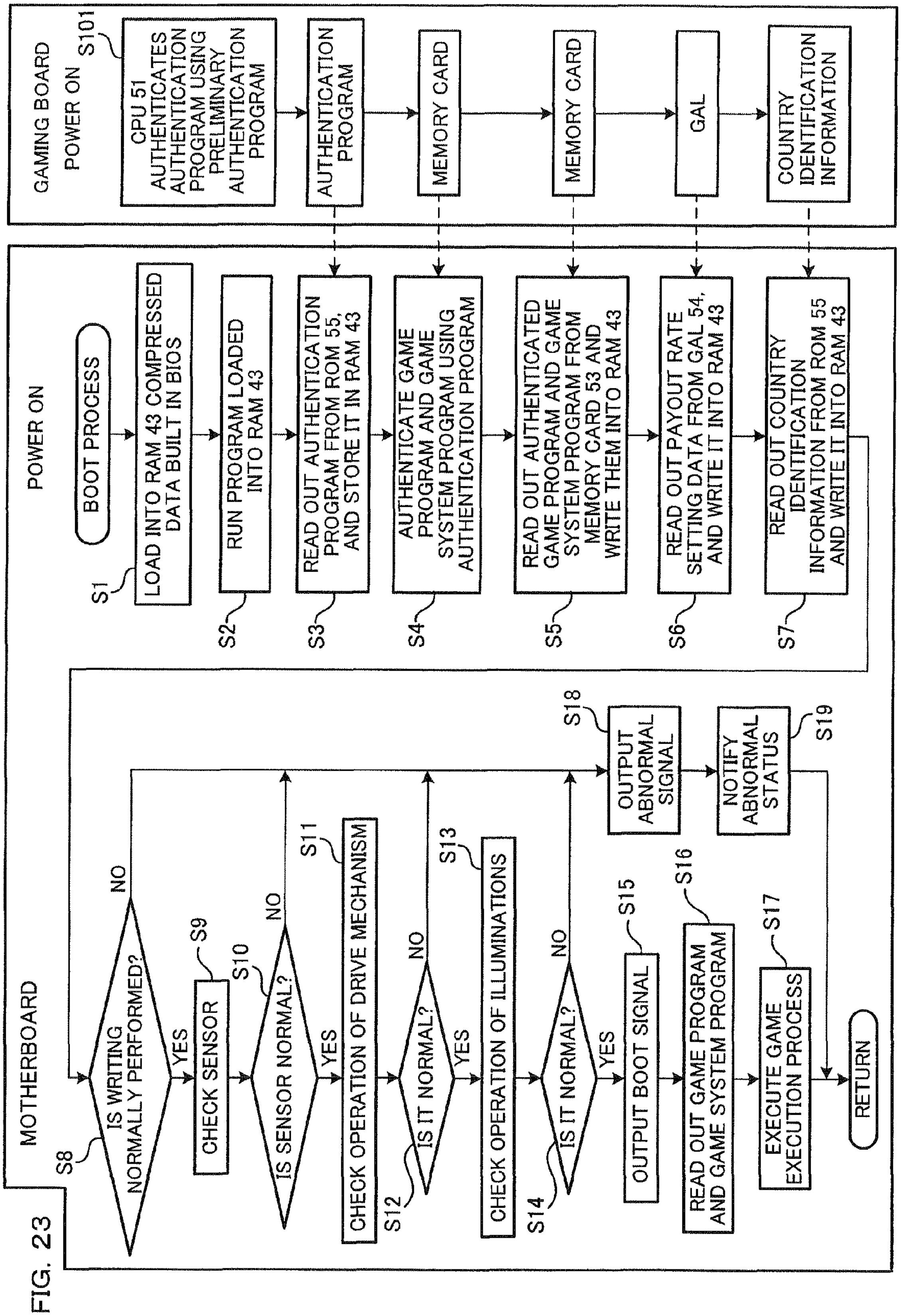
FIG. 23 is a flow chart of a boot process.

First, the main CPU 41 of the slot machine 1 executes a boot process routine shown in FIG. 23. This boot process routine is performed by the motherboard 40 and the gaming board 50. The memory card 53 is assumed to be inserted into the card slot 53S of the gaming board 50, and the GAL 54 is assumed to be attached to the IC socket 54S.

First, turning on a power switch of (powering on) the power unit 45 boots the motherboard 40 and the gaming board 50. Booting the motherboard 40 and the gaming board 50 starts separate processes in parallel. That is, in the gaming board 50, the CPU 51 reads out the preliminary authentication program stored in the boot ROM 52, and according to the preliminary authentication program read out, the CPU 51 performs the preliminary authentication to confirm and verify that the authentication program is not falsified, before reading that program in the motherboard 40 (S101).

On the other hand, in the motherboard 40, the main CPU 41 runs the BIOS stored in the ROM 42, to load into the RAM 43 compressed data built in the BIOS (S1). Then, the main CPU 41 runs a procedure of the BIOS according to the data loaded into the RAM 43 so as to diagnose and initialize various peripheral devices (S2).

The main CPU 41, which is connected to the ROM 55 of the gaming board 50 via the PCI bus, reads out the authentication program stored in the ROM 55, and stores it in the RAM 43 (S3). During this step, the main CPU 41 derives a checksum through ADDSUM method (a standard check function) which is adopted in a standard BIOS, and stores the authentication program in the RAM 43 while confirming if the operation of storing is carried out without an error.

Next, the main CPU 41 checks what is connected via the IDE bus. Then, the main CPU 41 accesses via the IDE bus to the memory card 53 inserted into the card slot 53S to read out the game program and the game system program from the memory card 53. In this case, the main CPU 41 reads out four bytes of data constituting the game program and the game system program at one time. Subsequently, according to the authentication program stored in the RAM 43, the main CPU 41 performs an authentication to confirm and verify that the game program and game system program read out are not falsified (S4). When this authentication process is properly finished, the main CPU 41 writes and store in the RAM 43 the game program and game system program which were the subjects of the authentication (authenticated) (S5).

Then, the main CPU 41 accesses, via the PCI bus, the GAL 54 attached to the IC socket 54S, and reads out the payout rate setting data from the GAL 54, which data is written to and stored in the RAM 43 (S6). Next, the main CPU 41 reads out, via the PCI bus, the country identification information stored in the ROM 55 of the gaming board 50. The country identification information read out is stored in the RAM 43 (S7).

Then, the main CPU 41 determines if the writing to the RAM 43 is normally performed (S8). When it is determined that the writing to the RAM 43 is normally performed (S8, YES), the sensor is checked (S9). Then, it is determined if the sensor is normal (S10). When it is determined that the sensor is normal (S10, YES), the operation of a drive mechanism is checked (S11). Then, it is determined if the operation of the drive mechanism is normal (S12). When it is determined that the operation of the drive mechanism is normal (S12, YES), the operation of illuminations (the lamps 30 or the like) is checked (S13). Then, it is determined if the operation of illuminations is normal (S14). When it is determined that the operation of the illuminations is normal (S14, YES), a boot signal is output (S15), the game program and game system program are read out from the RAM 43 (S16), a game execution process is executed (S17), and this routine ends.

In the case where: it is determined that the writing to the RAM 43 is not normally performed in the step S8 (S8, NO); it is determined that the sensor is not normal in the step S10 (S10, NO); it is determined that the operation of the drive mechanism is not normal in the step S12 (S12, NO); or it is determined that the operation of the illuminations is not normal in the step S14 (S14, NO); an abnormal signal is output (S18) and an abnormal status is notified (S19) to end this routine.

[Game Execution Process]

Figure 24:
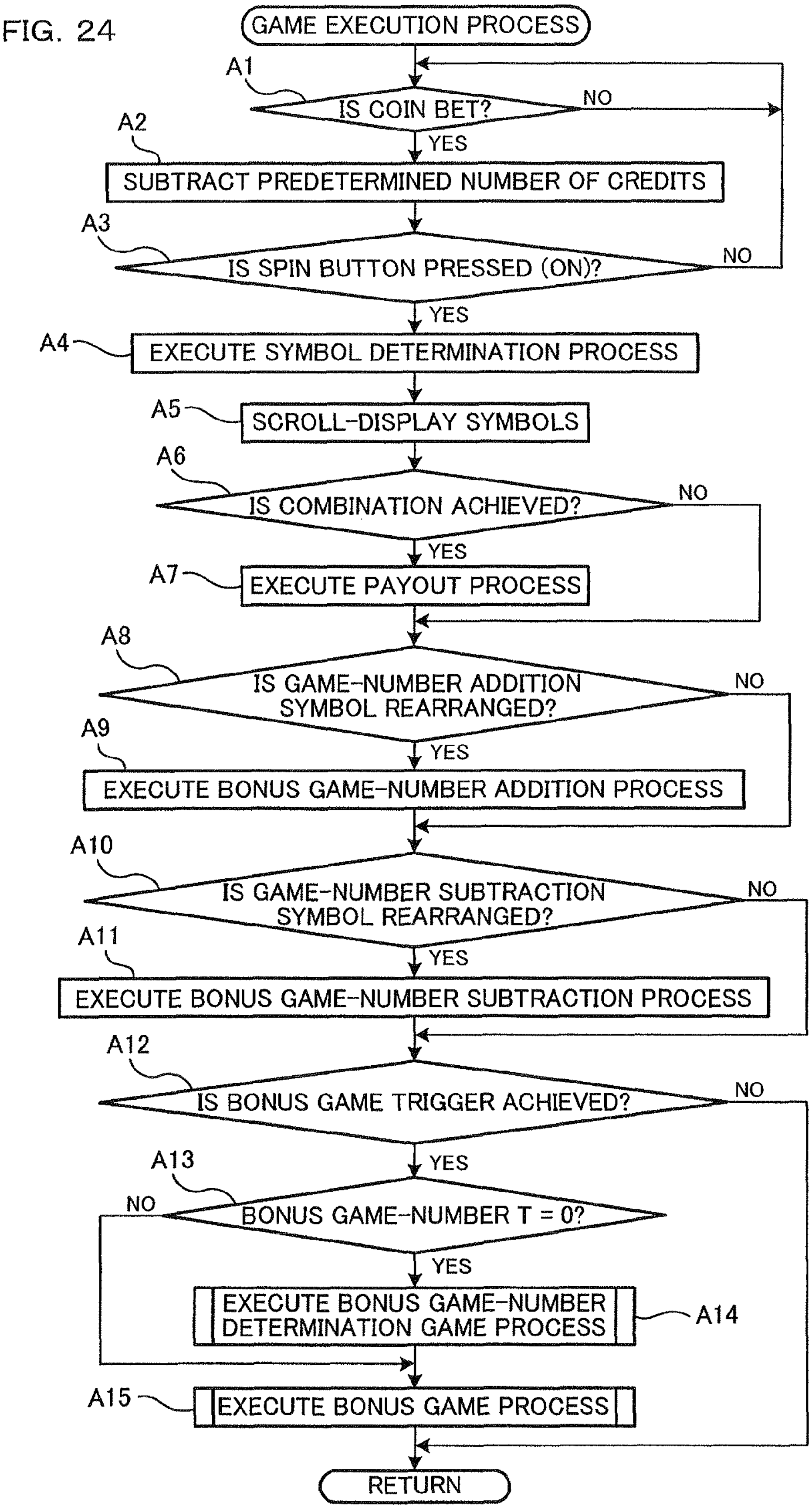
FIG. 24 is a flow chart of a game execution process.

After the boot process routine shown in FIG. 23, the main CPU 41 of the slot machine 1 executes a game execution process routine shown in FIG. 24. In the game execution process routine, first, the main CPU 41 determines if a coin is bet (A1). In this process, determined is if an input signal is received in response to pressing of the one-bet button 76 or the maximum bet button 77. When it is determined that a coin is not bet (A1, NO), the step A1 is executed again to enter a standby mode until a coin is bet.

On the other hand, when it is determined that a coin is bet (A1, YES), the number of credits corresponding to the number of coins bet is subtracted from the number of credits stored in the RAM 43 (A2). When the number of coins bet is larger than the number of credits stored in the RAM 43, the process of subtracting the number of credits is not performed, and the step A1 is executed again.

Then, it is determined if the spin button 73 is pressed (set to ON) (A3). When it is determined that the spin button 73 is not pressed (not set to ON) (A3, NO), the process returns to the step A1. When the spin button 73 is not pressed (not set to ON) (for example, when an instruction to finish the game is input while the spin button 73 is not pressed (not set to ON)), the result of subtraction in the step A2 is canceled.

On the other hand, when it is determined that the spin button 73 is pressed (set to ON) (A3, YES), a symbol determination process is performed (A4). That is, a stop symbol determination program stored in the RAM 43 is executed to determine a symbol matrix.

Next, scatter symbols 180 in the arrangement areas 151, 152, 153, 154, and 155 are scroll-displayed (A5). After scatter symbols 180 are scrolled, symbols of the symbol matrix determined in the step A4 are stopped (rearranged) in the arrangement areas 151, 152, 153, 154, and 155.

Then, it is determined if a combination is achieved, i.e., if four or more scatter symbols 180 of the same kind are rearranged (A6). When it is determined that a combination is achieved (A6, YES), a payout process is executed (A7). That is, the number of coins to be paid out is calculated according to the number of scatter symbols of the same kind. When a coin to be paid out is reserved, a predetermined number of credits are added to the number of credits stored in the RAM 43. On the other hand, when a coin is paid out, a control signal is transmitted to the hopper 66 to pay out a predetermined number of coins to the coin receiving tray 19.

When it is determined that a combination is not achieved in the step A6 (A6, NO), or after the step A7, it is determined if a game-number addition symbol 181 is rearranged (A8). When it is determined that a game-number addition symbol 181 is rearranged (A8, YES), a bonus game-number addition process is performed using the addition game-number determination table shown in FIG. 22A (A9).

When it is determined that a game-number addition symbol 181 is not rearranged in the step A8 (A8, NO), or after the step A9, it is determined if a game-number subtraction symbol 182 is rearranged (A10). When it is determined that a game-number subtraction symbol 182 is rearranged (A10, YES), executed is a bonus game-number subtraction process, using the subtraction game-number determination table shown in FIG. 22B (A11).

When it is determined that a game-number subtraction symbol 182 is not rearranged in the step A10 (A10, NO), or after the step A11, it is determined if a bonus game trigger is achieved (A12). When it is determined that a bonus game trigger is not achieved (A12, NO), this routine ends. On the other hand, when it is determined that a bonus game trigger is achieved (A12, YES), it is determined if the bonus game-number T is “0” (A13).

When it is determined that the bonus game-number T is “0” (A13, YES), a bonus game-number determination game process is executed (A14). The bonus game-number determination game process will be described later.

When it is determined that the bonus game-number T is not “0” in the step A13 (A13, NO), or after the step A14, a bonus game process is executed (A15). The bonus game process will be described later. Then, this routine ends.

[Bonus Game-Number Determination Game Process]

Figure 25:
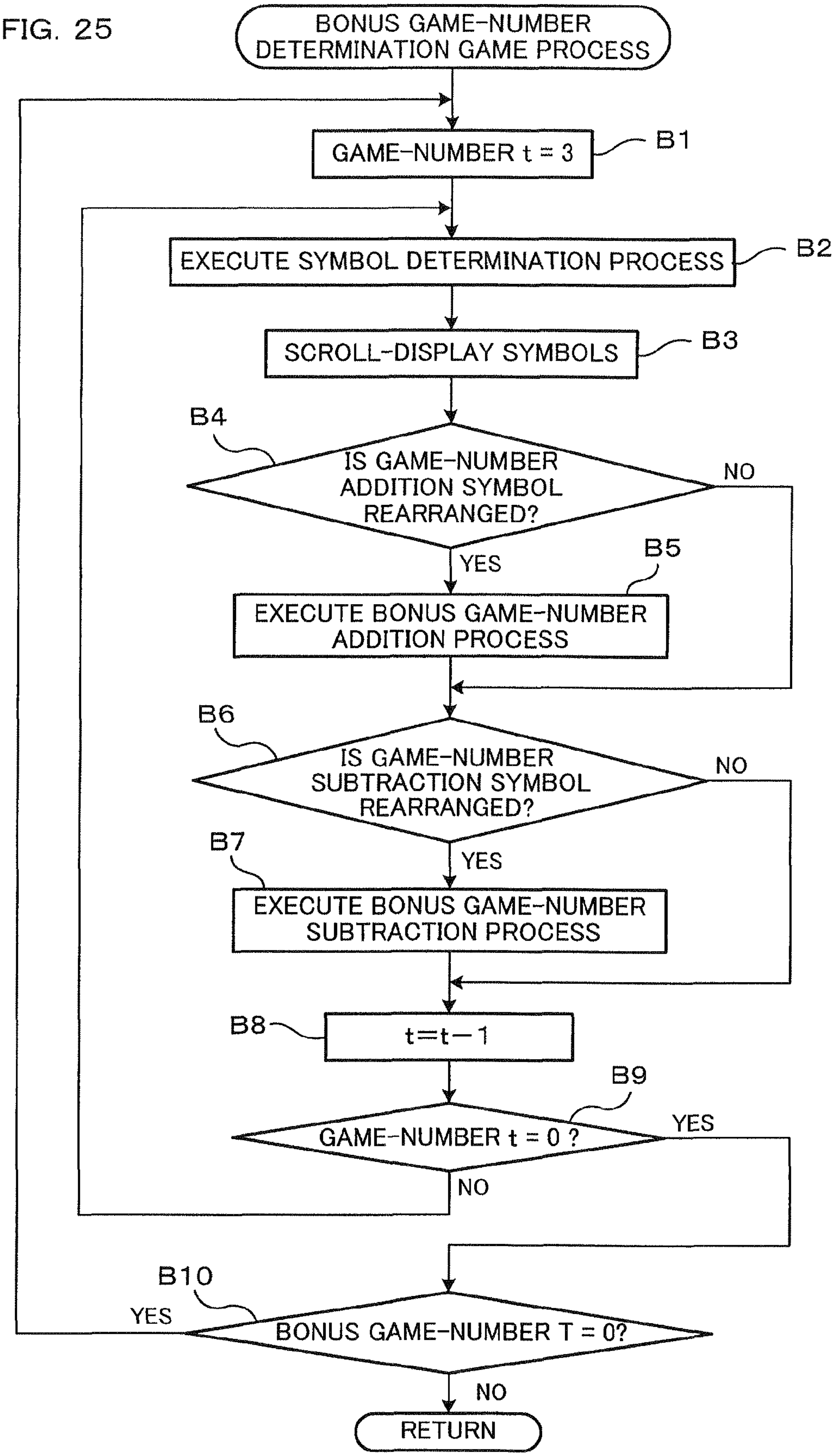
FIG. 25 is a flow chart of a bonus game-number determination game process.

When it is determined that the bonus game-number T is “0” in the step A13 of FIG. 24, the main CPU 41 of the slot machine 1 executes a bonus game-number determination game process routine shown in FIG. 25. In the bonus game-number determination game process routine, first, the main CPU 41 sets a game-number t to “3” (B1). Then, a symbol determination process is performed (B2). That is, a stop symbol determination program stored in the RAM 43 is run to determine a symbol matrix.

Next, scatter symbols 180 are scroll-displayed in the arrangement areas 151, 152, 153, 154, and 155 (B3). After scatter symbols 180 are scrolled, symbols of the symbol matrix determined in the step B2 are stopped (rearranged) in the arrangement areas 151, 152, 153, 154, and 155.

Next, it is determined if a game-number addition symbol 181 is rearranged (B4). When it is determined that a game-number addition symbol 181 is rearranged (B4, YES), a bonus game-number addition process is performed using the addition game-number determination table shown in FIG. 22A (B5).

When it is determined that a game-number addition symbol 181 is not rearranged in the step B4 (B4, NO), or after the step B5, it is determined if a game-number subtraction symbol 182 is rearranged (B6). When it is determined that a game-number subtraction symbol 182 is rearranged (B6, YES), executed is a bonus game-number subtraction process, using the subtraction game-number determination table shown in FIG. 22B (B7).

When it is determined that a game-number subtraction symbol 182 is not rearranged in the step B6 (B6, NO), or after the step B7, the game-number t is decremented by “1” (B8), and it is determined if the game-number t is “0” (B9). When it is determined that the game-number t is not “0” (B9, NO), the process returns to the step B2. On the other hand, when it is determined that the game-number t is “0” (B9, YES), it is determined if the bonus game-number T is “0” (B10).

When it is determined that the bonus game-number T is “0” (B10, YES), the process returns to the step B1. Thus, a bonus game-number determination game is executed again. On the other hand, when it is determined that bonus game-number T is not “0” (B10, NO), this routine ends.

[Bonus Game Process]

Figure 26:
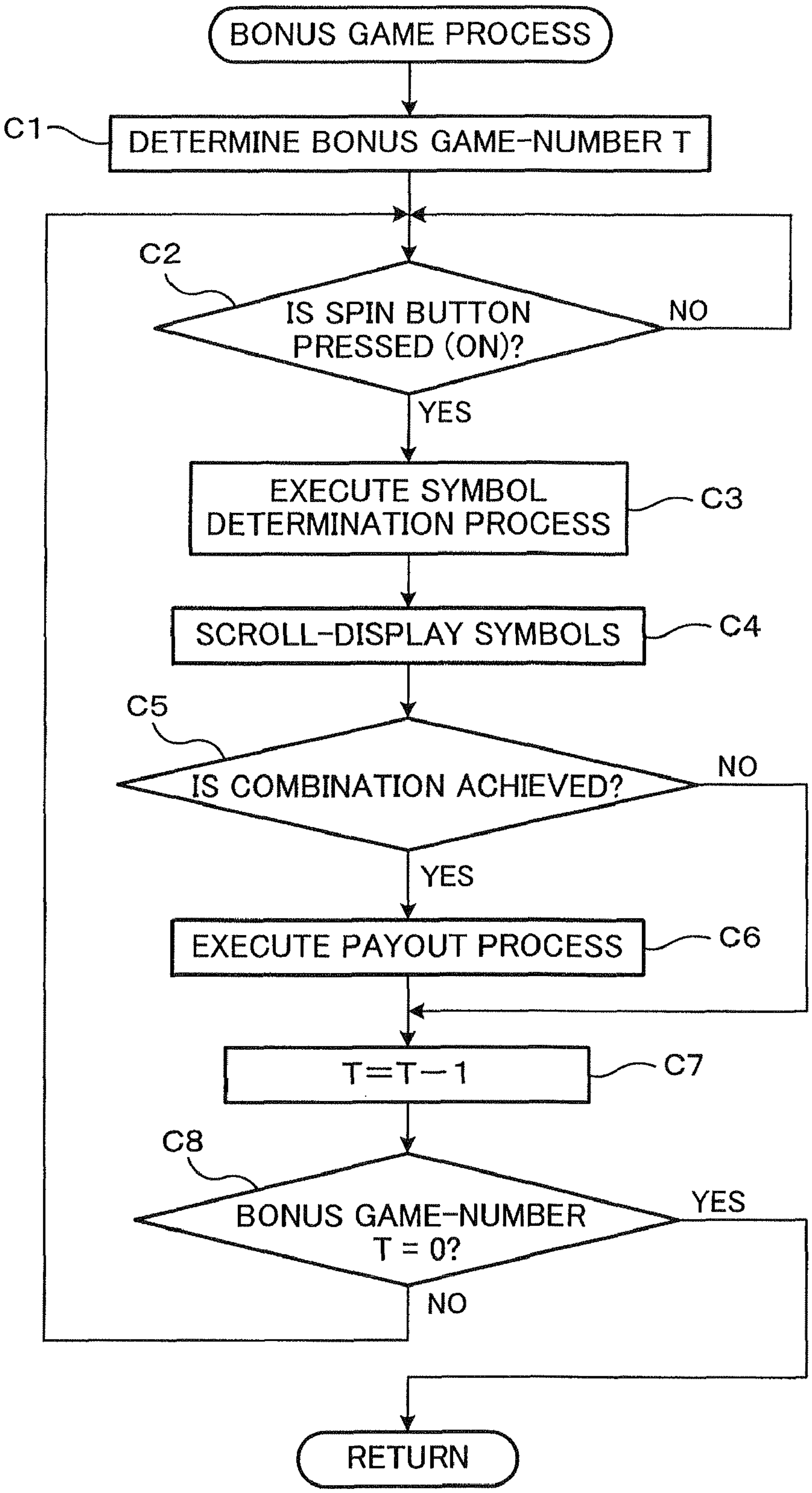
FIG. 26 is a flow chart of a bonus game process.

When it is determined that the bonus game-number T is not “0” in the step A13 of FIG. 24, or after the step A14 of FIG. 24, the main CPU 41 of the slot machine 1 executes a bonus game process routine shown in FIG. 26. In the bonus game process routine, first, the main CPU 41 determines a bonus game-number T (C1). The bonus game-number T is same as the bonus game-number displayed on the bonus game-number indicator 183 of the display 101 (center liquid crystal panel 5B) at a time of transition to the bonus game.

Then, it is determined if the spin button 73 is pressed (set to ON) (C2). When it is determined that the spin button 73 is not pressed (not set to ON) (C2, NO), the process returns to the step C2. On the other hand, when it is determined that the spin button 73 is pressed (set to ON) (C2, YES), a symbol determination process is performed (C3). That is, a stop symbol determination program stored in the RAM 43 is executed to determine a symbol matrix.

Then, scatter symbols 180 are scroll-displayed in the arrangement areas 151, 152, 153, 154, and 155 (C4). After scatter symbols 180 are scrolled, symbols of the symbol matrix determined in the step C3 are stopped (rearranged) in the arrangement areas 151, 152, 153, 154, and 155.

Then, it is determined if a combination is achieved, i.e., if four or more scatter symbols 180 of the same kind are rearranged (C5). When it is determined that a combination is achieved (C5, YES), a payout process is executed (C6). That is, the number of coins to be paid out is calculated according to the number of scatter symbols of the same kind. When a coin to be paid out is reserved, a predetermined number of credits are added to the number of credits stored in the RAM 43. On the other hand, when a coin is paid out, a control signal is transmitted to the hopper 66 to pay out a predetermined number of coins to the coin receiving tray 19.

When it is determined that a combination is not achieved in the step C5 (C5, NO), or after the step C6, the bonus game-number T is decremented by "1" (C7), and it is determined if the bonus game-number T is "0" (C8). When it is determined that the bonus game-number T is not "0" (C8, NO), the process returns to the step C2. On the other hand, when it is determined that the bonus game-number T is "0" (C8, YES), this routine ends.

As described above, when a first symbol (game-number addition symbol) 181 is rearranged in the arrangement areas 151 to 155, a value determined based on the number of first symbols 181 rearranged and a type of bet operation received by the input device 103 (operation buttons 11) is added to the accumulated value (bonus game-number) incremented/decremented by the count device 102 (center liquid crystal panel 5B). On the other hand, when a second symbol (game-number subtraction symbol) 182 is rearranged in the arrangement areas 151 to 155, a value determined based on the number of second symbols 182 rearranged and a type of bet operation received by the input device 103 is subtracted from the accumulated value. When a predetermined condition is satisfied and the accumulated value is not 0, executed is a bonus game whose scale depends on the accumulated value. On the other hand, when the predetermined condition is satisfied and the accumulated value is 0, executed is an accumulated value determination game (bonus game-number determination game) to determine an accumulated value of 1 or greater, and then executed is a bonus game whose scale depends on the determined accumulated value. Thus, the accumulated value, which is incremented due to a rearrangement of a first symbol 181 and decremented due to a rearrangement of a second symbol 182, enables a player to recognize in advance the scale of a bonus game to be executed at a time of satisfaction of the predetermined condition. Therefore, the player's expectation for the bonus game is likely to be increased.

In the detailed description provided above, characteristic parts have mainly been described in order that the present invention can be understood more easily. However, the present invention is not limited to the embodiment shown in the detailed description provided above, and may be applied to other embodiments. The scope of application of the present invention should be construed as broadly as possible. Terms and phraseologies adopted in the present specification are for correctly illustrating the present invention, not for limiting. It would be easy for those skilled in the art to derive, from the spirit of the invention described in the present specification, other structures, systems, methods and the like which are included in the spirit of the invention. Accordingly, it should be considered that claims cover equivalent structures, too, without departing from the technical idea of the present invention. An object of the abstract is to enable an intellectual property office, general public institutions, persons belonging to the art but not familiar with patent, legal terms, or technical terms to quickly understand technical contents and essences of the present invention through a simple research. Therefore, the abstract is not intended to limit the scope of the invention that should be evaluated by the claims. In addition, it is desirable to sufficiently refer to already-disclosed documents and the like, in order to fully understand the objects and effects of the present invention.

The detailed description provided above includes a processing which is executed on a computer or a computer network. The descriptions and expressions provided above are given for the purpose of allowing those skilled in the art to understand the invention most effectively. In the specification, respective steps used to induce one result, or blocks having a predetermined processing function should be understood as a processing having no self-contradiction. In addition, in each step or block, an electrical or magnetic signal is transmitted/received, recorded, and the like. In a processing in each step or block, such a signal is embodied in the form of a bit, a value, a symbol, a character, a term, a number, and the like. However, it should be noted that they have been used simply because they are convenient for explanations. A processing in each step or block has sometimes been described using an expression which is common to a human behavior. However, in principle, the processing described in the specification is executed by various devices. In addition, other structures necessary for each step or block are apparent from the above description.

Third Embodiment

The following describes a third embodiment of a slot machine (a gaming machine) and playing method thereof according to the present invention, with reference to FIGS. 27 to 41. Note that reference numerals respectively given to members in the figures referred to in this embodiment, reference symbols (such as "S") respectively representing steps in flowcharts in the figures, and description using these reference numerals and reference symbols are effective only in this embodiment. Each of these numerals and symbols does not represent a member or step in other embodiments.

Figure 27:
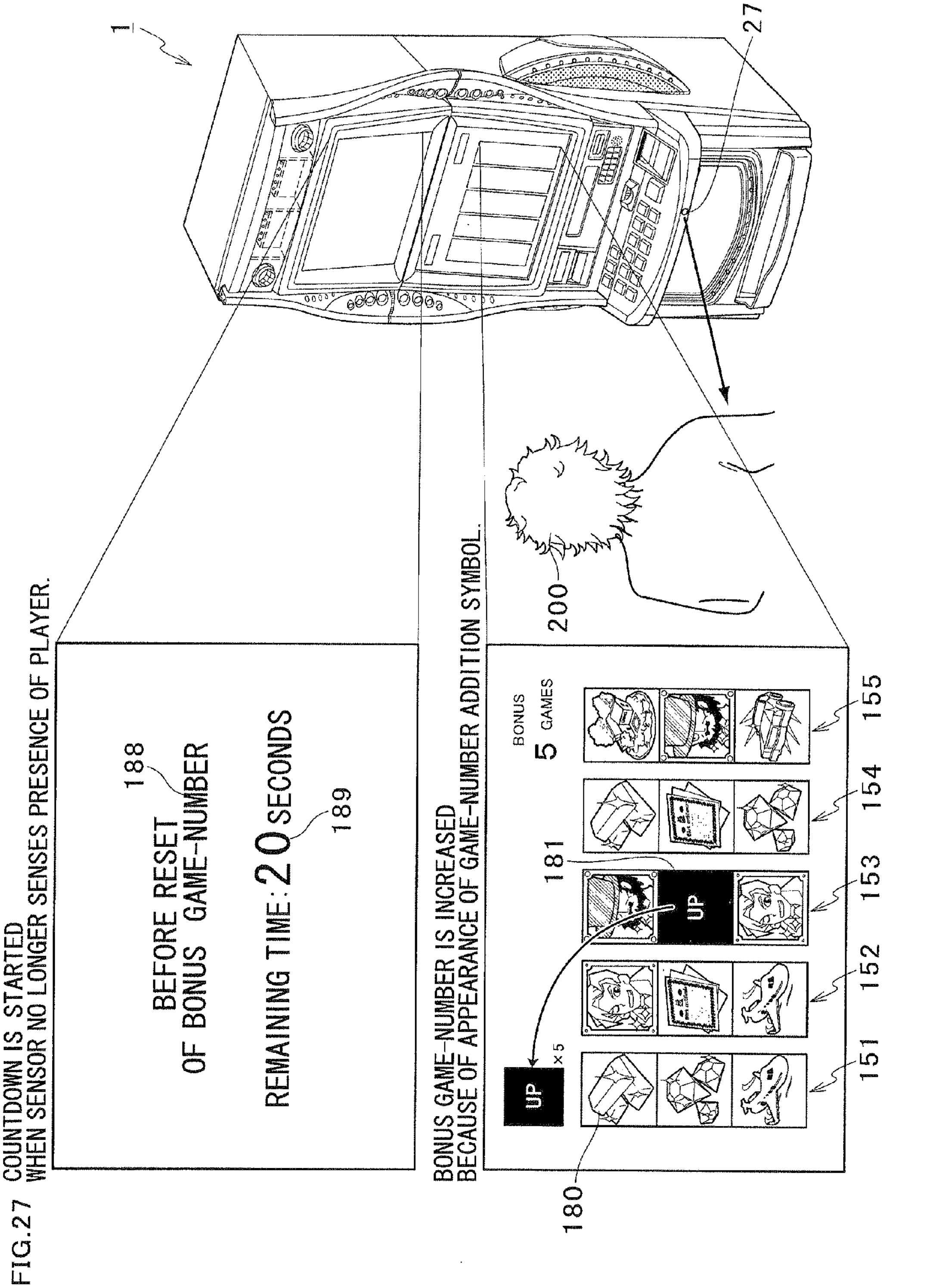
FIG. 27 is an explanatory view illustrating a playing method of a slot machine.

As shown in FIG. 27, the slot machine executes a playing method including the steps of: rearranging scatter symbols 180 in a matrix of arrangement areas 151 to 155 of a display; giving a payout according to the number of scatter symbols 180 rearranged; when a specific symbol 181 is rearranged in the arrangement areas 151 to 155 as a result of a rearrangement of scatter symbols 180, adding a value determined based on the number of specific symbols 181 rearranged and a type of bet operation received by an input device to an accumulated value incremented/decremented by a count device; when a predetermined condition is satisfied and the accumulated value is not 0, executing a bonus game whose scale depends on the accumulated value; when the predetermined condition is satisfied and the accumulated value is 0, executing an accumulated value determination game to determine an accumulated value of 1 or greater, and then executing a bonus game whose scale depends on the determined accumulated value; triggering a timer, when a sensor which has sensed the presence of a player 200 senses no presence of the player 200, to measure a period during which the sensor senses no presence of the player 200; and resetting the accumulated value when the period during which the sensor senses no presence of the player 200 lasts a predetermined time.

In this embodiment, "specific symbol" means a symbol for incrementing a game-number (hereinafter "game-number addition symbol") 181. Meanwhile, as scatter symbols 180, there exist eight kinds of scatter symbols, which are "HERO", "JET", "VILLA", "GOLD BAR", "CAR", "STOCK CER- TIFICATE", "RIVAL", and "DIAMOND"; and a game-number addition symbol 181, which is "UP".

Also in this embodiment, "bet operation" includes: a one-bet operation of making a one-bet which is a bet form of betting a minimum game value; and a maximum-bet operation of making a maximum-bet which is a bet form of betting a maximum game value that can be bet in one unit game. In addition, "predetermined condition" means that, in this embodiment, three to five scatter symbols of the same kind are rearranged in any row in a row direction. Here, a row direction is a horizontal direction perpendicular to the direction in which symbols scroll.

Further, "accumulated value" means a bonus game-number which is the number of unit games in a bonus game. In addition, "bonus game" means a gaming state which provides a larger advantage than a basic game. In this embodiment, "accumulated value determination game" means a bonus game-number determination game to determine a bonus game-number for a bonus game.

[Display 101]

Figure 28:
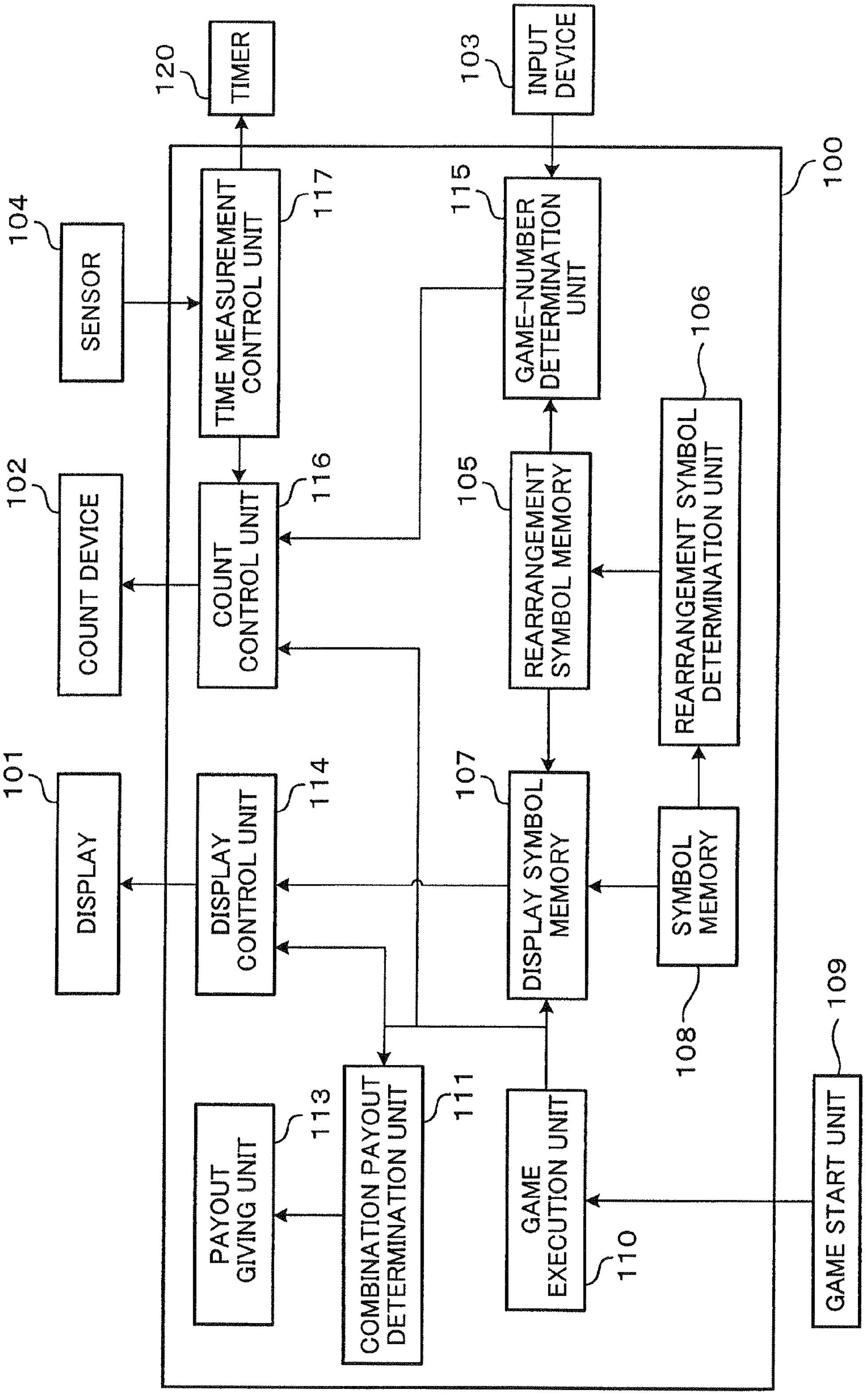
FIG. 28 is a block diagram of the slot machine.

As shown in FIG. 28, the slot machine which executes the above-described playing method has a display 101, a count device 102, an input device 103, a sensor 104, a timer 120, and a controller 100. The display 101 has the matrix of arrangement areas 151 to 155. In these arrangement areas 151 to 155, more than one kinds of scatter symbols 180 are arranged.

Figure 29:
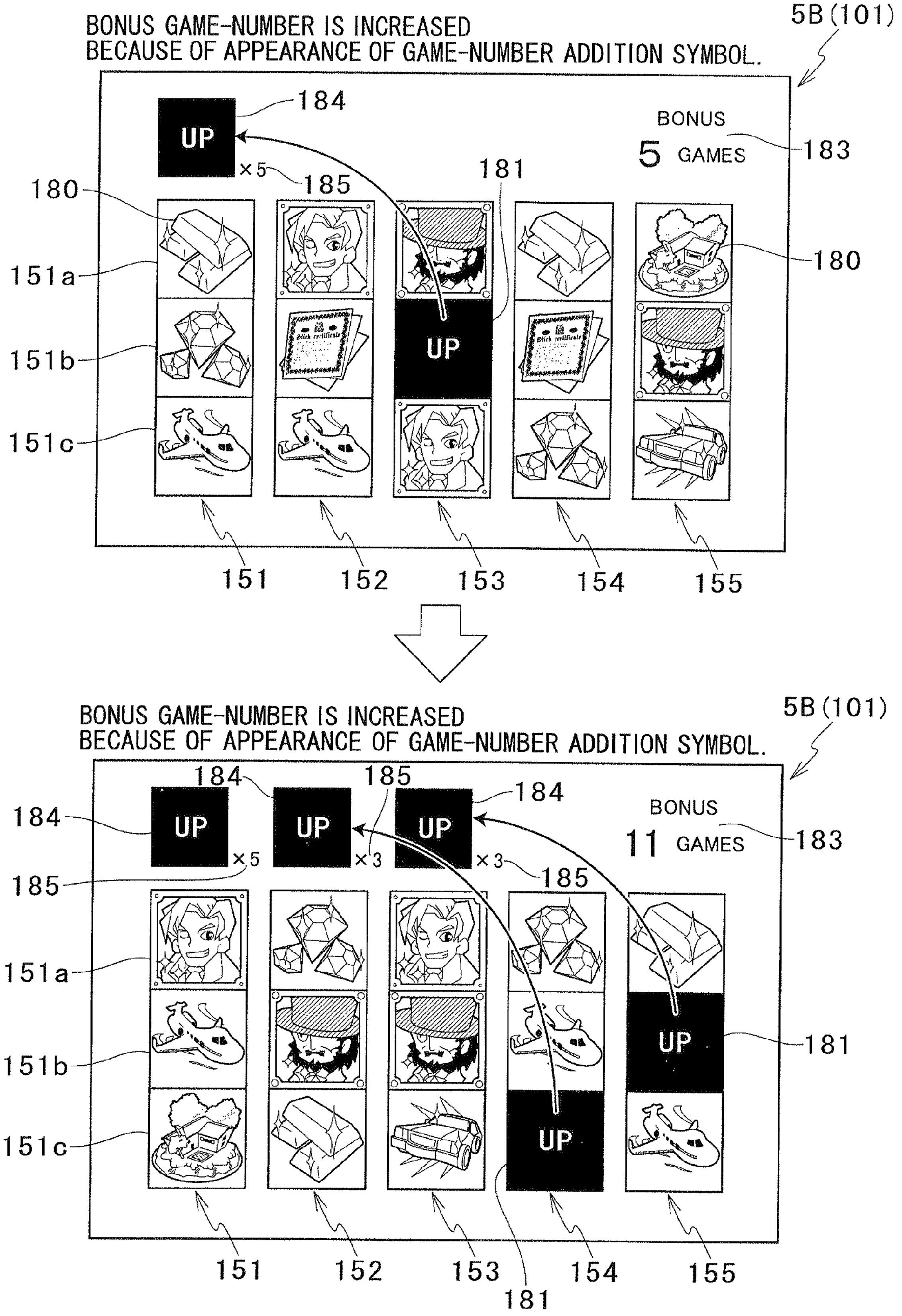
FIG. 29 is an explanatory view of a display screen.

Here, "arranged" means a state where scatter symbols 180 are visually identifiable by a player. In other words, it represents a state where scatter symbols 180 are displayed in the arrangement areas 151 to 155, as shown in FIG. 29. Meanwhile, "to rearrange" means to arrange scatter symbols 180 again after releasing them.

The display 101 may be mechanically structured with a reel device which arranges scatter symbols utilizing the rotation of a reel. Alternatively, the display 101 may have an electrical structure in which scatter symbols are arranged in a video reel displayed as an image. Further, the display 101 may have a structure of a combination of the mechanical structure (reels) and the electrical structure (video reels). The electrical structure may include a liquid crystal display device, a CRT (cathode-ray tube) device, a plasma display device, or the like. The specific structure of the display 101 will be detailed later.

[Count Device 102]

The count device 102 is configured to increment/decrement a bonus game-number for a bonus game. The bonus game-number is incremented every time a game-number addition symbol 181 is rearranged on the display 101.

The count device 102 may be mechanically structured with a counter which increments/decrements the bonus game-number, or may have an electrical structure in which the bonus game-number is displayed as an image. The electrical structure may include a liquid crystal display device, a CRT (cathode-ray tube) device, a plasma display device, or the like. The specific structure of the count device 102 will be detailed later.

[Input Device 103]

The input device 103 is configured to receive a one-bet operation and maximum-bet operation from outside. The input device 103 may be structured with buttons such as a later-mentioned one-bet button 76 and maximum bet button 77, or may be structured with a touch panel or the like.

[Sensor 104]

The sensor 104 is configured to sense the presence of a player 200 who is playing a game at a slot machine 1. The sensor 104 may be constituted by a later-mentioned infrared sensor 27 or the like.

[Timer 120]

The timer 120 is configured to be triggered, when the sensor 104 which has sensed the presence of the player 200 senses no presence of the player 200, to measure a period during which the sensor 104 senses no presence of a player 200. The timer 120 may be mechanically structured with, for example, a clock which measures time, or may have an electrical structure of displaying time as an image. The electrical structure may include a liquid crystal display device, a CRT (cathode-ray tube) device, a plasma display device, or the like. The specific structure of the timer 120 will be detailed later.

[Controller 100]

The controller 100 is configured to execute: a first process of rearranging scatter symbols 180 in the matrix of arrangement areas 151 to 155 of the display 101; a second process of giving a payout according to the number of scatter symbols 180 rearranged; a third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102; a fourth process of, when a predetermined condition is satisfied and the accumulated value is not 0, executing a bonus game whose scale depends on the accumulated value; a fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value; a sixth process of triggering the timer 120, when the sensor 104 which has sensed the presence of a player 200 senses no presence of the player 200, to measure a period during which the sensor 104 senses no presence of the player 200; and a seventh process of resetting the accumulated value when the period during which the sensor 104 senses no presence of the player 200 lasts a predetermined time. In other words, the controller 100 has a first processing unit, a second processing unit, a third processing unit, a fourth processing unit, a fifth processing unit, a sixth processing unit, and a seventh processing unit.

The controller 100 has a symbol memory 108 which stores all the scatter symbols 180, and a display symbol memory 107 which stores scatter symbols to be displayed among the scatter symbols 180 stored in the symbol memory 108. The display symbol memory 107 can be accessed by a display control unit 114. In response to a control by a game execution unit 110, the display control unit 114 reads out the scatter symbols in the display symbol memory 107, and displays the scatter symbols on the display 101. A specific display state will be detailed later.

The controller 100 has a rearrangement symbol determination unit 106 which determines scatter symbols to be rearranged (hereinafter, rearrangement scatter symbols) every unit game, based on the scatter symbols 180 stored in the symbol memory 108. The rearrangement scatter symbols determined by the rearrangement symbol determination unit 106 are stored in a rearrangement symbol memory 105. Then, the rearrangement scatter symbols are output to the display symbol memory 107. After that, the rearrangement scatter symbols are displayed on the display 101 through image processing performed in the display control unit 114. That is, the controller 100 executes the first process of rearranging scatter symbols 180 in the matrix of arrangement areas 151 to 155 of the display 101.

Further, the controller 100 is connected to a game start unit 109. The game start unit 109 has a function of outputting a game start signal in response to an operation by a player. The controller 100 has: the game execution unit 110 which executes a unit game of rearranging scatter symbols 180, triggered by a game start signal from the game start unit 109; a combination payout determination unit 111 which determines a payout according to the number of scatter symbols 180 rearranged in a unit game; and a payout giving unit 113 which gives a payout determined by the combination payout determination unit 111. That is, the controller 100 executes the second process of giving a payout according to the number of scatter symbols 180 rearranged.

Further, the controller 100 has a game-number determination unit 115, and a count control unit 116. To the game-number determination unit 115 are input: rearrangement scatter symbols determined by the rearrangement symbol determination unit 106 and stored in the rearrangement symbol memory 105; and the type of bet operation received by the input device 103 from outside.

Based on the rearrangement scatter symbols input from the rearrangement symbol memory 105, the game-number determination unit 115 determines if a game-number addition symbol 181 is rearranged or not as a result of a rearrangement of scatter symbols 180 in a unit game. Then, when it is determined that a game-number addition symbol 181 is rearranged, the game-number determination unit 115 determines a bonus game-number to be added ("addition-number"), based on the number of game-number addition symbols 181 rearranged and the type of bet operation received by the input device 103 from outside.

The count control unit 116 causes the count device 102 to add the addition-number determined by the game-number determination unit 115 to the bonus game-number, at a timing of rearrangement of scatter symbols 180 on the display 101. That is, the controller 100 executes the third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102.

The game execution unit 110 executes a bonus game when a predetermined condition is satisfied. In the bonus game, a free game is carried out, of which number of times (number of unit games) is same as the bonus game-number that the count device 102 has, at a time of satisfaction of the predetermined condition, for increment/decrement operation. Every time a unit game of a free game is carried out, the count control unit 116 causes the count device 102 to decrement the bonus game-number by 1. Meanwhile, when the predetermined condition is satisfied and the bonus game-number incremented/decremented by the count device 102 is "0", the game execution unit 110 executes a bonus game-number determination game, and executes a bonus game after the bonus game-number incremented/decremented by the count device 102 becomes "1" or greater. That is, the controller 100 executes the fourth process of, when a predetermined condition is satisfied and the accumulated value (bonus game-number) is not 0, executing a bonus game whose scale depends on the accumulated value; and the fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

Also, the controller 100 has a time measurement control unit 117. To the time measurement control unit 117 input is a predetermined signal from the sensor 104 which senses the presence of a player 200.

The time measurement control unit 117 determines if a player 200 is present in front of the slot machine 1, based on the predetermined signal input from the sensor 104. When the time measurement control unit 117 determines that the player 200 is not present in front of the slot machine 1, i.e., it determines that the player 200 who played a game at the slot machine 1 has gone to somewhere, the time measurement control unit 117 triggers the timer 120 to measure a period during which the sensor 104 senses no presence of the player 200. That is, the controller 100 executes the sixth process of triggering the timer 120, when the sensor 104 which has sensed the presence of the player 200 senses no presence of the player 200, to measure a period during which the sensor 104 senses no presence of the player 200.

In addition, the time measurement control unit 117 determines if a period during which the sensor 104 senses no presence of the player 200 lasts a predetermined time. When the time measurement control unit 117 determines that the period during which the sensor 104 senses no presence of the player 200 lasts the predetermined time, the time measurement control unit 117 outputs a reset signal to the count control unit 116, thereby resetting the bonus game-number incremented/decremented by the count device 102. That is, the controller 100 executes the seventh process of resetting the accumulated value (bonus game-number) when the period during which the sensor 104 senses no presence of the player 200 lasts a predetermined time.

Each of the blocks of the controller 100 may be realized in the form of hardware or in the form of software if necessary.

[Operation of Controller 100]

The following describes an operation of the controller 100 having the above-described structure. First, rearrangement scatter symbols are determined by the rearrangement symbol determination unit 106. The rearrangement scatter symbols determined are stored in the rearrangement symbol memory 105. Then, the rearrangement scatter symbols stored in the rearrangement symbol memory 105 are stored in the display symbol memory 107 and the game-number determination unit 115. Then, the rearrangement scatter symbols stored in the display symbol memory 107 are prepared to be displayed by the display control unit 114 on the display 101. When the game execution unit 110 executes a unit game, scatter symbols 180 are rearranged by having the display 101 display thereon the rearrangement scatter symbols stored in the display symbol memory 107. Thus, the controller 100 executes the first process of rearranging scatter symbols 180 in the matrix of arrangement areas 151 to 155 of the display 101.

Then, the combination payout determination unit 111 and the payout giving unit 113 give a payout according to the number of scatter symbols 180 rearranged. Thus, the controller 100 executes the second process of giving a payout according to the number of scatter symbols 180 rearranged.

On the other hand, the rearrangement scatter symbols stored in the game-number determination unit 115 are used for determining a bonus game-number. Specifically, when a game-number addition symbol 181 is rearranged as a result of a rearrangement of scatter symbols 180, a bonus game-number to be added ("addition-number") is determined based on the number of game-number addition symbols 181 rearranged and the type of bet operation received by the input device 103 from outside. On the other hand, when no game-number addition symbol 181 is rearranged, the addition-number is not determined.

The addition-number determined by the game-number determination unit 115 is output to the count control unit 116. Then, the addition-number determined by the game-number determination unit 115 is added by the count control unit 116 to the bonus game-number of the count device 102, at a timing of rearrangement of scatter symbols 180 on the display 101. Thus, the controller 100 executes the third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102.

Then, when a predetermined condition is satisfied, a bonus game is executed by the game execution unit 110. In the bonus game, a free game is carried out, of which number of times (number of unit games) is same as the bonus game-number that the count device 102 has, at a time of satisfaction of the predetermined condition, for increment/decrement operation. Every time a unit game of a free game is carried out, the bonus game-number incremented/decremented by the count device 102 is decreased by 1 by the count control unit 116. Meanwhile, when the predetermined condition is satisfied and the bonus game-number incremented/decremented by the count device 102 is "0", a bonus game-number determination game is executed by the game execution unit 110, and a bonus game is executed after the bonus game-number incremented/decremented by the count device 102 becomes "1" or greater. Thus, the controller 100 executes the fourth process of, when a predetermined condition is satisfied and the accumulated value (bonus game-number) is not 0, executing a bonus game whose scale depends on the accumulated value; and the fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value.

In addition, based on a predetermined signal input from the sensor 104, it is determined by the time measurement control unit 117, whether a player 200 is present in front of the slot machine 1. When it is determined that the player 200 is not present in front of the slot machine 1, i.e., it is determined that the player 200 who played a game at the slot machine 1 has gone to somewhere, a period during which the sensor 104 senses no presence of the player 200 is measured by the timer 120. Thus, the controller 100 executes the sixth process of triggering the timer 120, when the sensor 104 which has sensed the presence of the player 200 senses no presence of the player 200, to measure a period during which the sensor 104 senses no presence of the player 200.

Further, it is determined by the time measurement control unit 117 whether the period during which the sensor 104 senses no presence of the player 200 lasts a predetermined time. When it is determined that the period during which the sensor 104 senses no presence of the player 200 lasts the predetermined time, a reset signal is output by the time measurement control unit 117 to the count control unit 116, so that the bonus game-number incremented/decremented by the count device 102 is reset. Thus, the controller 100 executes the seventh process of resetting the accumulated value (bonus game-number) when the period during which the sensor 104 senses no presence of the player 200 lasts a predetermined time.

As clearly seen from the above operations, as well as shown in FIG. 27, the slot machine 1 realizes a playing method including: rearranging scatter symbols 180 in the matrix of arrangement areas 151 to 155 of the display 101; giving a payout according to the number of scatter symbols 180 rearranged; when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 to an accumulated value (bonus game-number) incremented/decremented by the count device 102; when a predetermined condition is satisfied and the accumulated value is not 0, executing a bonus game whose scale depends on the accumulated value; when the predetermined condition is satisfied and the accumulated value is 0, executing an accumulated value determination game (bonus game-number determination game) to determine an accumulated value of 1 or greater, and then executing a bonus game whose scale depends on the determined accumulated value; triggering the timer 120, when the sensor 104 which has sensed the presence of a player 200 senses no presence of the player 200, to measure a period during which the sensor 104 senses no presence of the player 200; and resetting the accumulated value when the period during which the sensor 104 senses no presence of the player 200 lasts a predetermined time.

According to the above playing method, when a specific symbol (game-number addition symbol) 181 is rearranged in the arrangement areas 151 to 155, a value determined based on the number of specific symbols 181 rearranged and the type of bet operation received by the input device 103 is added to the accumulated value (bonus game-number) incremented/decremented by the count device 102. Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game (bonus game-number determination game) to determine an accumulated value of 1 or greater, and then executed is a bonus game whose scale depends on the determined accumulated value. Thus, the accumulated value, which is incremented due to a rearrangement of a specific symbol 181, enables a player to recognize in advance the scale of a bonus game to be executed at a time of satisfaction of the predetermined condition. Therefore, the player's expectation for the bonus game is likely to be increased.

In addition, when a period during which the sensor 104 senses no presence of the player 200 lasts a predetermined time, the accumulated value is reset. This causes the player 200 to have a desire to consume, for oneself, a bonus game whose scale depends on the accumulated value that the player 200 has accumulated, thereby increasing the motivation of the player 200 for a game. Furthermore, the timer 120 measures, from when the sensor 104 no longer senses the presence of the player 200, a period during which the sensor 104 senses no presence of the player 200. Therefore, the player 200 recognizes the period measured by the timer 120, and this increases a possibility of avoiding a disadvantage which is a reset of the accumulated value.

[Display State]

Specifically described hereinafter is an exemplary display state of the display 101 in the slot machine 1 and in the operation process of the playing method thereof. The following description deals with a case where scatter symbols are arranged on the display 101 of a video reel-type, as shown in FIG. 29.

The display 101 has arrangement areas 151, 152, 153, 154, and 155 in which scatter symbols 180 are arranged. In the arrangement areas 151, 152, 153, 154, and 155, symbol columns having more than one scatter symbols 180 are scroll-displayed, respectively. Each of the arrangement areas 151, 152, 153, 154, and 155 is divided into an upper row 151*a*, a middle row 151*b*, and a lower row 151*c*. Scatter symbols 180 are stopped (arranged) in the rows 151*a*, 151*b*, and 151*c* of the respective arrangement areas. For example, in FIG. 29, "GOLD BAR" is stopped in the upper row 151*a* of the arrangement area 151, "DIAMOND" is stopped in the middle row 151*b* of the arrangement area 151, and "JET" is stopped in the lower row 151*c* of the arrangement area 151. Thus, the arrangement areas 151, 152, 153, 154, and 155 display a symbol matrix of five columns and three rows. Note that the symbol matrix is not limited to a matrix of five columns and three rows.

This embodiment deals with a case where a process of paying out a coin or the like is performed when a predetermined number (e.g., four) or more scatter symbols of a same kind are displayed in the symbol matrix. However, it is possible to employ such a configuration that, for example, a payline L is provided so as to cross the middle row 151*b* of the arrangement areas 151, 152, 153, 154, and 155, and a coin is paid out when scatter symbols stopped on the payline L correspond to a predetermined combination.

As shown in FIG. 29, when a game-number addition symbol 181 is rearranged, an addition icon 184 imitating a game-number addition symbol 181, and an addition game-number icon 185 are displayed above the arrangement areas 151, 152, 153, 154, and 155. In addition, the bonus game-number displayed on a bonus game-number indicator 183 of the display 101 is increased by the value indicated by the addition game-number icon 185. Every time a game-number addition symbol 181 is rearranged, another addition icon 184 and addition game-number icon 185 are displayed in an addition manner, and the bonus game-number displayed on the bonus game-number indicator 183 is incremented.

Here, the game-number to be added ("addition game-number") corresponding to one game-number addition symbol 181 is different depending on the type of bet operation. In this embodiment, when a unit game is played through a one-bet operation, the addition game-number is "1". When a unit game is played through a maximum-bet operation, the addition game-number is any one of "1" to "5". As described later, the addition game-number in the case of a maximum-bet operation is randomly determined from the numbers of "1" to "5".

As shown in FIG. 30, when a predetermined number (three to five) scatter symbols of the same kind are rearranged in any row in a row direction, a bonus game is triggered and executed. In FIG. 30, three scatter symbols 180 of the same kind ("HERO") are rearranged in the middle row 151*b* of the arrangement areas 151, 152, and 153. This triggers a bonus game so that a bonus game is executed.

In this embodiment, a bonus game is a free game. In a free game, a unit game can be played without betting a coin, the number of games being same as the bonus game-number displayed on the bonus game-number indicator 183.

Figure 31:
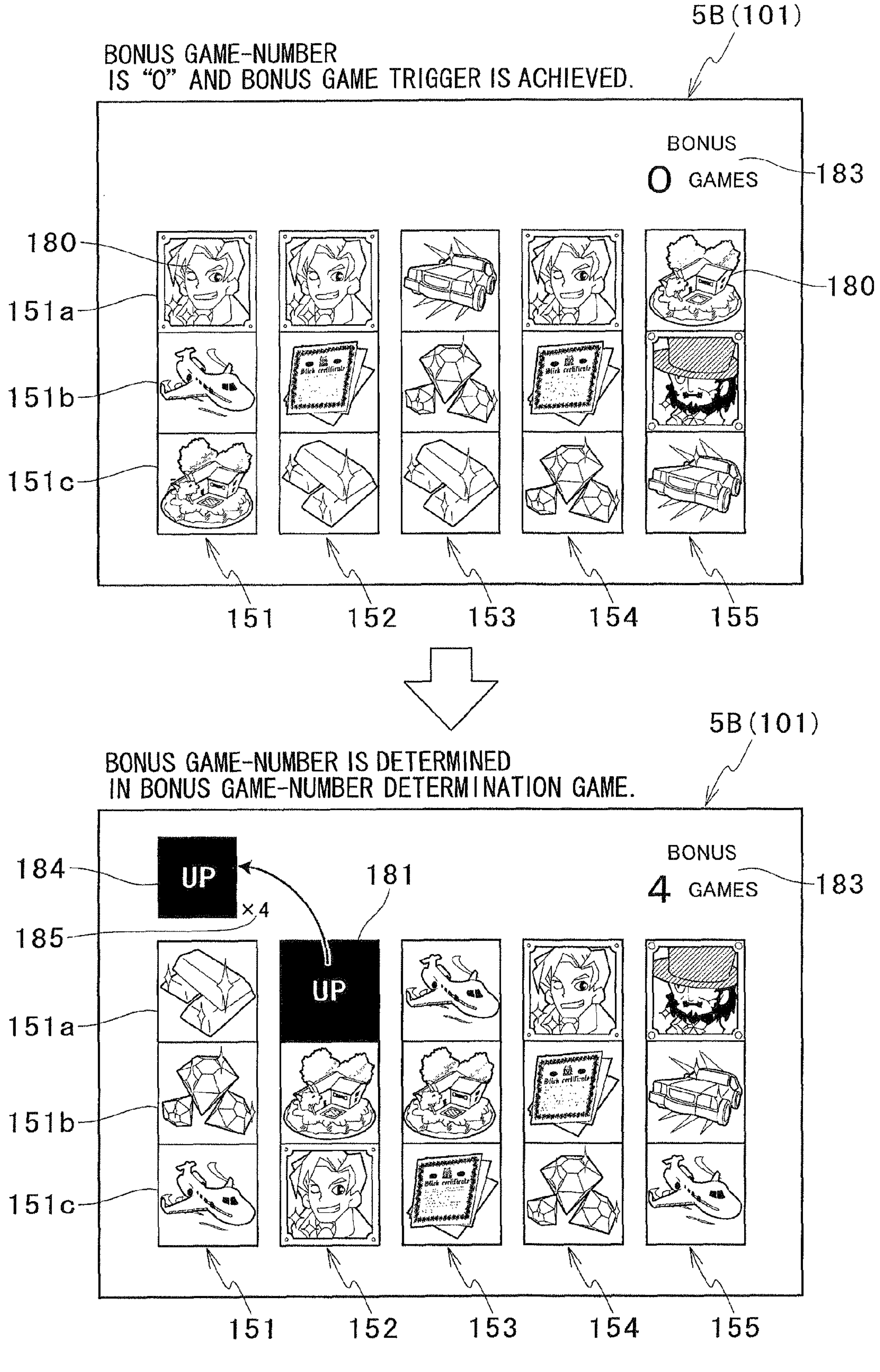
FIG. 31 is another explanatory view of the display screen.

In the meantime, as shown in FIG. 31, when the bonus game-number displayed on the bonus game-number indicator 183 is "0" and a bonus game trigger is achieved, a bonus game-number determination game is executed. In FIG. 31, three scatter symbols 180 of the same kind ("HERO") are rearranged in the upper row 151*a* of the arrangement areas 151, 152, and 154. With this, a bonus trigger is achieved, so that a bonus game-number determination game is executed.

In this embodiment, a bonus game-number determination game is a game without a payout, in which scatter symbols 180 are scroll-displayed and rearranged. In a bonus game-number determination game, scroll-display and rearrangement of scatter symbols 180 are repeated three times to determine a bonus game-number of "1" or greater, as a result of a rearrangement of a game-number addition symbol 181. When a bonus game-number of "1" or greater is not determined even if a bonus game-number determination game is repeated three times, the bonus game-number determination game is repeated until a bonus game-number of "1" or greater is determined. After a bonus game-number of "1" or greater is determined, a bonus game is executed.

Another structure is possible, as for the case where the bonus game-number is "0" and a bonus game trigger is achieved, such that: a predetermined number (e.g. three) is used as a bonus game-number to execute a bonus game; no bonus game is executed; or execution of a bonus game is suspended, and the suspended bonus game is executed at a timing that the bonus game-number becomes "1" or greater.

Figure 32:
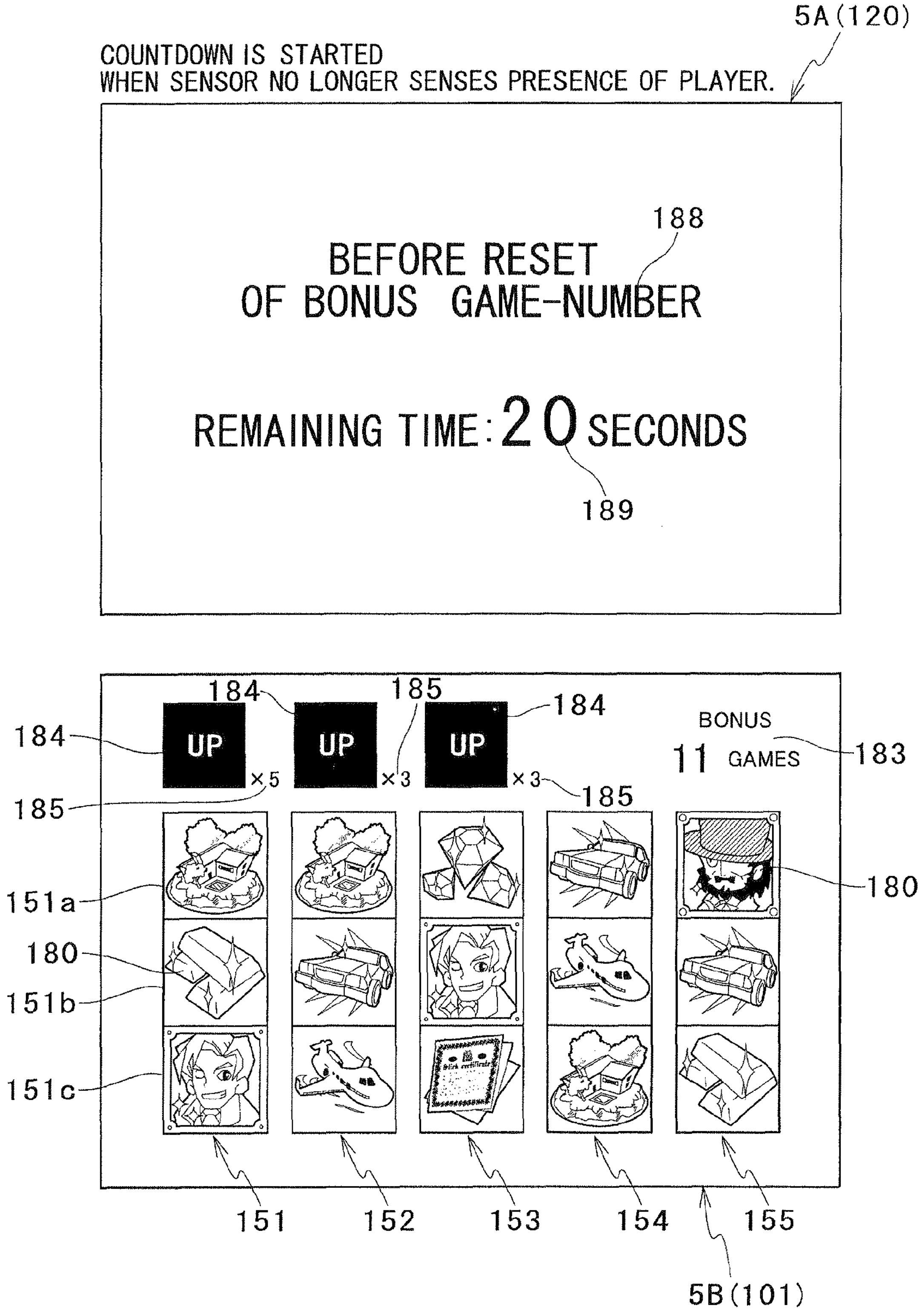
FIG. 32 is another explanatory view of the display screen.

As shown in FIG. 32, when the sensor 104 which has sensed the presence of the player 200 senses no presence of the player 200, the timer 120 is triggered to measure a time remaining before the reset of the bonus game-number. Specifically, when the sensor 104 no longer senses the presence of the player 200, there are displayed on the timer 120: a text image 188 which notifies the player 200 that the bonus game-number is going to be reset; and a counting image 189 which indicates the time remaining before the reset of the bonus game-number. In this embodiment, the bonus game-number is reset when a period during which the sensor 104 senses no presence of the player 200 lasts 60 seconds. Thus, the remaining time of the counting image 189 is counted down from "60" to "0". Then, when the remaining time of the counting image 189 reaches "0", the bonus game-number displayed on the bonus game-number indicator 183 of the display 101 is reset to "0".

[Scatter Symbols]

As shown in FIG. 33, scatter symbols 180 displayed in the arrangement areas 151, 152, 153, 154, and 155 of the display 101 constitute symbol columns, each symbol column having twenty-two scatter symbols. Each symbol of each symbol column has a code number, any one of numbers from 0 to 21. Each symbol column is constituted of a combination of scatter symbols of "HERO", "JET", "VILLA", "GOLD BAR", "CAR", "STOCK CERTIFICATE", "RIVAL", "DIAMOND", and "UP".

Successive three scatter symbols of each symbol column are displayed (arranged) respectively in the upper row 151*a*, the middle row 151*b*, and the lower row 151*c* of each of the arrangement areas 151, 152, 153, 154, and 155, thereby constituting a symbol matrix of five columns and three rows. When a later-mentioned bet button and a spin button are sequentially pressed in this order to start a game, scatter symbols constituting a symbol matrix start to scroll. After the symbols are scrolled for a predetermined period of time, the scrolling of symbols stops (symbols are rearranged).

When a predetermined number or more scatter symbols of the same kind are displayed in the arrangement areas 151, 152, 153, 154, and 155, a player gets an advantage. To get an advantage means that coins are paid out according to scatter symbols displayed, the value of coins to be paid out is added to a credit value, a bonus game is started, or the like.

Specifically, when four or more scatter symbols of the same kind are rearranged in the arrangement areas 151, 152, 153, 154, and 155, twenty coins (game media) are paid out for one bet. When a predetermined number (three to five) of scatter symbols of the same kind are rearranged in any row in a row direction, a bonus game is triggered. This causes a transition of gaming state from a basic game to a bonus game.

Here, a bonus game is a gaming state which provides a larger advantage than a basic game. In this embodiment, the bonus game is a free game. The free game is a game in which a unit game can be played without betting a coin. Note that another bonus game may be employed in combination, provided that the other bonus game is advantageous to a player, i.e., the other bonus game is more advantageous than a basic game. For example, that other bonus game which may be employed is a game providing: a state where a larger amount of game media can be obtained than in a basic game; a state where game media can be obtained more likely than in a basic game; or a state where a smaller amount of game media are consumed than in a basic game.

[Mechanical Structure of the Slot Machine 1]

Next, the following describes a specific example of mechanical and electrical structures of the slot machine 1 thus structured.

Figure 34:
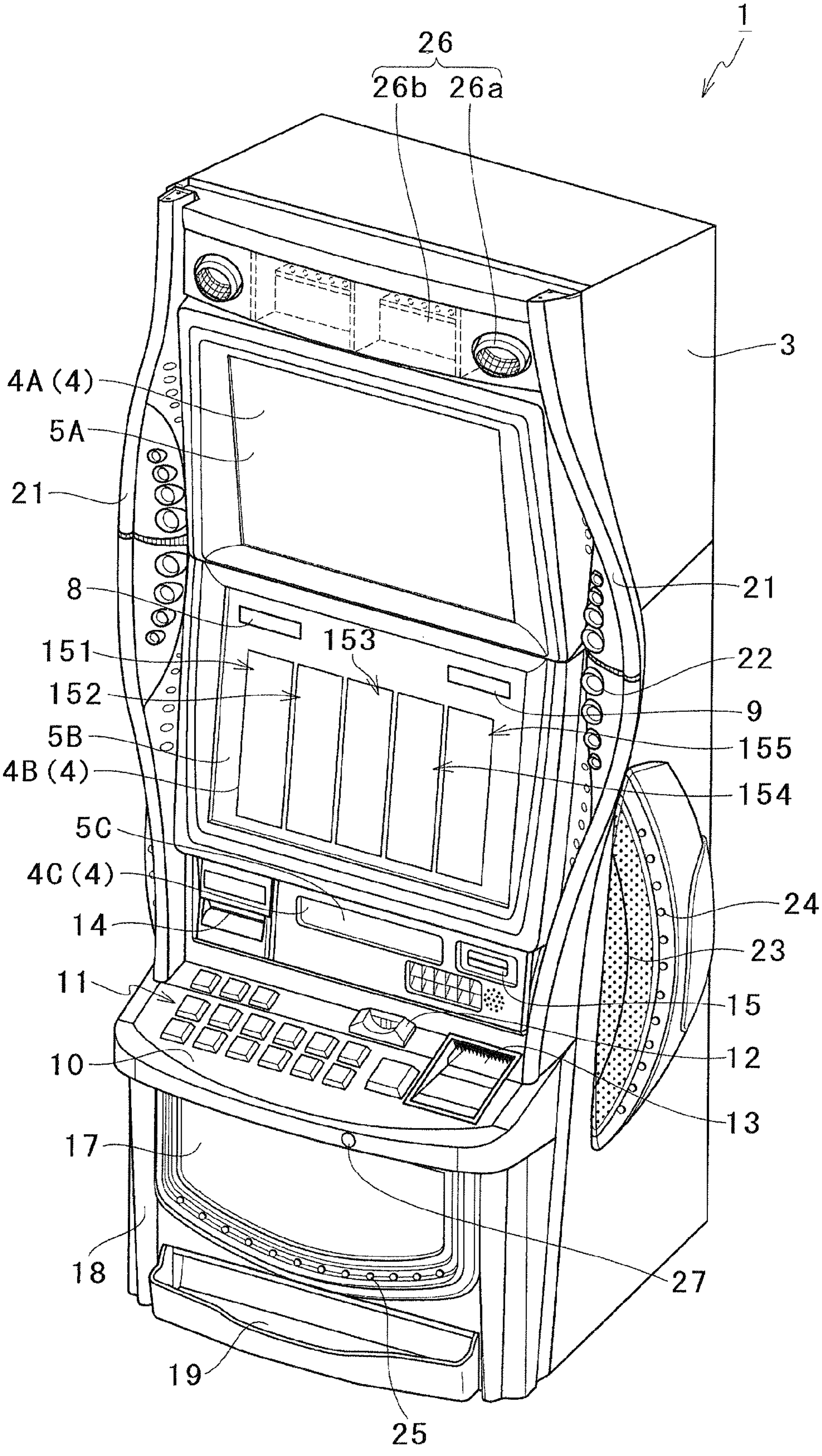
FIG. 34 is a perspective view illustrating an appearance of the slot machine.

As shown in FIG. 34, the slot machine 1 is an upright slot machine and has a cabinet 3 for housing electrical or mechanical components for executing a predetermined game mode. As a display unit 4 for displaying game information in response to a player's game operation, there may be provided an upper variable display unit 4A, a middle variable display unit 4B, and a lower variable display unit 4C. The display units 4A to 4C are attached to the front face of the cabinet 3 having a longer length in the vertical direction.

The upper variable display unit 4A has a transparent upper liquid crystal panel 5A fixed to a front door of the cabinet 3. The upper liquid crystal panel 5A displays thereon an image showing, for example, an effect image, an introduction of a game, or rules of the game.

In addition, a text image 188 and a counting image 189 shown in FIG. 32 are displayed on the upper liquid crystal panel 5A (timer 120) when the infrared sensor 27 (sensor 104) which has sensed the presence of a player 200 senses no presence of the player 200.

The middle variable display unit 4B is a display panel for rotating symbols, which is to be constantly viewed by a player. The middle variable display unit 4B has a transparent center liquid crystal panel 5B (display 101) fixed to the front door of the cabinet 3. On the center liquid crystal panel 5B, five arrangement areas 151, 152, 153, 154, and 155 are displayed. Further, on the center liquid crystal panel 5B, an effect of moving images is performed at a time of winning or the like. Further, in an upper portion of the center liquid crystal panel 5B, a payout number indicator 8 and a credit number indicator 9 are displayed.

The lower variable display unit 4C has a lower liquid crystal panel 5C which displays the number of points stored in a card or the number of points of a game. Such a number is displayed on the lower liquid crystal panel 5C based on a result displayed on the middle variable display unit 4B. When a winning combination is achieved in the middle variable display unit 4B, the number of points of the game displayed on the lower liquid crystal panel 5C is increased according to the type of the winning achieved. On the left of the lower liquid crystal panel 5C, a ticket printer 14 is provided. On the right of the lower liquid crystal panel 5C, a card reader 15 is provided. Note that winning means an occasion where four or more scatter symbols of the same kind are rearranged, awarding various payouts according to the result.

Below the lower variable display unit 4C is disposed an operation table 10 which protrudes forward from the front face of the cabinet 3. On the operation table 10, there are arranged operation buttons 11 (e.g., a spin button 73, change button 74, cash-out button 75, one-bet button 76, maximum bet button 77, or the like) serving as a control panel which enables a player to perform a game-related operation. In addition, the operation table 10 is provided with a coin insertion slot 12 and a bill insertion slot 13.

At a front portion of the operation table 10, provided is the infrared sensor 27 which senses the presence of a player 200.

Below the operation table 10, a waist-high panel 17 is disposed. The waist-high panel 17 is a plastic panel having a game-related image printed thereon. This waist-high panel 17 is fixed to a lower front door 18 and illuminated by a cold cathode tube. Further, below the waist-high panel 17 is disposed a coin receiving tray 19 for storing a coin paid out based on a game result.

Further, lamps 30 are disposed on the cabinet 3 of the slot machine 1 so as to surround game areas including the upper variable display unit 4A, the middle variable display unit 4B, the lower variable display unit 4C, and the operation table 10. The lamps 30 include side lamps 22, speaker lamps 24, under lamps 25, and top lamps 26. The side lamps 22 are provided on inclined parts 21 provided at the front right and front left of the cabinet 3, each of which parts protruding in a bow shape so as to extend over the upper variable display unit 4A, the middle variable display unit 4B and the lower variable display unit 4C. The speaker lamps 24 are provided on arc-shaped speakers 23 which protrudes sideways at the right and a left ends of the cabinet 3 adjacent to the operation table 10. The speaker lamps 24 are arranged along edges of the speakers 23. The under lamps 25 are provided on the lower front door 18 and arranged along a lower edge of the waist-high panel 17. The top lamps 26 are provided above the upper variable display unit 4A. The top lamps include power lamps 26*a* disposed at both sides respectively and band-type lamps 26*b* arranged in a horizontal direction between the power lamps.

[Electrical Structure of the Slot Machine 1]

Figure 35:
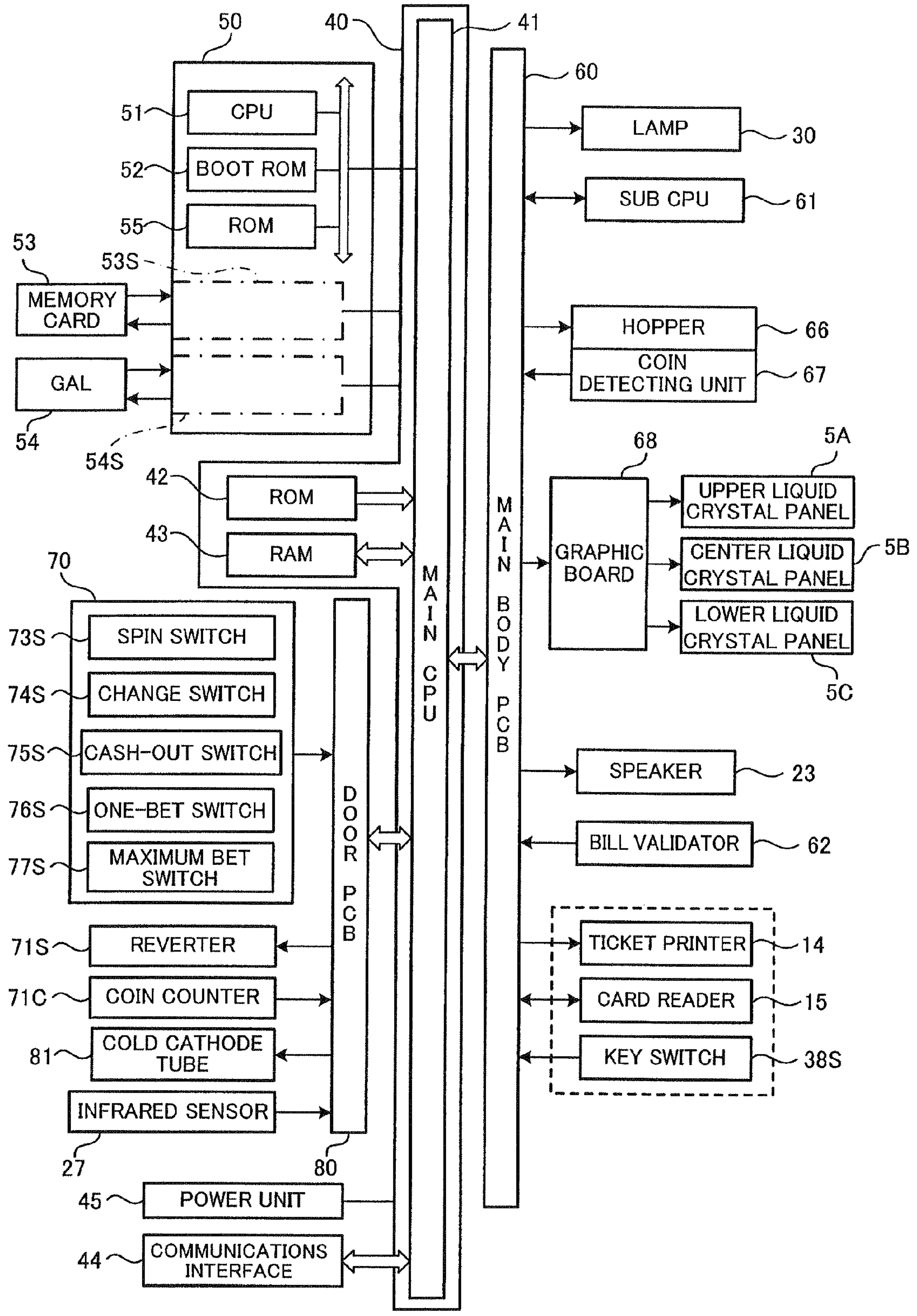
FIG. 35 is a block diagram illustrating a control board of the slot machine.

Inside the cabinet 3 is provided a control unit including the controller 100 of FIG. 28. As shown in FIG. 35, the control unit includes components such as a motherboard 40, a main body PCB (Printed Circuit Board) 60, a gaming board 50, a sub CPU 61, a door PCB 80, various switches, and a sensor.

The gaming board 50 is provided with a CPU (Central Processing Unit) 51, a ROM 55 and a boot ROM 52, a card slot 53S for a memory card 53, and an IC socket 54S for a GAL (Generic Array Logic) 54, which are connected to one another through an internal bus.

The memory card 53 stores therein a game program and a game system program. The game program contains a program to determine symbols to be stopped (hereinafter "stop symbol determination program"). The stop symbol determination program is a program for determining a symbol matrix of five columns and three rows. This stop symbol determination program contains sets of symbol weighting data respectively correspond to several kinds of payout rates (e.g., 80%, 84%, and 88%). Each set of symbol weighting data indicates, for each of the arrangement areas 151, 152, 153, 154, and 155, a relation between a code number of each symbol and at least one random number values. The random number value is a value within a predetermined range of 0 to 256 for example.

A payout rate is set based on payout rate setting data output from the GAL 54. Rearrangement symbols are determined based on a set of symbol weighting data corresponding to the payout rate set.

The memory card 53 stores therein various types of data for use in the game program and game system program. Specifically, the memory card 53 stores, in the form of table, data indicating relations between scatter symbols 180 displayed in the arrangement areas 151, 152, 153, 154, and 155 of FIG. 29 and a range of random number values. This data is transferred to a RAM 43 of the motherboard 40, at a time of execution of the game program.

The card slot 53S is structured so that the memory card 53 is inserted/removed thereto/therefrom. This card slot 53S is connected to the motherboard 40 via an IDE bus. Thus, the type and content of a game run by the slot machine 1 can be modified by removing the memory card 53 from the card slot 53S, writing a different game program and game system program into the memory card 53, and inserting the memory card 53 back to the card slot 53S.

The game program includes a program related to the progress of a game and/or a program for causing a transition to a bonus game. Also, the game program includes image data and audio data output during a game.

The GAL 54 has input ports and output ports. Upon the input of data to an input port, the GAL 54 outputs data corresponding to the input data from an output port. This data output from the output port is the before-mentioned payout rate setting data.

The IC socket 54S is structured so that the GAL 54 is attached/detached thereto/therefrom. The IC socket 54S is connected to the motherboard 40 via a PCI bus. Thus, the payout rate setting data to be output from the GAL 54 can be modified by detaching GAL 54 from the IC socket 54S, overwriting a program stored in the GAL 45, and attaching the GAL45 back to the IC socket 54S.

The CPU 51, the ROM 55, and the boot ROM 52, which are connected to one another via the internal bus, are connected to the motherboard 40 via the PCI bus. The PCI bus communicates a signal between the motherboard 40 and the gaming board 50, and supplies power from the motherboard 40 to the gaming board 50. The ROM 55 stores therein country identification information and an authentication program. The boot ROM 52 stores therein a preliminary authentication program, a program (boot code) for enabling the CPU 51 to run the preliminary authentication program, or the like.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (controller), a ROM (Read Only Memory) 42, the RAM (Random Access Memory) 43, and a communications interface 44.

The main CPU 41 serves as a controller that controls the overall slot machine 1. Specifically, the main CPU 41 performs the controls of: outputting a command signal, upon pressing the spin button 73 after a bet of credit, to the sub CPU 61 so as to scroll-display scatter symbols on the center liquid crystal panel 5B; determining symbols to be stopped after the scroll-display of symbols; and stopping the determined symbols in the arrangement areas 151, 152, 153, 154, and 155.

That is, the main CPU 41 functions as an arrangement controller to execute an arrangement control by which, among various kinds of scatter symbols, symbols to be arranged in a symbol matrix are selected and determined, and then scrolling of the symbols is stopped so that the determined symbol matrix appears. With this function, scatter symbols displayed while being scrolled on the center liquid crystal panel 5B are rearranged in a new symbol matrix.

The main CPU 41 functions as a controller 100 which executes: the first process of rearranging scatter symbols 180 in the matrix of arrangement areas 151 to 155 of the display 101 (center liquid crystal panel 5B); the second process of giving a payout according to the number of scatter symbols 180 rearranged; the third process of, when a specific symbol (game-number addition symbol) 181 is rearranged in the arrangement areas 151 to 155 as a result of a rearrangement of scatter symbols 180, adding a value determined based on the number of specific symbols 181 rearranged and a type of bet operation received by the input device 103 (operation buttons 11) to an accumulated value (bonus game-number) incremented/decremented by the count device 102 (center liquid crystal panel 5B); the fourth process of, when a predetermined condition is satisfied and the accumulated value is not 0, executing a bonus game whose scale depends on the accumulated value; the fifth process of, when the predetermined condition is satisfied and the accumulated value is 0, executing an accumulated value determination game (bonus game-number determination game) to determine an accumulated value of 1 or greater, and then executing a bonus game whose scale depends on the determined accumulated value; the sixth process of triggering the timer 120 (upper liquid crystal panel 5A), when the sensor 104 (infrared sensor 27) which has sensed the presence of a player 200 senses no presence of the player 200, to measure a period during which the sensor 104 senses no presence of the player 200; and the seventh process of resetting the accumulated value when the period during which the sensor 104 senses no presence of the player 200 lasts a predetermined time.

The ROM 42 stores a program such as BIOS (Basic Input/Output System) run by the main CPU 41, and data that is permanently used. When the BIOS is run by the main CPU 41, each of peripheral devices is initialized and the game program and the game system program stored in the memory card 53 are read out through the gaming board 50.

The RAM 43 stores data or program used for the main CPU 41 to perform a process. For example, in the RAM 43 are formed: the symbol memory 108, the display symbol memory 107, and the rearrangement symbol memory 105, which are shown in FIG. 28, in the forms of data areas, respectively. In the data area of the symbol memory 108, scatter symbols 180 are stored in the form of a data table of FIG. 33. In the data area of the rearrangement symbol memory 105, rearrangement symbols are stored. In the data area of the display symbol memory 107, a symbol matrix is stored.

The communications interface 44 communicates via a communication line with a host computer or the like provided in a game arcade. The motherboard 40 is connected to the main body PCB (Printed Circuit Board) 60 and the door PCB 80 through USBs (Universal Serial Buses). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51.

The main body PCB 60 and the door PCB 80 are connected to: a device or apparatus which generates an input signal to be input to the main CPU 41; and a device or apparatus controlled by a control signal output from the main CPU 41. The main CPU 41 runs the game program and the game system program stored in the RAM 43 based on the input signal input to the main CPU 41, to carry out an arithmetic process, thereby storing a result thereof in the RAM 43 or transmitting a control signal to each device or apparatus to control them.

The main body PCB 60 is connected to the lamps 30 (to be more specific, the side lamps 22, the speaker lamps 24, the under lamps 25, and the top lamps 26), the sub CPU 61, a hopper 66, a coin detecting unit 67, a graphic board 68, the speakers 23, a bill validator 62, the ticket printer 14, the card reader 15, and a key switch 38S.

The lamps 30 are turned on/off based on a control signal output from the main CPU 41. The sub CPU 61 controls an operation of scrolling symbols in the arrangement areas 151 to 155, and is connected to a later-mentioned VDP (Video Display Processor). The VDP reads out image data of symbols stored in an image data ROM (not shown), and then generates an image of scrolling symbols to be displayed in the arrangement areas 151, 152, 153, 154, and 155 to output the image to the center liquid crystal panel 5B.

The hopper 66 is provided in the cabinet 3, and pays out a predetermined number of coins from a coin payout opening to the coin receiving tray 19 based on a control signal output from the main CPU 41. The coin detecting unit 67 is provided inside the coin payout opening, and outputs an input signal to the main CPU 41 when detecting that a predetermined number of coins are paid out from the coin payout opening.

The graphic board 68 controls image displaying of the upper liquid crystal panel 5A, the center liquid crystal panel 5B, and the lower liquid crystal panel 5C, based on a control signal output from the main CPU 41. The graphic board 68 is provided with a VDP which generates image data based on a control signal output from the main CPU 41, a video RAM which temporarily stores image data generated by the VDP, and the like.

The bill validator 62 reads an image on a bill inserted to the bill insertion slot 13 and accepts a genuine bill into the cabinet 3. When accepting a genuine bill, the bill validator 62 outputs an input signal to the main CPU 41 corresponding to the amount of the bill. The main CPU 41 stores in the RAM 43 the number of credits corresponding to the amount of the bill transmitted by the input signal.

Based on a control signal output from the main CPU 41, the ticket printer 14 prints a bar code on a ticket, and then outputs the ticket with a bar code. Data such as the number of credits stored in the RAM 43, time and date, identification number of a slot machine 1, or the like is encoded to the bar code.

The card reader 15 reads data from a smart card to transmit them to the main CPU 41, or write data to a smart card based on a control signal from the main CPU 41. The key switch 38S is mounted on a keypad (not shown), and outputs an input signal to the main CPU 41 in response to an operation of the keypad by a player.

The door PCB 80 is connected to a control panel 70, a reverter 71S, a coin counter 71C, a cold cathode tube 81, and the infrared sensor 27. The control panel 70 is provided with: a spin switch 73S corresponding to the spin button 73, a change switch 74S corresponding to the change button 74, a cash-out switch 75S corresponding to the cash-out button 75, a one-bet switch 76S corresponding to the one-bet button 76, and a maximum bet switch 77S corresponding to the maximum-bet button 77. The switches 73S to 77S output input signals to the main CPU 41 upon operations of the corresponding buttons 73 to 77 by a player, respectively.

The coin counter 71C is provided inside the coin insertion slot 12, and validates whether a coin inserted by a player into the coin insertion slot 12 is genuine. Anything other than a genuine coin is discharged to the coin receiving tray 19. The coin counter 71C outputs an input signal to the main CPU 41 when detecting a genuine coin.

The reverter 71S is operated based on a control signal output from the main CPU 41. The reverter 71S distributes a coin that is recognized as genuine by the coin counter 71C to a cash box (not shown) or the hopper 66 mounted in the slot machine 1. In other words, when the hopper 66 is filled with coins, the reverter 71S distributes a genuine coin to the cash box. On the other hand, when the hopper 66 is not filled with coins, a genuine coin is distributed to the hopper 66. The cold cathode tube 81 functions as a backlight mounted to the rear sides of the upper liquid crystal panel 5A and the center liquid crystal panel 5B. The cold cathode tube 81 is turned on based on a control signal output from the main CPU 41.

The infrared sensor 27 senses the presence of a player 200 who is playing a game at the slot machine 1. When the infrared sensor 27 senses the presence of a player 200, the infrared sensor 27 outputs a predetermined signal.

[Addition Game-Number Determination Table]

The following describes an addition game-number determination table used for determining an addition game-number per game-number addition symbol 181 when a game-number addition symbol 181 is rearranged. The addition game-number determination table is stored in the ROM 42 of the motherboard 40.

As shown in FIG. 36, the addition game-number determination table includes bet forms, pattern-numbers of 1 to 6, and addition game-numbers per symbol associated with one another. Specifically, the bet form of maximum-bet is associated with the pattern-numbers of 1 to 5, and the pattern-number "1" is associated with the addition game-number per symbol of "1". The pattern-number "4" is associated with the addition game-number per symbol of "4". In the case where a maximum-bet operation has been made, a pattern-number is randomly determined from the pattern-numbers 1 to 5, so that an addition game-number per symbol is determined.

On the other hand, the bet form of one-bet is associated with the pattern-number "6", and the pattern-number "6" is associated with the addition game-number per symbol of "1". That is, in the case where a one-bet operation has been made, the addition game-number per symbol of "1" is determined. Thus, an addition game-number to be added in the case of maximum-bet operation is larger than an addition game-number to be added in the case of one-bet operation. This encourages a player to carry out a maximum-bet operation.

[Process Operation of the Slot Machine 1]

Next, the process operation of the slot machine 1 will be described.

[Boot Process]

Figure 37:
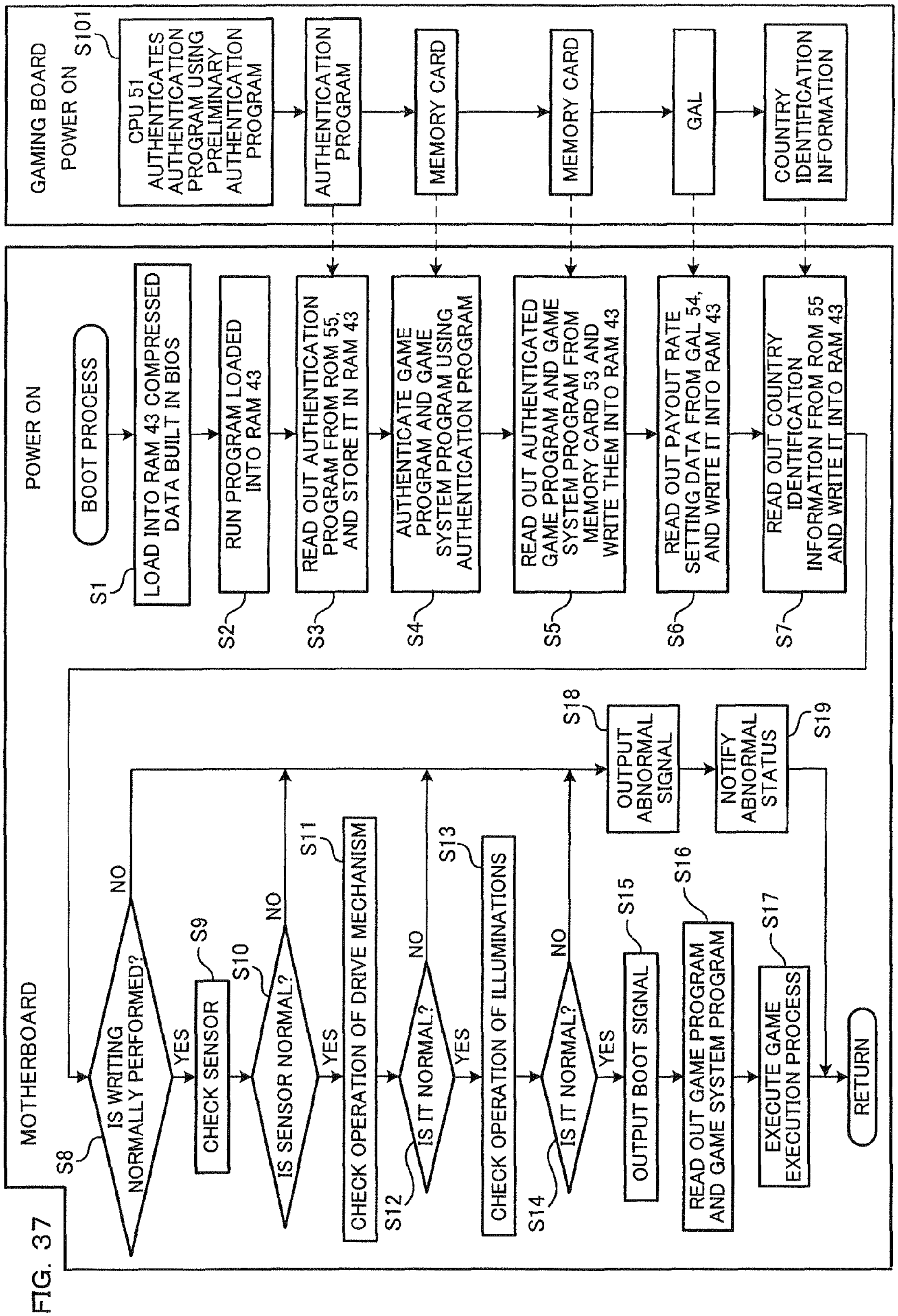
FIG. 37 is a flow chart of a boot process.

First, the main CPU 41 of the slot machine 1 executes a boot process routine shown in FIG. 37. This boot process routine is performed by the motherboard 40 and the gaming board 50. The memory card 53 is assumed to be inserted into the card slot 53S of the gaming board 50, and the GAL 54 is assumed to be attached to the IC socket 54S.

First, turning on a power switch of (powering on) the power unit 45 boots the motherboard 40 and the gaming board 50. Booting the motherboard 40 and the gaming board 50 starts separate processes in parallel. That is, in the gaming board 50, the CPU 51 reads out the preliminary authentication program stored in the boot ROM 52, and according to the preliminary authentication program read out, the CPU 51 performs the preliminary authentication to confirm and verify that the authentication program is not falsified, before reading that program in the motherboard 40 (S101).

On the other hand, in the motherboard 40, the main CPU 41 runs the BIOS stored in the ROM 42, to load into the RAM 43 compressed data built in the BIOS (S1). Then, the main CPU 41 runs a procedure of the BIOS according to the data loaded into the RAM 43 so as to diagnose and initialize various peripheral devices (S2).

The main CPU 41, which is connected to the ROM 55 of the gaming board 50 via the PCI bus, reads out the authentication program stored in the ROM 55, and stores it in the RAM 43 (S3). During this step, the main CPU 41 derives a checksum through ADDSUM method (a standard check function) which is adopted in a standard BIOS, and stores the authentication program in the RAM 43 while confirming if the operation of storing is carried out without an error.

Next, the main CPU 41 checks what is connected via the IDE bus. Then, the main CPU 41 accesses via the IDE bus to the memory card 53 inserted into the card slot 53S to read out the game program and the game system program from the memory card 53. In this case, the main CPU 41 reads out four bytes of data constituting the game program and the game system program at one time. Subsequently, according to the authentication program stored in the RAM 43, the main CPU 41 performs an authentication to confirm and verify that the game program and game system program read out are not falsified (S4). When this authentication process is properly finished, the main CPU 41 writes and store in the RAM 43 the game program and game system program which were the subjects of the authentication (authenticated) (S5).

Then, the main CPU 41 accesses, via the PCI bus, the GAL 54 attached to the IC socket 54S, and reads out the payout rate setting data from the GAL 54, which data is written to and stored in the RAM 43 (S6). Next, the main CPU 41 reads out, via the PCI bus, the country identification information stored in the ROM 55 of the gaming board 50. The country identification information read out is stored in the RAM 43 (S7).

Then, the main CPU 41 determines if the writing to the RAM 43 is normally performed (S8). When it is determined that the writing to the RAM 43 is normally performed (S8, YES), the sensor is checked (S9). Then, it is determined if the sensor is normal (S10). When it is determined that the sensor is normal (S10, YES), the operation of a drive mechanism is checked (S1). Then, it is determined if the operation of the drive mechanism is normal (S12). When it is determined that the operation of the drive mechanism is normal (S12, YES), the operation of illuminations (the lamps 30 or the like) is checked (S13). Then, it is determined if the operation of illuminations is normal (S14). When it is determined that the operation of the illuminations is normal (S14, YES), a boot signal is output (S15), the game program and game system program are read out from the RAM 43 (S16), a game execution process is executed (S17), and this routine ends.

In the case where: it is determined that the writing to the RAM 43 is not normally performed in the step S8 (S8, NO); it is determined that the sensor is not normal in the step S10 (S10, NO); it is determined that the operation of the drive mechanism is not normal in the step S12 (S12, NO); or it is determined that the operation of the illuminations is not normal in the step S14 (S14, NO); an abnormal signal is output (S18) and an abnormal status is notified (S19) to end this routine.

[Game Execution Process]

Figure 38:
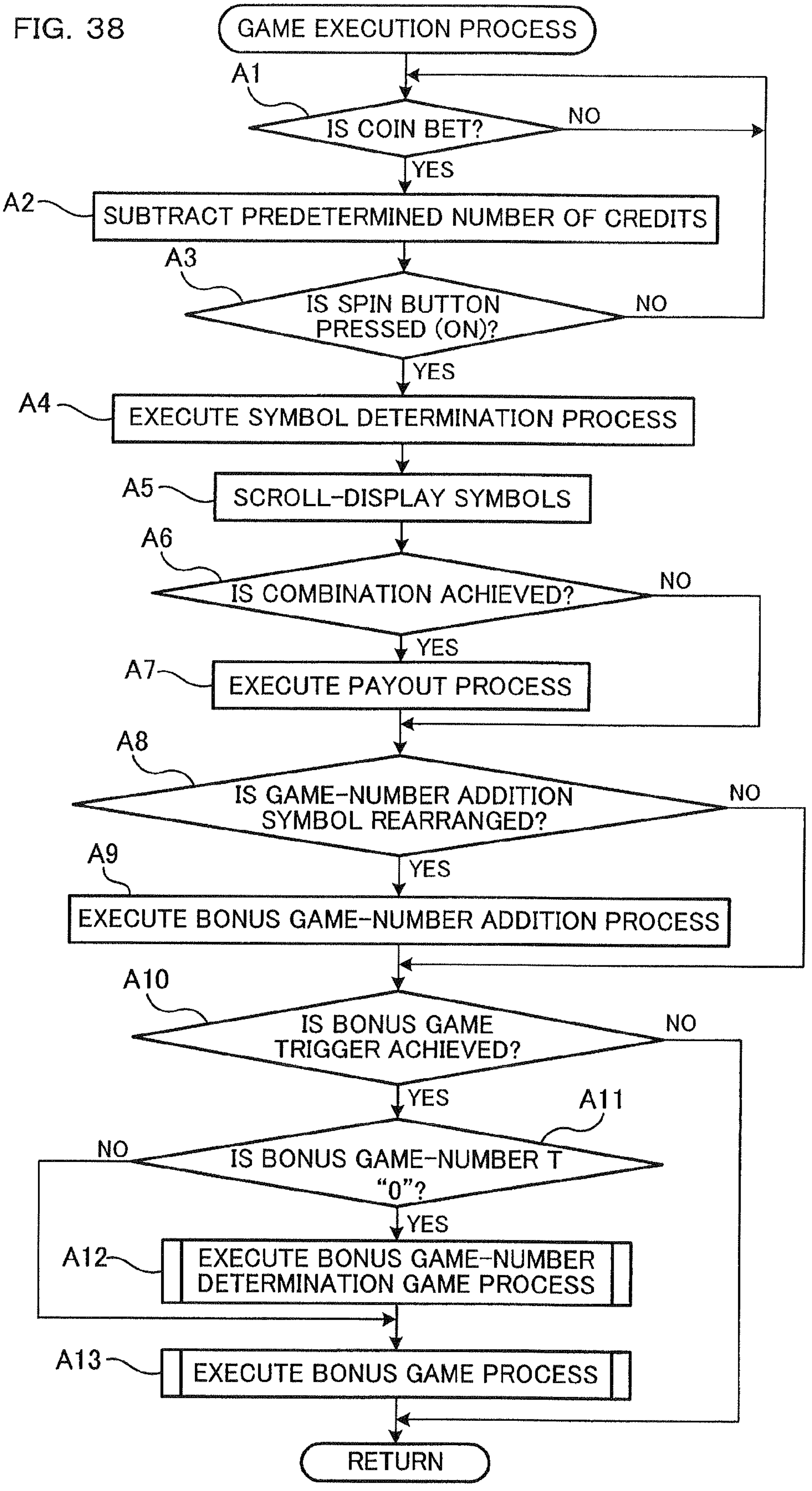
FIG. 38 is a flow chart of a game execution process.

After the boot process routine shown in FIG. 37, the main CPU 41 of the slot machine 1 executes a game execution process routine shown in FIG. 38. In the game execution process routine, first, the main CPU 41 determines if a coin is bet (A1). In this process, determined is if an input signal is received in response to pressing of the one-bet button 76 or the maximum bet button 77. When it is determined that a coin is not bet (A1, NO), the step A1 is executed again to enter a standby mode until a coin is bet.

On the other hand, when it is determined that a coin is bet (A1, YES), the number of credits corresponding to the number of coins bet is subtracted from the number of credits stored in the RAM 43 (A2). When the number of coins bet is larger than the number of credits stored in the RAM 43, the process of subtracting the number of credits is not performed, and the step A1 is executed again.

Then, it is determined if the spin button 73 is pressed (set to ON) (A3). When it is determined that the spin button 73 is not pressed (not set to ON) (A3, NO), the process returns to the step A1. When the spin button 73 is not pressed (not set to ON) (for example, when an instruction to finish the game is input while the spin button 73 is not pressed (not set to ON)), the result of subtraction in the step A2 is canceled.

On the other hand, when it is determined that the spin button 73 is pressed (set to ON) (A3, YES), a symbol determination process is performed (A4). That is, a stop symbol determination program stored in the RAM 43 is executed to determine a symbol matrix.

Next, scatter symbols 180 in the arrangement areas 151, 152, 153, 154, and 155 are scroll-displayed (A5). After scatter symbols 180 are scrolled, symbols of the symbol matrix determined in the step A4 are stopped (rearranged) in the arrangement areas 151, 152, 153, 154, and 155.

Then, it is determined if a combination is achieved, i.e., if four or more scatter symbols 180 of the same kind are rearranged (A6). When it is determined that a combination is achieved (A6, YES), a payout process is executed (A7). That is, the number of coins to be paid out is calculated according to the number of scatter symbols of the same kind. When a coin to be paid out is reserved, a predetermined number of credits are added to the number of credits stored in the RAM 43. On the other hand, when a coin is paid out, a control signal is transmitted to the hopper 66 to pay out a predetermined number of coins to the coin receiving tray 19.

When it is determined that a combination is not achieved in the step A6 (A6, NO), or after the step A7, it is determined if a game-number addition symbol 181 is rearranged (A8). When it is determined that a game-number addition symbol 181 is rearranged (A8, YES), a bonus game-number addition process is performed using the addition game-number determination table shown in FIG. 36 (A9).

When it is determined that a game-number addition symbol 181 is not rearranged in the step A8 (A8, NO), or after the step A9, it is determined if a bonus game trigger is achieved (A10). When it is determined that a bonus game trigger is not achieved (A10, NO), this routine ends. On the other hand, when it is determined that a bonus game trigger is achieved (A10, YES), it is determined if the bonus game-number T is "0" (A11).

When it is determined that the bonus game-number T is "0" (A11, YES), a bonus game-number determination game process is executed (A12). The bonus game-number determination game process will be described later.

When it is determined that the bonus game-number T is not "0" in the step A11 (A11, NO), or after the step A12, a bonus game process is executed (A13). The bonus game process will be described later. Then, this routine ends.

[Bonus Game-Number Determination Game Process]

Figure 39:
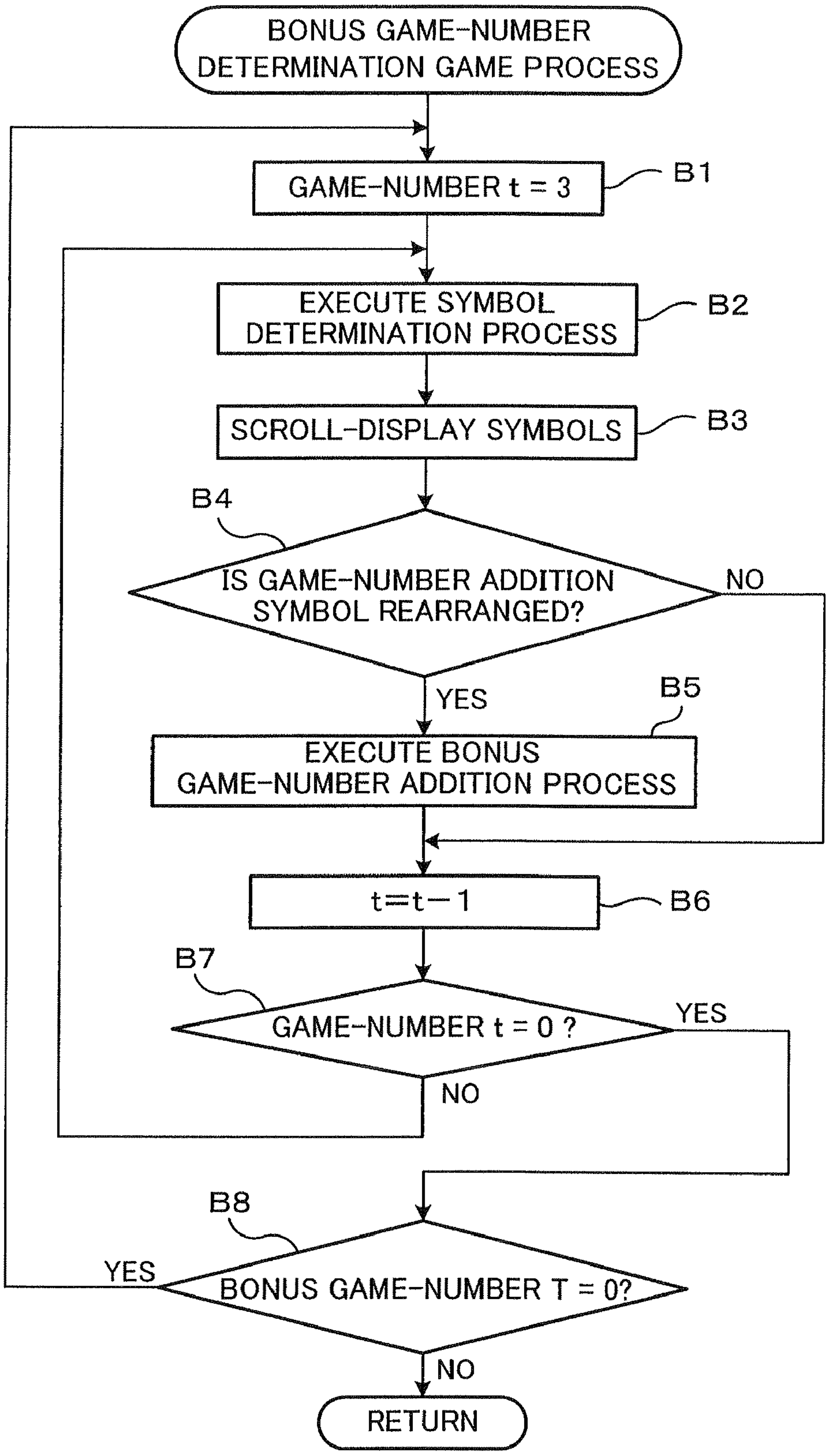
FIG. 39 is a flow chart of a bonus game-number determination game process.

When it is determined that the bonus game-number T is "0" in the step A11 of FIG. 38, the main CPU 41 of the slot machine 1 executes a bonus game-number determination game process routine shown in FIG. 39. In the bonus game-number determination game process routine, first, the main CPU 41 sets a game-number t to "3" (B1). Then, a symbol determination process is performed (B2). That is, a stop symbol determination program stored in the RAM 43 is run to determine a symbol matrix.

Next, scatter symbols 180 are scroll-displayed in the arrangement areas 151, 152, 153, 154, and 155 (B3). After scatter symbols 180 are scrolled, symbols of the symbol matrix determined in the step B2 are stopped (rearranged) in the arrangement areas 151, 152, 153, 154, and 155.

Next, it is determined if a game-number addition symbol 181 is rearranged (B4). When it is determined that a game-number addition symbol 181 is rearranged (B4, YES), a bonus game-number addition process is performed using the addition game-number determination table shown in FIG. 36 (B5).

When it is determined that a game-number addition symbol 181 is not rearranged in the step B4 (B4, NO), or after the step B5, the game-number t is decremented by "1" (B6), and it is determined if the game-number t is "0" (B7). When it is determined that the game-number t is not "0" (B7, NO), the process returns to the step B2. On the other hand, when it is determined that the game-number t is "0" (B7, YES), it is determined if the bonus game-number T is "0" (B8).

When it is determined that the bonus game-number T is "0" (B8, YES), the process returns to the step B1. Thus, a bonus game-number determination game is executed again. On the other hand, when it is determined that bonus game-number T is not "0" (B8, NO), this routine ends.

[Bonus Game Process]

Figure 40:
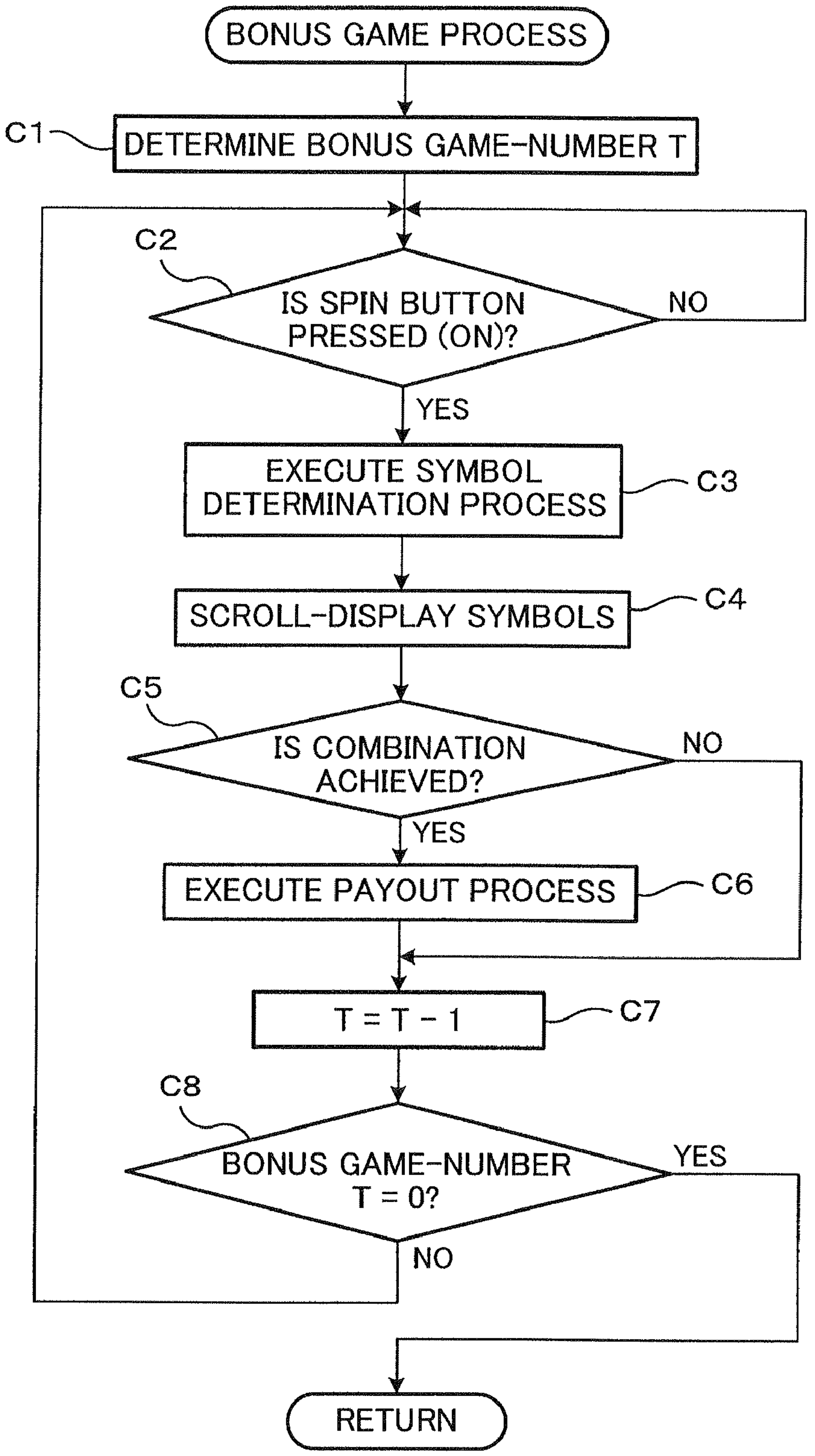
FIG. 40 is a flow chart of a bonus game process.

When it is determined that the bonus game-number T is not "0" in the step A11 of FIG. 38, or after the step A12 of FIG. 38, the main CPU 41 of the slot machine 1 executes a bonus game process routine shown in FIG. 40. In the bonus game process routine, first, the main CPU 41 determines a bonus game-number T (C1). The bonus game-number T is same as the bonus game-number displayed on the bonus game-number indicator 183 of the display 101 (center liquid crystal panel 5B) at a time of transition to the bonus game.

Then, it is determined if the spin button 73 is pressed (set to ON) (C2). When it is determined that the spin button 73 is not pressed (not set to ON) (C2, NO), the process returns to the step C2. On the other hand, when it is determined that the spin button 73 is pressed (set to ON) (C2, YES), a symbol determination process is performed (C3). That is, a stop symbol determination program stored in the RAM 43 is run to determine a symbol matrix.

Then, scatter symbols 180 are scroll-displayed in the arrangement areas 151, 152, 153, 154, and 155 (C4). After scatter symbols 180 are scrolled, symbols of the symbol matrix determined in the step C3 are stopped (rearranged) in the arrangement areas 151, 152, 153, 154, and 155.

Then, it is determined if a combination is achieved, i.e., if four or more scatter symbols 180 of the same kind are rearranged (C5). When it is determined that a combination is achieved (C5, YES), a payout process is executed (C6). That is, the number of coins to be paid out is calculated according to the number of scatter symbols of the same kind. When a coin to be paid out is reserved, a predetermined number of credits are added to the number of credits stored in the RAM 43. On the other hand, when a coin is paid out, a control signal is transmitted to the hopper 66 to pay out a predetermined number of coins to the coin receiving tray 19.

When it is determined that a combination is not achieved in the step C5 (C5, NO), or after the step C6, the bonus game-number T is decremented by "1" (C7), and it is determined if the bonus game-number T is "0" (C8). When it is determined that the bonus game-number T is not "0" (C8, NO), the process returns to the step C2. On the other hand, when it is determined that the bonus game-number T is "0" (C8, YES), this routine ends.

As described above, when a specific symbol (game-number addition symbol) 181 is rearranged in the arrangement areas 151 to 155, a value determined based on the number of specific symbols 181 rearranged and the type of bet operation received by the input device 103 (operation buttons 11) is added to an accumulated value (bonus game-number) incremented/decremented by the count device 102 (center liquid crystal panel 5B). Then, when a predetermined condition is satisfied and the accumulated value is not 0, executed is a bonus game whose scale depends on the accumulated value. On the other hand, when the predetermined condition is satisfied and the accumulated value is 0, executed is an accumulated value determination game (bonus game-number determination game) to determine an accumulated value of 1 or greater, and then executed is a bonus game whose scale depends on the determined accumulated value. Thus, the accumulated value, which is incremented due to a rearrangement of a specific symbol 181, enables a player to recognize in advance the scale of a bonus game to be executed at a time of satisfaction of the predetermined condition. Therefore, the player's expectation for the bonus game is likely to be increased.

[Reset Process]

Figure 41:
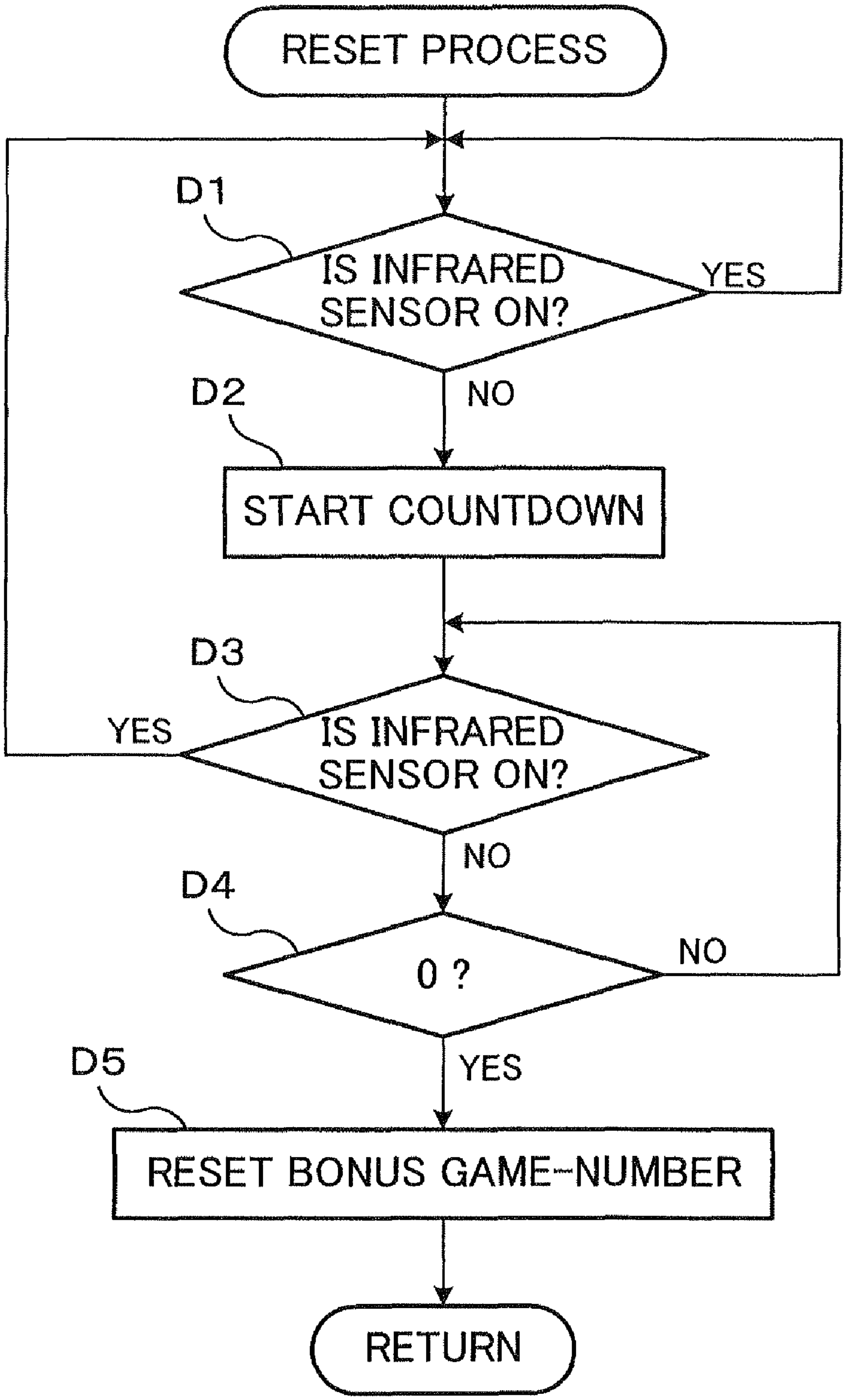
FIG. 41 is a flow chart of a reset process.

In parallel with the game execution process routine of FIG. 38, the bonus game-number determination game process routine of FIG. 39, and the bonus game process routine of FIG. 40, the main CPU 41 of the slot machine 1 executes a reset process routine shown in FIG. 41. In the reset process routine, first, the main CPU 41 determines if the infrared sensor 27 is in an active state (ON) (D1). In other words, it is determined if the infrared sensor 27 outputs a predetermined signal as a result of detection of the presence of a player 200.

When it is determined that the infrared sensor 27 is in an active state (ON) (D1, YES), the process returns to the step D1. On the other hand, when it is determined that the infrared sensor 27 is not in an active state (not ON) (D1, NO), a text image 188 and a counting image 189 are displayed on the upper liquid crystal panel 5A, and a countdown for a remaining time indicated by the counting image 189 is started (D2). Then, it is determined if the infrared sensor 27 is in an active state (ON) (D3).

When it is determined that the infrared sensor 27 is in an active state (ON) (D3, YES), the countdown is cancelled, and the process returns to the step D1. On the other hand, when it is determined that the infrared sensor 27 is not in an active state (not ON) (D3, NO), it is determined if the remaining time indicated by the counting image 189 is "0", i.e., if a period during which the infrared sensor 27 senses no presence of the player 200 lasts a predetermined time (D4). When it is determined that the remaining time is not "0" (D4, NO), the process returns to the step D3. On the other hand, when it is determined that the remaining time is "0" (D4, YES), the bonus game-number is reset (D5), and this routine ends.

As described above, when a period during which the sensor 104 (infrared sensor 27) senses no presence of the player 200 lasts a predetermined time, the accumulated value (bonus game-number) is reset. This causes the player 200 to have a desire to consume, for oneself, a bonus game whose scale depends on the accumulated value that the player 200 has accumulated, thereby increasing the motivation of the player 200 for a game. Furthermore, the timer 120 (upper liquid crystal panel 5A) measures, from when the sensor 104 no longer senses the presence of the player 200, a period during which the sensor 104 senses no presence of the player 200. Therefore, the player 200 recognizes the period measured by the timer 120, and this increases a possibility of avoiding a disadvantage which is a reset of the accumulated value.

In the detailed description provided above, characteristic parts have mainly been described in order that the present invention can be understood more easily. However, the present invention is not limited to the embodiment shown in the detailed description provided above, and may be applied to other embodiments. The scope of application of the present invention should be construed as broadly as possible. Terms and phraseologies adopted in the present specification are for correctly illustrating the present invention, not for limiting. It would be easy for those skilled in the art to derive, from the spirit of the invention described in the present specification, other structures, systems, methods and the like which are included in the spirit of the invention. Accordingly, it should be considered that claims cover equivalent structures, too, without departing from the technical idea of the present invention. An object of the abstract is to enable an intellectual property office, general public institutions, persons belonging to the art but not familiar with patent, legal terms, or technical terms to quickly understand technical contents and essences of the present invention through a simple research. Therefore, the abstract is not intended to limit the scope of the invention that should be evaluated by the claims. In addition, it is desirable to sufficiently refer to already-disclosed documents and the like, in order to fully understand the objects and effects of the present invention.

The detailed description provided above includes a processing which is executed on a computer or a computer network. The descriptions and expressions provided above are given for the purpose of allowing those skilled in the art to understand the invention most effectively. In the specification, respective steps used to induce one result, or blocks having a predetermined processing function should be understood as a processing having no self-contradiction. In addition, in each step or block, an electrical or magnetic signal is transmitted/received, recorded, and the like. In a processing in each step or block, such a signal is embodied in the form of a bit, a value, a symbol, a character, a term, a number, and the like. However, it should be noted that they have been used simply because they are convenient for explanations. A processing in each step or block has sometimes been described using an expression which is common to a human behavior. However, in principle, the processing described in the specification is executed by various devices. In addition, other structures necessary for each step or block are apparent from the above description.

What is claimed is:

1. A gaming machine comprising:

a display having a matrix of arrangement areas in which scatter symbols are arranged;

a count device which increments/decrements an accumulated value;

a controller which is programmed to operate in the following steps of (a1) rearranging scatter symbols in the arrangement areas, (a2) giving a payout according to the number of scatter symbols rearranged, (a3) when a specific symbol is rearranged in the arrangement areas as a result of a rearrangement of scatter symbols, adding, to the accumulated value, a value determined based on the number of specific symbols rearranged to update the accumulated value, and (a4) when the rearranged scatter symbols satisfy a predetermined condition, executing a bonus game including one or more free games, wherein the number of one or more free games is equal to the accumulated value; and an input device which receives plural types of bet operations from outside, wherein in step (a3) when a specific symbol is rearranged in the arrangement areas as a result of a rearrangement of scatter symbols, the controller adds, to the accumulated value, a value determined based on the number of specific symbols rearranged and a type of bet operation received by the input device.

2. A gaming machine comprising:

a display having a matrix of arrangement areas in which scatter symbols are arranged, a count device which increments/decrements an accumulated value; and a controller which is programmed to operate in the following steps of:

(a1) rearranging scatter symbols in the arrangement areas;

(a2) giving a payout according to the number of scatter symbols rearranged;

(a3) when a specific symbol is rearranged in the arrangement areas as a result of a rearrangement of scatter symbols, adding, to the accumulated value, a value determined based on the number of specific symbols rearranged to update the accumulated value; and (a4) when the rearranged scatter symbols satisfy a predetermined condition, executing a bonus game including one or more free games, wherein the number of one or more free games is equal to the accumulated value, wherein:

in step (a4), when the rearranged scatter symbols satisfy the predetermined condition and the accumulated value is not 0, the controller executes a bonus game whose scale depends on the accumulated value; and in step (a4), when the rearranged scatter symbols satisfy the predetermined condition and the accumulated value is 0, the controller executes, at a timing that the accumulated value becomes 1 or greater, a bonus game whose scale depends on the accumulated value of 1 or greater.

3. A gaming machine comprising:

a display having a matrix of arrangement areas in which scatter symbols are arranged;

a count device which increments/decrements an accumulated value; and a controller which is programmed to operate in the following steps of:

(a1) rearranging scatter symbols in the arrangement areas;

(a2) giving a payout according to the number of scatter symbols rearranged;

(a3) when a specific symbol is rearranged in the arrangement areas as a result of a rearrangement of scatter symbols, adding, to the accumulated value, a value determined based on the number of specific symbols rearranged; and (a4) when a predetermined condition is satisfied, executing a bonus game whose scale depends on the accumulated value, wherein:

in step (a4), when the predetermined condition is satisfied and the accumulated value is not 0, the controller executes a bonus game whose scale depends on the accumulated value; and in step (a4), when the predetermined condition is satisfied and the accumulated value is 0, the controller executes an accumulated value determination game to determine an accumulated value of 1 or greater, and then executes a bonus game whose scale depends on the determined accumulated value.

4. The gaming machine according to claim 3, further comprising an input device which receives plural types of bet operations from outside; wherein:

in step (a3), when a specific symbol is rearranged in the arrangement areas as a result of a rearrangement of scatter symbols, the controller adds, to the accumulated value, a value determined based on the number of specific symbols rearranged and a type of bet operation received by the input device.

5. The gaming machine according to claim 3, further comprising:

an input device which receives plural types of bet operations from outside; and a timer which measures time, wherein the controller is further programmed to operate in the following step of:

(a5) resetting the accumulated value when a period during which the sensor senses no presence of the player lasts a predetermined time, wherein:

in step (a3), when a specific symbol is rearranged in the arrangement areas as a result of a rearrangement of scatter symbols, the controller adds, to the accumulated value, a value determined based on the number of specific symbols rearranged and a type of bet operation received by the input device;

in step (a4), when the predetermined condition is satisfied and the accumulated value is not 0, the controller executes a bonus game whose scale depends on the accumulated value;

in step (a4), when the predetermined condition is satisfied and the accumulated value is 0, the controller executes an accumulated value determination game to determine an accumulated value of 1 or greater, and then executes a bonus game whose scale depends on the determined accumulated value; and in step (a5), the controller triggers the timer, when the sensor which has sensed the presence of the player senses no presence of the player, to measure a period during which the sensor senses no presence of the player, and resets the accumulated value when the period during which the sensor senses no presence of the player lasts the predetermined time.

6. The gaming machine according to claim 3, wherein:

in step (a4), when the predetermined condition is satisfied and the accumulated value is 0, the controller executes, at a timing that the accumulated value becomes 1 or greater, the bonus game.

7. A gaming machine comprising:

a display having a matrix of arrangement areas in which scatter symbols are arranged;

a count device which increments/decrements an accumulated value;

a controller which is programmed to operate in the following steps of (a1) rearranging scatter symbols in the arrangement areas, (a2) giving a payout according to the number of scatter symbols rearranged, (a3) when a first symbol is rearranged in the arrangement areas as a result of a rearrangement of scatter symbols, adding, to the accumulated value, a value determined based on the number of first symbols rearranged to update the accumulated value, (a4) when a second symbol is rearranged in the arrangement areas as a result of a rearrangement of scatter symbols, subtracting, from the accumulated value, a value determined based on the number of second symbols rearranged to update the accumulated value, and (a5) when the rearranged scatter symbols satisfy a predetermined condition, executing a bonus game including one or more free games, wherein the number of one or more free games is equal to the accumulated value; and an input device which receives plural types of bet operations from outside, wherein:

in step (a3), when a first symbol is rearranged in the arrangement areas as a result of a rearrangement of scatter symbols, the controller adds, to the accumulated value, a value determined based on the number of first symbols rearranged and a type of bet operation received by the input device; and in step (a4), when a second symbol is rearranged in the arrangement areas as a result of a rearrangement of scatter symbols, the controller subtracts, from the accumulated value, a value determined based on the number of second symbols rearranged and a type of bet operation received by the input device.

8. A gaming machine comprising:

a display having a matrix of arrangement areas in which scatter symbols are arranged;

a count device which increments/decrements an accumulated value; and a controller which is programmed to operate in the following steps of:

(a1) rearranging scatter symbols in the arrangement areas;

(a2) giving a payout according to the number of scatter symbols rearranged;

(a3) when a first symbol is rearranged in the arrangement areas as a result of a rearrangement of scatter symbols, adding, to the accumulated value, a value determined based on the number of first symbols rearranged to update the accumulated value;

(a4) when a second symbol is rearranged in the arrangement areas as a result of a rearrangement of scatter symbols, subtracting, from the accumulated value, a value determined based on the number of second symbols rearranged to update the accumulated value; and (a5) when the rearranged scatter symbols satisfy a predetermined condition, executing a bonus game including one or more free games, wherein the number of one or more free games is equal to the accumulated value, wherein:

when a predetermined condition is satisfied and the accumulated value is not 0, executing a bonus game whose scale depends on the accumulated value; and in step (a5) when the rearranged scatter symbols satisfy the predetermined condition and the accumulated value is 0, the controller executes, at a timing that the accumulated value becomes 1 or greater, a bonus game whose scale depends on the accumulated value of 1 or greater.

9. A gaming machine comprising:

a display having a matrix of arrangement areas in which scatter symbols are arranged;

a count device which increments/decrements an accumulated value; and a controller which is programmed to operate in the following steps of:

(a1) rearranging scatter symbols in the arrangement areas;

(a2) giving a payout according to the number of scatter symbols rearranged;

(a3) when a first symbol is rearranged in the arrangement areas as a result of a rearrangement of scatter symbols, adding, to the accumulated value, a value determined based on the number of first symbols rearranged;

(a4) when a second symbol is rearranged in the arrangement areas as a result of a rearrangement of scatter symbols, subtracting, from the accumulated value, a value determined based on the number of second symbols rearranged; and (a5) when a predetermined condition is satisfied, executing a bonus game whose scale depends on the accumulated value, wherein:

in step (a5), when the predetermined condition is satisfied and the accumulated value is 0, the controller executes an accumulated value determination game to determine an accumulated value of 1 or greater, and then executes a bonus game whose scale depends on the determined accumulated value.

10. The gaming machine according to claim 9, further comprising:

an input device which receives plural types of bet operations from outside, wherein:

in step (a3), when a first symbol is rearranged in the arrangement areas as a result of a rearrangement of scatter symbols, the controller adds, to the accumulated value, a value determined based on the number of first symbols rearranged and a type of bet operation received by the input device;

in step (a4), when a second symbol is rearranged in the arrangement areas as a result of a rearrangement of scatter symbols, the controller subtracts, from the accumulated value, a value determined based on the number of second symbols rearranged and a type of bet operation received by the input device; and in step (a5), when the predetermined condition is satisfied and the accumulated value is not 0, the controller executes a bonus game whose scale depends on the accumulated value.

11. The gaming machine according to claim 9, wherein:

in step (a4), when the predetermined condition is satisfied and the accumulated value is 0, the controller executes, at a timing that the accumulated value becomes 1 or greater, the bonus game.

12. A gaming machine comprising:

a display having a matrix of arrangement areas in which scatter symbols are arranged;

a count device which increments/decrements an accumulated value;

a sensor which senses the presence of a player;

a controller which is programmed to operate in the following steps of (a1) rearranging scatter symbols in the arrangement areas, (a2) giving a payout according to the number of scatter symbols rearranged, (a3) when a specific symbol is rearranged in the arrangement areas as a result of a rearrangement of scatter symbols, adding, to the accumulated value, a value determined based on the number of specific symbols rearranged to update the accumulated value, (a4) when the rearranged scatter symbols satisfy a predetermined condition, executing a bonus game including one or more free games, wherein the number of one or more free games is equal to the accumulated value, and (a5) resetting the accumulated value when a period during which the sensor senses no presence of the player lasts a predetermined time; and an input device which receives plural types of bet operations from outside, wherein in step (a3), when a specific symbol is rearranged in the arrangement areas as a result of a rearrangement of scatter symbols, the controller adds, to the accumulated value, a value determined based on the number of specific symbols rearranged and a type of bet operation received by the input device.

13. A gaming machine comprising:

a display having a matrix of arrangement areas in which scatter symbols are arranged;

a count device which increments/decrements an accumulated value;

a sensor which senses the presence of a player;

a controller which is programmed to operate in the following steps of (a1) rearranging scatter symbols in the arrangement areas, (a2) giving a payout according to the number of scatter symbols rearranged, (a3) when a specific symbol is rearranged in the arrangement areas as a result of a rearrangement of scatter symbols, adding, to the accumulated value, a value determined based on the number of specific symbols rearranged to update the accumulated value, (a4) when the rearranged scatter symbols satisfy a predetermined condition, executing a bonus game including one or more free games, wherein the number of one or more free games is equal to the accumulated value, and (a5) resetting the accumulated value when a period during which the sensor senses no presence of the player lasts a predetermined time;

an input device which receives plural types of bet operations from outside; and a timer which measures time, wherein:

in step (a3), when a specific symbol is rearranged in the arrangement areas as a result of a rearrangement of scatter symbols, the controller adds, to the accumulated value, a value determined based on the number of specific symbols rearranged and a type of bet operation received by the input device; and in step (a5), the controller triggers the timer, when the sensor which has sensed the presence of the player senses no presence of the player, to measure a period during which the sensor senses no presence of the player, and resets the accumulated value when the period during which the sensor senses no presence of the player lasts the predetermined time.

* * * * *